US012617554B2

(12) United States Patent
Heiberg

(10) Patent No.: US 12,617,554 B2
(45) Date of Patent: May 5, 2026

(54) SYSTEMS AND METHODS FOR COMBINED CONTROL MOMENT GYROSCOPE AND THRUSTER CONTROL

(71) Applicant: The Boeing Company, Arlington, VA (US)

(72) Inventor: Christopher J. Heiberg, Sunset Beach, CA (US)

(73) Assignee: THE BOEING COMPANY, Arlington, VA (US)

( * ) Notice: Subject to any disclaimer, the term of this patent is extended or adjusted under 35 U.S.C. 154(b) by 358 days.

(21) Appl. No.: 18/180,646

(22) Filed: Mar. 8, 2023

(65) Prior Publication Data

US 2024/0308698 A1 Sep. 19, 2024

(51) Int. Cl.
　B64G 1/24 (2006.01)
　B64G 1/28 (2006.01)

(52) U.S. Cl.
　CPC ............. B64G 1/244 (2019.05); B64G 1/286 (2013.01)

(58) Field of Classification Search
　CPC ... B64G 1/00; B64G 1/22; B64G 1/24; B64G 1/28; B64G 1/244; B64G 1/286; B64G 1/245; B64G 1/247
　USPC .......................................................... 701/13
　See application file for complete search history.

(56) References Cited

U.S. PATENT DOCUMENTS 5,140,525 A * 8/1992 Shankar ................. B64G 1/244
　　　　　　　　　　　　　　　　　　　701/13
5,875,676 A 3/1999 Bailey et al.

| | | |
|---|---|---|
| 5,944,761 A | 8/1999 | Heiberg |
| 6,039,290 A | 3/2000 | Wie et al. |
| 6,047,927 A | 4/2000 | Heiberg et al. |
| 6,131,056 A | 10/2000 | Bailey et al. |
| 6,241,194 B1 | 6/2001 | Heiberg |

(Continued)

FOREIGN PATENT DOCUMENTS

WO 2004/032392 A2 4/2004

OTHER PUBLICATIONS

Heiberg, "A practical approach to modeling single-gimbal control momentum gyroscopes in agile spacecraft", Aug. 2000 (Year: 2000).*

(Continued)

*Primary Examiner* — Khoi H Tran
*Assistant Examiner* — Sarah A Tran
(74) *Attorney, Agent, or Firm* — MH2 Technology Law Group LLP

(57) ABSTRACT

Systems and methods disclosed provide for attitude control of a body, the body including a plurality of thrusters and a plurality of gimballed rotors. Operations performed include: receiving a command vector representing a desired torque on the body, generating a Jacobian matrix that, when applied to a combined gimbal rate and thrust command vector, generates the command vector, generating components of a weighted pseudo inverse of the Jacobian matrix and using the components with the command vector in order to generate the combined gimbal rate and thrust command vector. Generating components of the weighted pseudo inverse of the Jacobian matrix can include generating a weighting matrix including a plurality of diagonal elements, the plurality of diagonal elements representing at least the plurality of gimballed rotors and the plurality of thrusters.

27 Claims, 26 Drawing Sheets

(56)                    References Cited

U.S. PATENT DOCUMENTS

| | | | |
|---|---|---|---|
| 6,354,163 B1 | 3/2002 | Heiberg | |
| 7,246,776 B2 | 7/2007 | Peck et al. | |
| 7,627,404 B2 | 12/2009 | Heiberg | |
| 7,904,214 B2 | 3/2011 | Heiberg | |
| 8,352,101 B2 | 1/2013 | Thomas et al. | |
| 9,567,121 B2 | 2/2017 | Agrawal et al. | |
| 10,964,220 B2 | 3/2021 | Heiberg et al. | |
| 2006/0027708 A1* | 2/2006 | Peck ..................... | B64G 1/286 |
| | | | 244/165 |
| 2006/0049315 A1* | 3/2006 | Patel ..................... | B64G 1/283 |
| | | | 244/169 |

OTHER PUBLICATIONS

Heiberg, C. "A practical approach to modeling single-gimbal Control Momentum Gyroscopes in agile spacecraft" AIAA Guidance, Navigation, and Control Conference and Exhibit (Aug. 14, 2000-Aug. 17, 2000) https://doi.org/10.2514/6.2000-4545 (11 pages total).

\* cited by examiner

| 4 CMG Pyramid Array - Momentum Plane Geometry | | |
|---|---|---|
| Associated CMG | $\beta$ | $\gamma$ |
| $CMG_1$ | 53° | 0° |
| $CMG_2$ | 53° | 90° |
| $CMG_3$ | 53° | 180° |
| $CMG_4$ | 53° | 270° |

606

| Roof Array – Momentum Plane Geometry | | |
|---|---|---|
| Associated CMG | $\beta$ | $\gamma$ |
| $CMG_1$ | 45° | 0° |
| $CMG_2$ | 45° | 0° |
| $CMG_3$ | 45° | 180° |
| $CMG_4$ | 45° | 180° |

706

730

| 5 CMG Pyramid Array - Momentum Plane Geometry | | |
|---|---|---|
| Associated CMG | $\beta$ | $\gamma$ |
| $CMG_1$ | 53° | 0° |
| $CMG_2$ | 53° | 72° |
| $CMG_3$ | 53° | 144° |
| $CMG_4$ | 53° | 216° |
| $CMG_5$ | 53° | 288° |

806

830

384  381  383  382

$\vec{g}_4$  $\vec{g}_1$  $\vec{g}_3$  $\vec{g}_2$ $CMG_4$  $CMG_1$  $CMG_3$  $CMG_2$

930

*yaw axis*

403

901A

*pitch axis*

*roll axis*

*For β = 0°*

*For β = 0° and no rotation about gimbal axes*

*"0h"*

$CMG_2$ $\vec{h}_2$  372

$CMG_3$  $\vec{h}_3$

373

930

$\vec{h}_4$  374

$CMG_4$ $\vec{h}_1$  $CMG_1$

371

*pitch axis*

901B

*yaw axis*

*roll axis*

"4$h$" Singularity

931

$\vec{h_1}$ $CMG_1$ $\vec{h_2}$ $CMG_2$ $\vec{h_3}$ $CMG_3$ $\vec{h_4}$ $CMG_4$ pitch axis

901B yaw axis    roll axis

"2$h$" Singularity

932

$\vec{h_1}$ $CMG_1$ $\vec{h_2}$ $CMG_2$ $\vec{h_3}$ $CMG_3$ $\vec{h_4}$ $CMG_4$

941

"0$h$" Singularity

933

$\vec{h_1}$ $CMG_1$ $\vec{h_2}$ $CMG_2$ $\vec{h_3}$ $CMG_3$ $\vec{h_4}$ $CMG_4$

*For β > 0°*

"0h"

*CMG₂*

330

*For β > 0°*

"4h"

1095

431

330
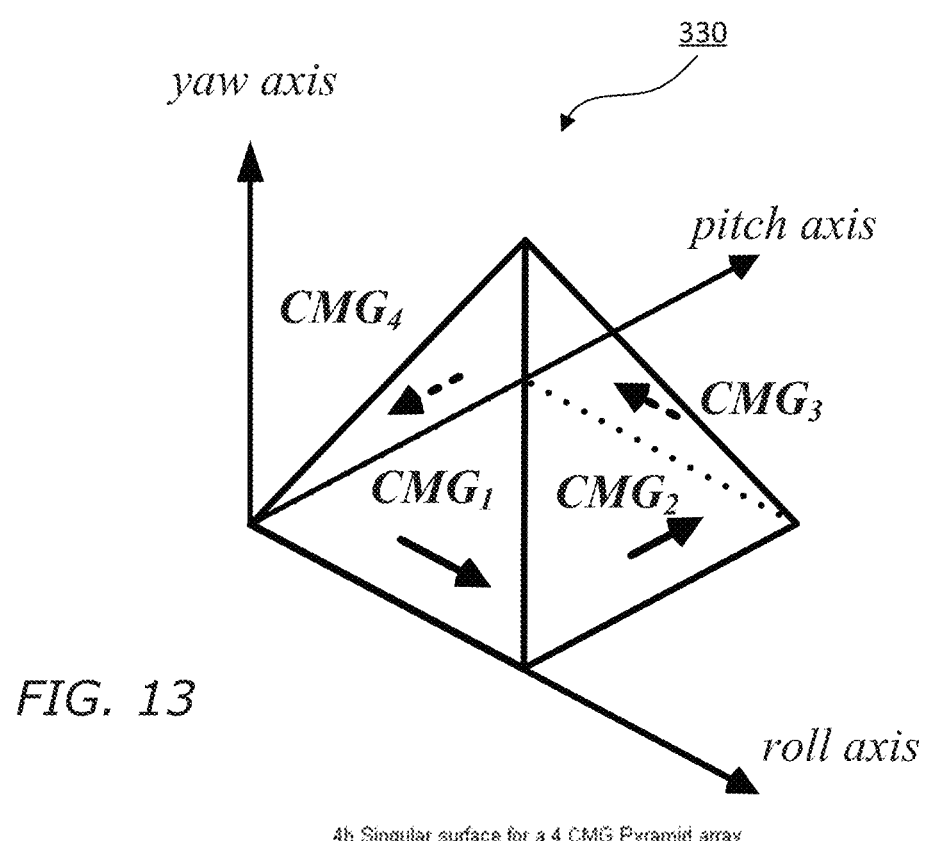
*FIG. 13*
1399
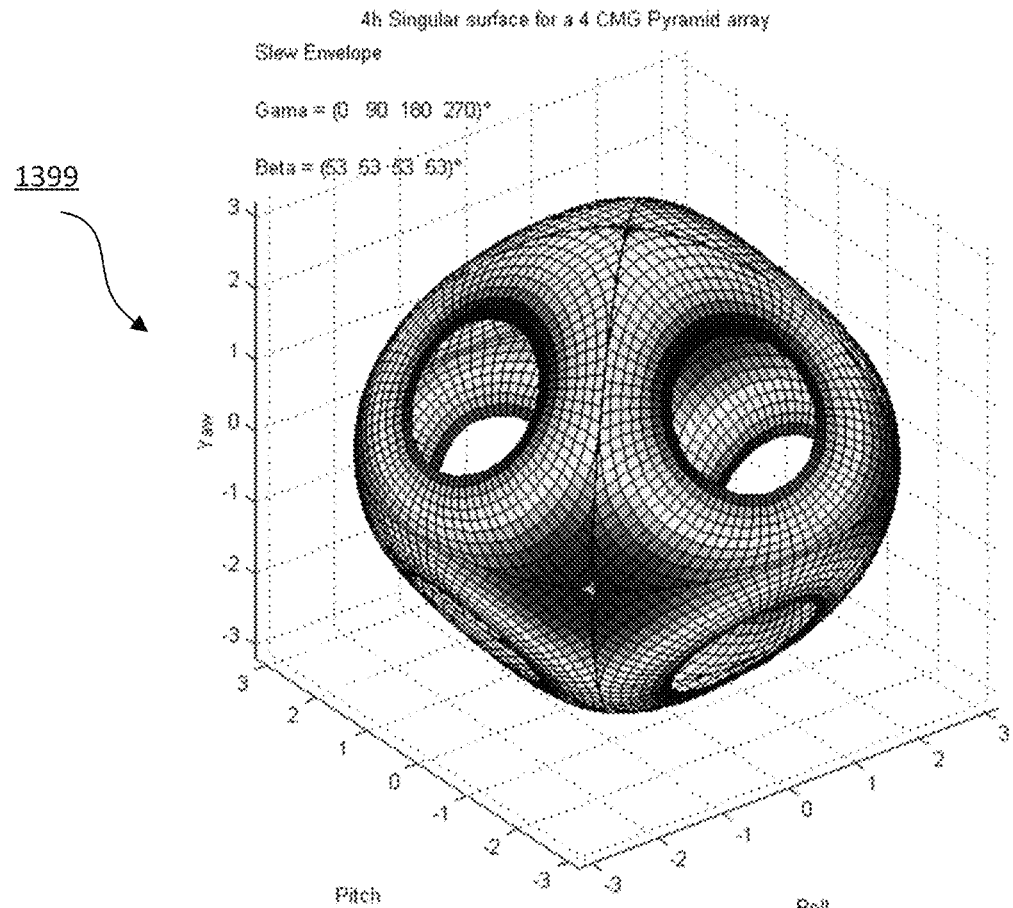

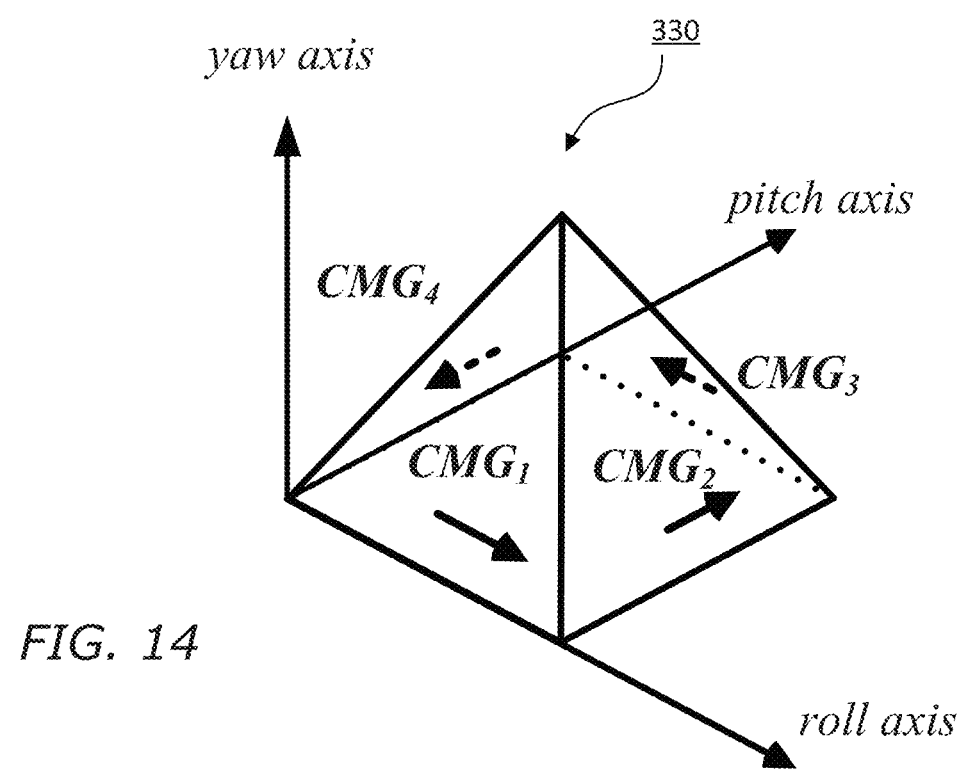
FIG. 14
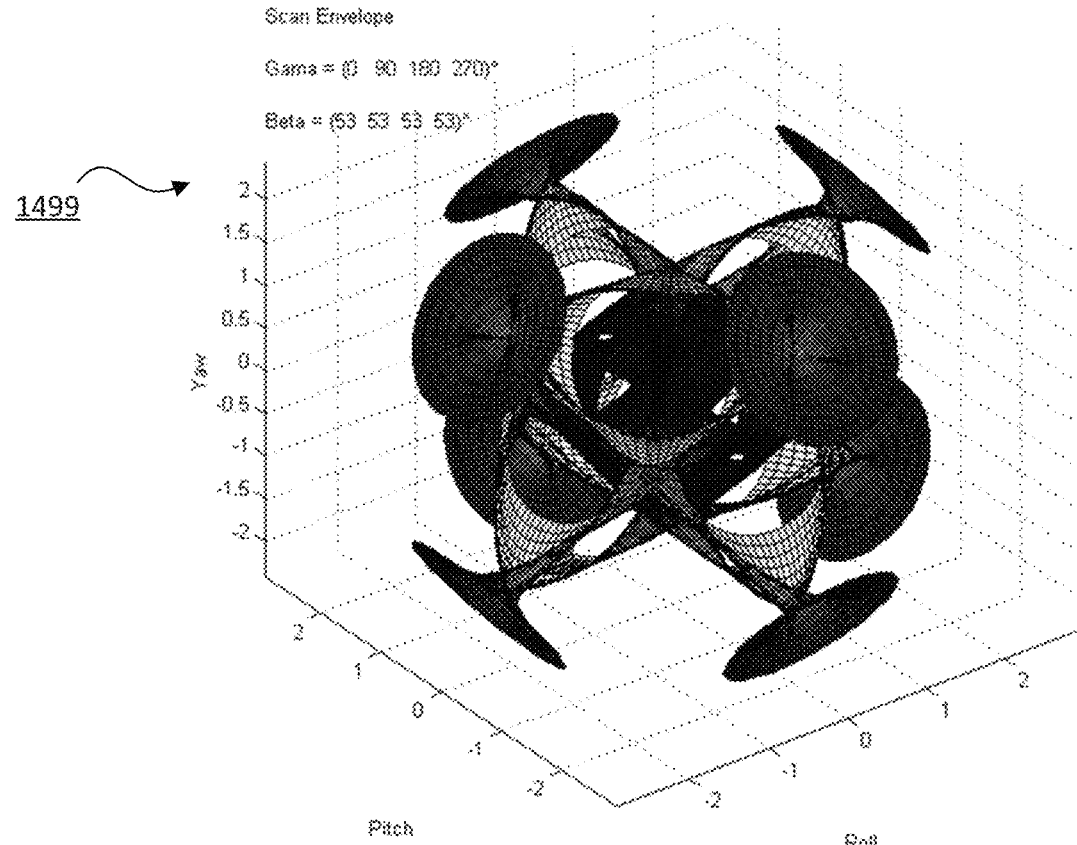

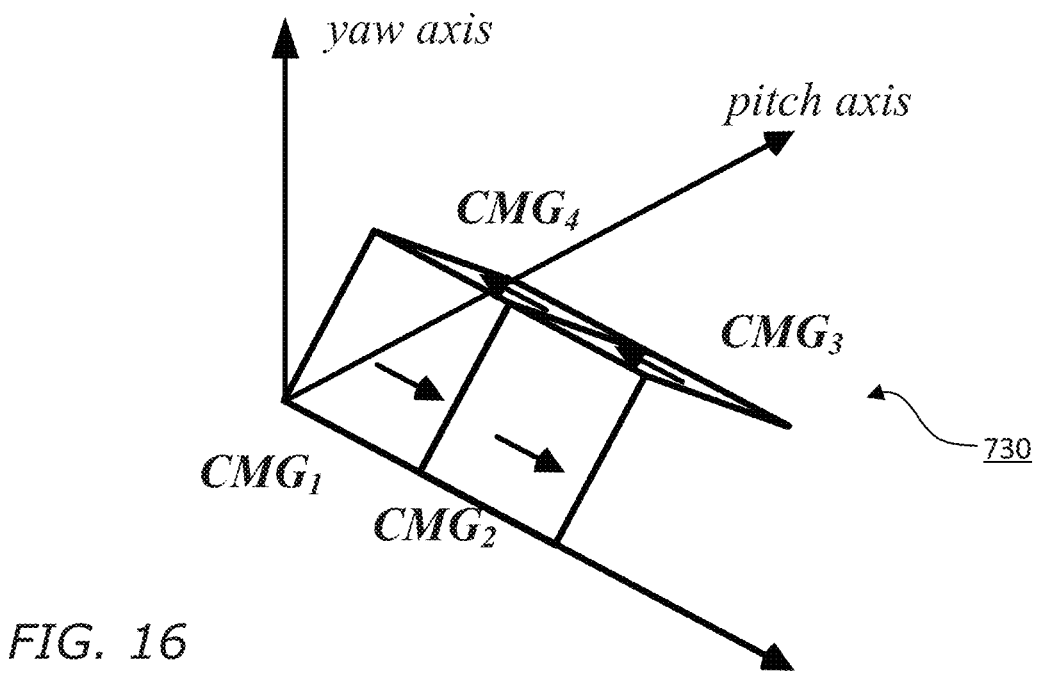
*FIG. 16*
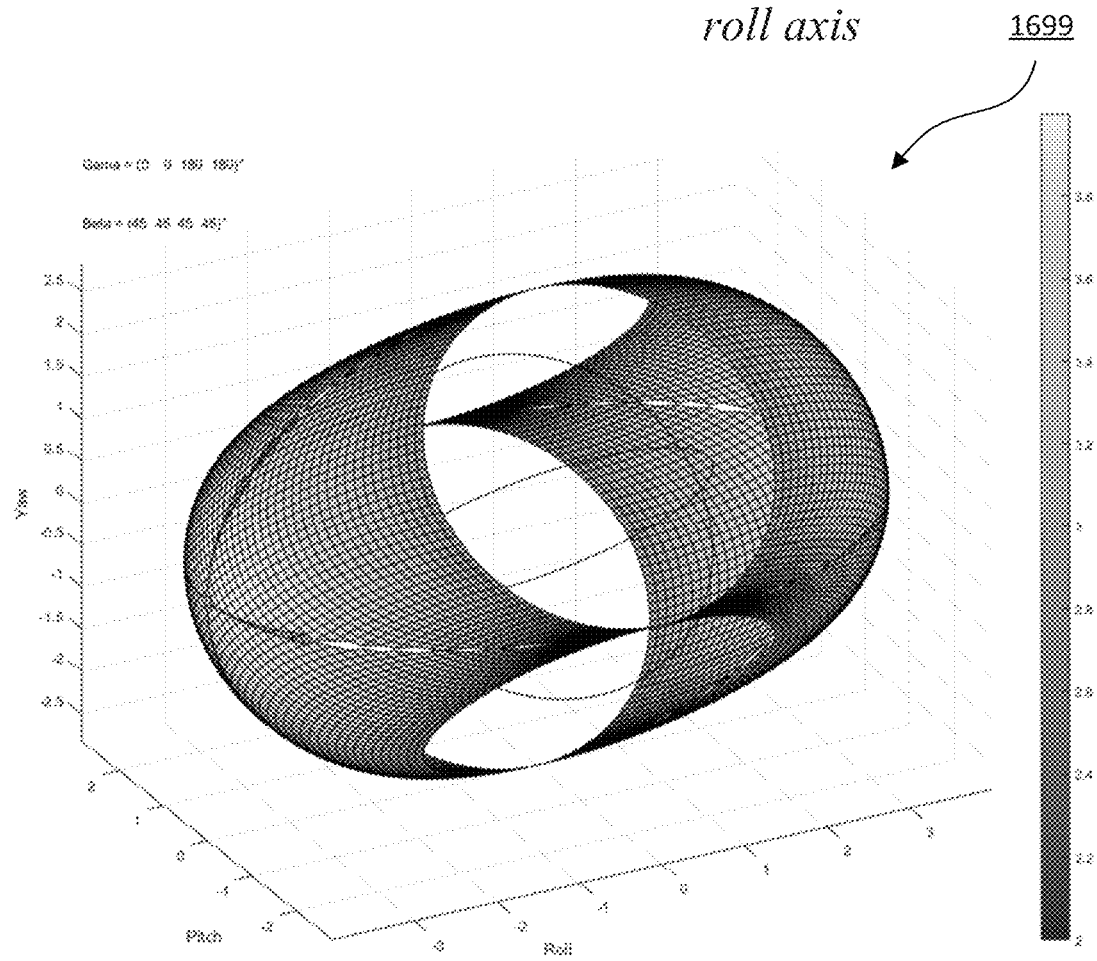

2306

| 6 CMG Roof Array - Momentum Plane Geometry | | |
|---|---|---|
| Associated CMG | $\beta$ | $\gamma$ |
| $CMG_1$ | 45° | 0° |
| $CMG_2$ | 45° | 0° |
| $CMG_3$ | 45° | 0° |
| $CMG_4$ | 45° | 180° |
| $CMG_5$ | 45° | 180° |
| $CMG_6$ | 45° | 180° |

2399

Composite 5h-4h Singular surface for a 6 CMG Pyramid array.

SYSTEMS AND METHODS FOR COMBINED CONTROL MOMENT GYROSCOPE AND THRUSTER CONTROL

FIELD

Systems, methods, and computer-readable media consistent with the present disclosure relate to the operation of both a control moment gyroscope (CMG) array and thrusters according to a weighted control Jacobian.

BACKGROUND

CMG arrays and thrusters can be used for spacecraft attitude control, where "attitude" refers to the orientation of one set of coordinates (such as those fixed to a spacecraft) relative to another (say, a set of coordinates associated with the "fixed stars" or some other body). Spacecraft attitude control generally refers to systems and methods that drive spacecraft orientation towards a particular commanded value. A commanded value, for example, may seek to align a large telescopic boresight (effectively fixed with a spacecraft body, such as the Hubble Telescope) with a target on the ground or in space. Thrusters affixed to a body operate by controllably expelling propellant, where the expelled propellant acts as a reaction mass and alters the external momentum of the body. CMG arrays affixed to a body can be configured to exchange internal momentum with the body, thereby providing a desired attitude for the body.

CMG arrays have proven to provide both a smoother and more accurate form of attitude control for spacecraft than reaction jets or thrusters. In addition, because the propellant used in thrusters can take up payload space, is a finite resource, and is expended during thruster-based attitude control, the use of CMG arrays for attitude control-rather than thrusters—is an efficient way to extend spacecraft mission life.

One difficulty associated with the use of CMG arrays is the occurrence of "singularities" in the available momentum space that can be accessed by the CMG array for momentum exchange. For example, a "saturation" singularity occurs when the CMG array is at the limit of the available momentum it can access. A simple picture of a "saturation" singularity is to envision each CMG rotor or flywheel (say the ith CMG rotor) in an array of N single-gimballed CMG rotors as contributing a fixed-size angular momentum vector $\vec{h}_i$—but with a variable orientation under the control of the ith CMG gimbal (gimbal $CMG_i$). If all N single-gimballed CMG rotors are configured to provide their respective angular momentum vectors in a single plane (which would maximize the total angular momentum accessed by the CMG array in any one direction), the largest angular momentum state attainable by the system is N $\vec{h}_i$. If the gimballed CMG rotors in a CMG array are in such a state, the state is referred to as a "saturation singularity." In practice, because an array of single-gimballed CMG rotors is generally not configured to access only co-planar angular momentum vectors $\vec{h}_i$,—although an individual single gimbal CMG rotor in an array is generally configured to access angular momentum vectors confined to an individual, distinct, plane—the "saturation singularity" associated with a given CMG array is generally represented as a complicated two-dimensional surface (or manifold) in three-dimensional momentum space—referred to here as a "saturation surface." The saturation surface in three-dimensional momentum space associated with a given CMG array can be considered to define the momentum "envelope" that the CMG array can access for exchanging internal momentum with a body the CMG array is affixed to.

Ideally, one would prefer to construct a CMG array for a given spacecraft body such that the "surface" defining the saturation singularity of the CMG array extends well beyond the momentum space the spacecraft body is expected to operate in for attitude control. That is, ideally one would desire the expected momentum space for attitude control of a spacecraft to lie entirely within the momentum envelope that the CMG array can access. However, for massive spacecraft bodies and/or for rapid attitude control, the inertial mass required of a CMG array in order to "size" the momentum envelope of the CMG array so as to encompass a relatively large desired attitude control momentum space can be a limiting factor, and can make a desired momentum envelope impractical or unattainable due to practical limits on the inertial mass of the CMG array as part of the body to be controlled.

In order to extend an effective momentum envelope beyond the momentum envelope available from a CMG array, one can consider adding momentum from another source beyond the CMG array, say from thrusters. However, adding momentum beyond the capability provided by momentum exchange with a CMG array can cause control issues. For example, to conventionally operate thrusters to extend a three-dimensional momentum space for attitude control beyond the momentum that can be exchanged with a CMG array, the plurality of gimballed momentum wheels (or gimballed rotors) in the CMG array will have to operate near or at a saturation singularity. At a saturation singularity, however, as discussed above, the momentum wheels in a CMG array can no longer contribute additional momentum and cannot be used to mitigate disturbances. Indeed, momentum contributions to a body from thrusters tend to "look" like disturbances to a CMG array control system, which is generally configured to counter such disturbances (as can occur during a conventional "desaturation" process, where stored, internal, angular momentum in the CMG array can be controllably unloaded). When the stored angular momentum in a CMG array exceeds the CMG envelope, however, further CMG control will produce non-linear behavior. Moreover, locking gimbals in a CMG array at high momentum states, and building up more momentum using thrusters, can result in a momentum mismatch as the thruster control attempts to extract its contribution. Such a mismatch can result in large disturbances at a state where the CMG array has little or no ability to provide control.

SUMMARY

Disclosed herein are systems, methods, and non-transitory computer readable media storing instructions for the operation of both gimballed rotors in a CMG array and thrusters according to a weighted control Jacobian such that the three-dimensional momentum space available for attitude control of a body extends beyond the momentum envelope associated with the CMG array alone In one aspect, an exemplary embodiment consistent with the present disclosure includes a system for attitude control of a body, the system including a module for controlling at least one control moment gyroscope array and a plurality of thrusters, where the at least one control moment gyroscope array includes a plurality of gimballed rotors, and where the at least one control moment gyroscope array and the plurality of thrusters are configured to provide the attitude control to the body, the module being responsive to a gimbal rate command and a thruster command. In an embodiment, the system can include a processor and a non-transitory computer storage medium storing instructions that when executed by the processor cause the processor to perform operations, the operations including: receiving a command vector representing a desired torque vector on the body associated with the attitude control, generating a Jacobian matrix $\overline{A}$ that, when applied to a combined gimbal rate and thruster command vector, generates the command vector, generating components of a weighted pseudo inverse of the Jacobian matrix $\overline{A}$ and using the components with the command vector in order to generate the combined gimbal rate and thrust command vector, providing the gimbal rate command to the module based on the generated combined gimbal rate and thruster command, and providing the thruster command to the control unit based on the generated combined gimbal rate and thruster command vector, where the step of generating components of the weighted pseudo inverse of the Jacobian matrix $\overline{A}$ includes generating a weighting matrix $\vec{W}$ including a plurality of diagonal elements, the plurality of diagonal elements representing at least the plurality of gimballed rotors and the plurality of thrusters.

According to another exemplary embodiment, a system for attitude control of a body includes the system of the previous embodiment, where the plurality of gimballed rotors includes N gimballed rotors ($CMG_1, \ldots CMG_N$), the plurality of thrusters is represented by M effective thrusters ($TH_1, \ldots TH_M$), the Jacobian matrix $\overline{A}$ is a 3×(M+N) matrix, and the weighting matrix $\overline{W}$ is an (M+N)×(M+N) characterized by a matrix form:

$$\overline{W} = \begin{bmatrix} w(CMG_1) & \cdots & \eta_{1\,N} & \eta_{1\,N+1} & \cdots & \eta_{1\,N+M} \\ \vdots & \ddots & \vdots & \vdots & \ddots & \vdots \\ \eta_{N\,1} & \cdots & w(CMG_N) & \eta_{N\,N+1} & \cdots & \eta_{N\,N+M} \\ \eta_{N+1\,1} & \cdots & \eta_{N+1\,N} & w(TH_1) & \cdots & \eta_{N+1\,N+M} \\ \vdots & \ddots & \vdots & \vdots & \ddots & \vdots \\ \eta_{N+M\,1} & \cdots & \eta_{N+M\,N} & \eta_{N+M\,N+1} & \cdots & w(TH_M) \end{bmatrix},$$

where the diagonal elements $w(CMG_1), \ldots w(CMG_N)$, $w(TH_1), \ldots w(TH_M)$ and the values $\eta_{IJ}$ are configured to modulate authority among the plurality of gimballed rotors and the plurality of thrusters.

According to another exemplary embodiment, a system for attitude control of a body includes the system of the previous embodiment where the values $\eta_{IJ}$ are selected from a set of: $\eta_{IJ}=0$ and $\eta_{IJ}\sim0$ in comparison to the diagonal elements $w(CMG_1), \ldots w(CMG_N)$, $w(TH_1), \ldots w(TH_M)$.

According to a further exemplary embodiment, a system for attitude control of a body includes the system of the previous embodiment where the diagonal elements $w(CMG_1), \ldots w(CMG_N)$, $w(TH_1), \ldots w(TH_M)$ are non-zero.

According to a further exemplary embodiment, a system for attitude control of a body includes the system of previous embodiments where the step of generating components of the weighted pseudo inverse of the Jacobian matrix $\overline{A}$ includes: transposing the Jacobian matrix $\overline{A}$ to obtain an (M+N)×3 matrix $\overline{A}^T$, inverting a first matrix product $\overline{A}\,\overline{W}\,\overline{A}^T$ to obtain a 3×3 matrix $[\overline{A}\,\overline{W}\,\overline{A}^T]^{-1}$, and generating a second matrix product: $\overline{W}\,\overline{A}^T\,[\overline{A}\,\overline{W}\,\overline{A}^T]^{-1}$.

According to a further exemplary embodiment, a system for attitude control of a body includes the system of previous embodiments where the command vector is characterized by a vector form:

$$\begin{bmatrix} \dot{h}_{(1)} \\ \dot{h}_{(2)} \\ \dot{h}_{(3)} \end{bmatrix},$$

where $$\begin{bmatrix} \dot{h}_{(1)} \\ \dot{h}_{(2)} \\ \dot{h}_{(3)} \end{bmatrix}$$

denotes a desired torque associated with the body, the parenthetical subscripts (1), (2), and (3) denoting orthonormal components in three-dimensional momentum space. Moreover, the step of generating components of the weighted pseudo inverse of the Jacobian matrix $\overline{A}$ and using the components with the command vector in order to generate the combined gimbal rate and thrust command vector includes determining a product:

$$\overline{W}\overline{A}^T\,\left[\overline{A}\overline{W}\overline{A}^T\right]^{-1}\begin{bmatrix} \dot{h}_{(1)} \\ \dot{h}_{(2)} \\ \dot{h}_{(3)} \end{bmatrix}.$$

According to another exemplary embodiment, a system for attitude control of a body includes the system of previous embodiments where the at least one control moment gyroscope array has an associated momentum envelope representing a bound on momentum values that can be accessed by the at least one control moment gyroscope array, where an inverse of a first matrix product, $[\overline{A}\,\overline{W}\,\overline{A}^T]^{-1}$, exhibits a singularity at and/or near a portion of the associated momentum envelope, and where the step of generating components of the weighted pseudo inverse of the Jacobian matrix $\overline{A}$ includes: transposing the Jacobian matrix $\overline{A}$ to obtain an (M+N)×3 matrix $\overline{A}^T$, and applying a singularity avoidance technique to provide a second matrix product corresponding to $\overline{W}\,\overline{A}^T\,[\overline{A}\,\overline{W}\,\overline{A}^T]^{-1}$.

According to another exemplary embodiment, a system for attitude control of a body includes the system of previous embodiments where the singularity avoidance technique includes: inverting a sum of a first matrix product $\overline{A}\,\overline{W}\,\overline{A}^T$ and $\lambda\bar{\epsilon}$ to obtain a 3×3 matrix $[\overline{A}\,\overline{W}\,\overline{A}^T+\lambda\bar{\epsilon}\,]^{-1}$, and generating the second matrix product: $\overline{W}\,\overline{A}^T\,[\overline{A}\,\overline{W}\,\overline{A}^T+\lambda\bar{\epsilon}]^{-1}$, where $\bar{\epsilon}$ is characterized by a second matrix form:

$$\begin{bmatrix} 1 & \epsilon_{(12)}(t) & \epsilon_{(13)}(t) \\ \epsilon_{(21)}(t) & 1 & \epsilon_{(23)}(t) \\ \epsilon_{(31)}(t) & \epsilon_{(32)}(t) & 1 \end{bmatrix},$$

where each of $\epsilon_{(12)}(t)$, $\epsilon_{(13)}(t)$, $\epsilon_{(21)}(t)$, $\epsilon_{(23)}(t)$ $\epsilon_{(31)}(t)$, and $\epsilon_{(32)}(t)$ are small compared to 1, and are time-varying, and $\lambda$ is a constant.

According to another exemplary embodiment, a system for attitude control of a body includes the system of the previous embodiment where the at least one control moment gyroscope array is operating at or substantially near the portion of the associated momentum envelope, where the portion of said associated momentum envelope is associated with a saturation singularity, and where the constant A is scaled to singular values associated with the saturation singularity.

In a further aspect, an exemplary embodiment consistent with the present disclosure includes a method for attitude control of a body using at least one control moment gyroscope array and a plurality of thrusters, where the at least one control moment gyroscope array includes a plurality of gimballed rotors, and where the at least one control moment gyroscope array and the plurality of thrusters provide the attitude control of the body in response to an attitude control instruction set. In an embodiment, the method includes: acquiring a command vector representing a desired torque vector on the body associated with the attitude control, generating a Jacobian matrix $\overline{A}$ that, when applied to a combined gimbal rate and thrust command vector, generates the command vector, generating components of a weighted pseudo inverse of the Jacobian matrix $\overline{A}$ and using the components with the command vector in order to generate the combined gimbal rate and thrust command vector, and determining the attitude control instruction set based on the generated combined gimbal rate and thrust command vector, and providing the attitude control instruction set to the at least one control moment gyroscope array and the plurality of thrusters. In an embodiment, the step of generating components of the weighted pseudo inverse of the Jacobian matrix $\overline{A}$ includes generating a weighting matrix $\overline{W}$ including a plurality of diagonal elements, the plurality of diagonal elements representing at least the plurality of gimballed rotors and the plurality of thrusters.

According to another exemplary embodiment, a method for attitude control of a body includes the method of the previous embodiment, where the plurality of gimballed rotors includes N gimballed rotors ($CMG_1, \ldots CMG_N$), the plurality of thrusters is represented by M effective thrusters ($TH_1, \ldots TH_M$), the Jacobian matrix $\overline{A}$ is a 3×(M+N) matrix, and the weighting matrix $\overline{W}$ is an (M+N)×(M+N) characterized by a matrix form:

$CMG_1 CMG_N TH_1 TH_M \overline{AWW} =$ $$
\begin{bmatrix}
w(CMG_1) & \cdots & \eta_{1\ N} & \eta_{1\ N+1} & \cdots & \eta_{1\ N+M} \\
\vdots & \ddots & \vdots & \vdots & \ddots & \vdots \\
\eta_{N\ 1} & \cdots & w(CMG_N) & \eta_{N\ N+1} & \cdots & \eta_{N\ N+M} \\
\eta_{N+1\ 1} & \cdots & \eta_{N+1\ N} & w(TH_1) & \cdots & \eta_{N+1\ N+M} \\
\vdots & \ddots & \vdots & \vdots & \ddots & \vdots \\
\eta_{N+M\ 1} & \cdots & \eta_{N+M\ N} & \eta_{N+M\ N+1} & \cdots & w(TH_M)
\end{bmatrix} w(CMG_1),
$$

$\ldots w(CMG_N), w(TH_1), \ldots w,$ $CMG_1 CMG_N TH_1 TH_M \overline{AWW} =$ $$
\begin{bmatrix}
w(CMG_1) & \cdots & \eta_{1\ N} & \eta_{1\ N+1} & \cdots & \eta_{1\ N+M} \\
\vdots & \ddots & \vdots & \vdots & \ddots & \vdots \\
\eta_{N\ 1} & \cdots & w(CMG_N) & \eta_{N\ N+1} & \cdots & \eta_{N\ N+M} \\
\eta_{N+1\ 1} & \cdots & \eta_{N+1\ N} & w(TH_1) & \cdots & \eta_{N+1\ N+M} \\
\vdots & \ddots & \vdots & \vdots & \ddots & \vdots \\
\eta_{N+M\ 1} & \cdots & \eta_{N+M\ N} & \eta_{N+M\ N+1} & \cdots & w(TH_M)
\end{bmatrix} w(CMG_1),
$$

$\ldots w(CMG_N), w(TH_1), \ldots w$ where the diagonal elements $w(CMG_1), \ldots w(CMG_N)$, $w(TH_1), \ldots w(TH_M)$ and the values $\eta_{i,j}$ are configured to modulate authority among the plurality of gimballed rotors and the plurality of thrusters.

According to another exemplary embodiment, a method for attitude control of a body includes the method of the previous embodiment where the values $\eta_{i,j}$ are selected from a set of: $\eta_{i,j}=0$ and $\eta_{i,j}\sim 0$ in comparison to the diagonal elements $w(CMG_1), \ldots w(CMG_N), w(TH_1), \ldots w(TH_M)$.

According to a further exemplary embodiment, a method for attitude control of a body includes the method of the previous embodiment where the diagonal elements $w(CMG_1), \ldots w(CMG_N), w(TH_1), \ldots w(TH_M)$ are non-zero.

According to a further exemplary embodiment, a method for attitude control of a body includes the method of previous embodiments where the step of generating components of the weighted pseudo inverse of the Jacobian matrix $\overline{A}$ includes: transposing the Jacobian matrix $\overline{A}$ to obtain an (M+N)×3 matrix $\overline{A}^T$, inverting a first matrix product $\overline{A}\ \overline{W}\ \overline{A}^T$ to obtain a 3×3 matrix $[\overline{A}\ \overline{W}\ \overline{A}^T]^{-1}$, and generating a second matrix product: $\overline{W}\ \overline{A}^T\ \lambda[\overline{A}\ \overline{W}\ \overline{A}^T]^{-1}$.

According to a further exemplary embodiment, a method for attitude control of a body includes the method of previous embodiments where the command vector is characterized by a vector form:

$$
\begin{bmatrix}
\dot{h}_{(1)} \\
\dot{h}_{(2)} \\
\dot{h}_{(3)}
\end{bmatrix},
$$

where $$
\begin{bmatrix}
\dot{h}_{(1)} \\
\dot{h}_{(2)} \\
\dot{h}_{(3)}
\end{bmatrix}
$$

denotes a desired torque associated with the body, the parenthetical subscripts (1), (2), and (3) denoting orthonormal components in three-dimensional momentum space. Moreover, the step of generating components of the weighted pseudo inverse of the Jacobian matrix $\overline{A}$ and using the components with the command vector in order to generate the combined gimbal rate and thrust command vector includes determining a product:

$$
\overline{W A^T}\left[\overline{A W A^T}\right]^{-1}
\begin{bmatrix}
\dot{h}_{(1)} \\
\dot{h}_{(2)} \\
\dot{h}_{(3)}
\end{bmatrix}.
$$

According to another exemplary embodiment, a method for attitude control of a body includes the method of previous embodiments where the at least one control moment gyroscope array has an associated momentum envelope representing a bound on momentum values that can be accessed by the at least one control moment gyroscope array, where an inverse of a first matrix product, $[\overline{A}\ \overline{W}\ \overline{A}^T]^{-1}$, exhibits a singularity at and/or near a portion of the associated momentum envelope, and where the step of generating components of the weighted pseudo inverse of the Jacobian matrix $\overline{A}$ includes: transposing the Jacobian matrix $\overline{A}$ to obtain an (M+N)×3 matrix $\overline{A}^T$, and applying a singularity avoidance technique to provide a second matrix product corresponding to $\overline{W}\ \overline{A}^T\ [\overline{A}\ \overline{W}\ \overline{A}^T]^{-1}$.

According to another exemplary embodiment, a method for attitude control of a body includes the method of previous embodiments where the singularity avoidance technique includes: inverting a sum of a first matrix product $\overline{A}\ \overline{W}\ \overline{A}^T$ and $\lambda\overline{\epsilon}$ to obtain a 3×3 matrix $[\overline{A}\ \overline{W}\ \overline{A}^T+\lambda\overline{\epsilon}]^{-1}$, and generating the second matrix product: $\overline{W}\ \overline{A}^T\ [\overline{A}\ \overline{W}\ \overline{A}^T+\lambda\overline{\epsilon}]^{-1}$, where $\overline{\epsilon}$ is characterized by a second matrix form:

$$\begin{bmatrix} 1 & \epsilon_{(12)}(t) & \epsilon_{(13)}(t) \\ \epsilon_{(21)}(t) & 1 & \epsilon_{(23)}(t) \\ \epsilon_{(31)}(t) & \epsilon_{(32)}(t) & 1 \end{bmatrix},$$

where each of $\epsilon_{(12)}(t)$, $\epsilon_{(13)}(t)$, $\epsilon_{(21)}(t)$, $\epsilon_{(23)}(t)$ $\epsilon_{(31)}(t)$, and $\epsilon_{(32)}(t)$ are small compared to 1, and are time-varying, and $\lambda$ is a constant.

According to another exemplary embodiment, a method for attitude control of a body includes the method of the previous embodiment where the at least one control moment gyroscope array is operating at or substantially near the portion of the associated momentum envelope, where the portion of said associated momentum envelope is associated with a saturation singularity, and where the constant $\lambda$ is scaled to singular values associated with the saturation singularity.

In a further aspect, an exemplary embodiment consistent with the present disclosure includes a non-transitory computer-readable medium storing instructions that when executed by a system for attitude control of a body cause the system to perform a method for attitude control using at least one control moment gyroscope array and a plurality of thrusters, where the at least one control moment gyroscope array includes a plurality of gimballed rotors, and where the at least one control moment gyroscope array and the plurality of thrusters provide the attitude control of the body in response to an attitude control instruction set. In this embodiment, the method includes: acquiring a command vector representing a desired torque vector on the body associated with the attitude control, generating a Jacobian matrix $\overline{A}$ that, when applied to a combined gimbal rate and thrust command vector, generates the command vector, generating components of a weighted pseudo inverse of the Jacobian matrix $\overline{A}$ and using the components with the command vector in order to generate the combined gimbal rate and thrust command vector, determining the attitude control instruction set based on the generated combined gimbal rate and thrust command vector, and providing the attitude control instruction set to the at least one control moment gyroscope array and the plurality of thrusters. In an embodiment, the step of generating components of the weighted pseudo inverse of the Jacobian matrix $\overline{A}$ includes generating a weighting matrix $\overline{W}$ including a plurality of diagonal elements, the plurality of diagonal elements representing at least the plurality of gimballed rotors and the plurality of thrusters.

According to another exemplary embodiment, a non-transitory computer-readable medium includes the non-transitory computer-readable medium of the previous embodiment, where the plurality of gimballed rotors includes N gimballed rotors (CMG$_1$, . . . CMG$_N$), the plurality of thrusters is represented by M effective thrusters (TH$_1$, . . . TH$_M$), the Jacobian matrix $\overline{A}$ is a 3×(M+N) matrix, and the weighting matrix $\overline{W}$ is an (M+N)×(M+N) characterized by a matrix form:

$$\overline{W} = \begin{bmatrix} w(CMG_1) & \cdots & \eta_{1\,N} & \eta_{1\,N+1} & \cdots & \eta_{1\,N+M} \\ \vdots & \ddots & \vdots & \vdots & \ddots & \vdots \\ \eta_{N\,1} & \cdots & w(CMG_N) & \eta_{N\,N+1} & \cdots & \eta_{N\,N+M} \\ \eta_{N+1\,1} & \cdots & \eta_{N+1\,N} & w(TH_1) & \cdots & \eta_{N+1\,N+M} \\ \vdots & \ddots & \vdots & \vdots & \ddots & \vdots \\ \eta_{N+M\,1} & \cdots & \eta_{N+M\,N} & \eta_{N+M\,N+1} & \cdots & w(TH_M) \end{bmatrix},$$

where the diagonal elements $w(CMG_1)$, . . . $w(CMG_N)$, $w(TH_1)$, . . . $w(TH_M)$ and the values $\eta_{IJ}$ are configured to modulate authority among the plurality of gimballed rotors and the plurality of thrusters.

According to another exemplary embodiment, a non-transitory computer-readable medium includes the non-transitory computer-readable medium of the previous embodiment where the values $\eta_{IJ}$ are selected from a set of: $\eta_{IJ}=0$ and $\eta_{IJ}\sim0$ in comparison to the diagonal elements $w(CMG_1)$, . . . $w(CMG_N)$, $w(TH_1)$, . . . $w(TH_M)$.

According to another exemplary embodiment, a non-transitory computer-readable medium includes the non-transitory computer-readable medium of the previous embodiment where the diagonal elements $w(CMG_1)$, . . . $w(CMG_N)$, $w(TH_1)$, . . . $w(TH_M)$ are non-zero.

According to a further exemplary embodiment, a non-transitory computer-readable medium includes the non-transitory computer-readable medium of previous embodiments where the step of generating components of the weighted pseudo inverse of the Jacobian matrix $\overline{A}$ includes: transposing the Jacobian matrix $\overline{A}$ to obtain an (M+N)×3 matrix $\overline{A}^T$, inverting a first matrix product $\overline{A}\ \overline{W}\ \overline{A}^T$ to obtain a 3×3 matrix $[\overline{A}\ \overline{W}\ \overline{A}^T]^{-1}$, and generating a second matrix product: $\overline{W}\ \overline{A}^T\ [\overline{A}\ \overline{W}\ \overline{A}^T]^{-1}$.

According to a further exemplary embodiment, a non-transitory computer-readable medium includes the non-transitory computer-readable medium of previous embodiments where the command vector is characterized by a vector form:

$$\begin{bmatrix} \dot{h}_{(1)} \\ \dot{h}_{(2)} \\ \dot{h}_{(3)} \end{bmatrix},$$

where $$\begin{bmatrix} \dot{h}_{(1)} \\ \dot{h}_{(2)} \\ \dot{h}_{(3)} \end{bmatrix}$$

denotes a desired torque associated with the body, the parenthetical subscripts (1), (2), and (3) denoting orthonormal components in three-dimensional momentum space. Moreover, the step of generating components of the weighted pseudo inverse of the Jacobian matrix $\overline{A}$ and using the components with the command vector in order to generate the combined gimbal rate and thrust command vector includes determining a product:

$$\overline{W}\overline{A}^T\left[\overline{A}\overline{W}\overline{A}^T\right]^{-1}\begin{bmatrix} \dot{h}_{(1)} \\ \dot{h}_{(2)} \\ \dot{h}_{(3)} \end{bmatrix}.$$

According to another exemplary embodiment, a non-transitory computer-readable medium includes the non-transitory computer-readable medium of previous embodiments where the at least one control moment gyroscope array has an associated momentum envelope representing a bound on momentum values that can be accessed by the at least one control moment gyroscope array, where an inverse of a first matrix product, $[\overline{A} \, W \, \overline{A}^T]^{-1}$, exhibits a singularity at and/or near a portion of the associated momentum envelope, and where the step of generating components of the weighted pseudo inverse of the Jacobian matrix $\overline{A}$ includes: transposing the Jacobian matrix $\overline{A}$ to obtain an $(M+N)\times3$ matrix $\overline{A}^T$, and applying a singularity avoidance technique to provide a second matrix product corresponding to $\overline{W} \, \overline{A}^T \, [\overline{A} \, W \, \overline{A}^T]^{-1}$.

According to another exemplary embodiment, a non-transitory computer readable medium includes the non-transitory computer-readable medium of previous embodiments where the singularity avoidance technique includes: inverting a sum of a first matrix product $\overline{A} \, W \, \overline{A}^T$ and $\lambda\overline{\epsilon}$ to obtain a $3\times3$ matrix $[\overline{A} \, W \, \overline{A}^T+\lambda\overline{\epsilon}]^{-1}$, and generating the second matrix product: $\overline{W} \, \overline{A}^T \, [\overline{A} \, W \, \overline{A}^T+\lambda\overline{\epsilon}]^{-1}$, where $\overline{\epsilon}$ is characterized by a second matrix form:

$$\begin{bmatrix} 1 & \epsilon_{(12)}(t) & \epsilon_{(13)}(t) \\ \epsilon_{(21)}(t) & 1 & \epsilon_{(23)}(t) \\ \epsilon_{(31)}(t) & \epsilon_{(32)}(t) & 1 \end{bmatrix},$$

where each of $\epsilon_{(12)}(t)$, $\epsilon_{(13)}(t)$, $\epsilon_{(21)}(t)$, $\epsilon_{(23)}(t)$ $\epsilon_{(31)}(t)$, and $\epsilon_{(32)}(t)$ are small compared to 1, and are time-varying, and $\lambda$ is a constant.

According to another exemplary embodiment, a system for attitude control of a body includes the system of the previous embodiment where the at least one control moment gyroscope array is operating at or substantially near the portion of the associated momentum envelope, where the portion of said associated momentum envelope is associated with a saturation singularity, and where the constant $\lambda$ is scaled to singular values associated with the saturation singularity.

Additional features and embodiments of the invention will be set forth in part in the description which follows, and in part will be obvious from the description, or may be learned by practice of the invention. It is to be understood that both the foregoing general description and the following detailed description are exemplary and explanatory only and are not restrictive of the claimed subject matter.

BRIEF DESCRIPTION OF THE DRAWINGS

The accompanying drawings, which are incorporated in and constitute a part of this specification, illustrate exemplary embodiments and together with the description, serve to explain the principles of the disclosure. In the figures:

FIG. 13 depicts a "4 h" saturation singularity surface for the 4 CMG pyramid array of FIGS. 6, 9A, and 9B in three-dimensional momentum space consistent with this disclosure;

FIG. 14 depicts a "2 h" singularity surface for the 4 CMG pyramid array of FIGS. 6 and 9 in three-dimensional momentum space consistent with this disclosure;

FIG. 16 depicts a "4 h" singularity surface for the 4 CMG roof array of FIG. 7 in three-dimensional momentum space consistent with this disclosure;

DESCRIPTION OF THE EMBODIMENTS

Reference will now be made in detail to the disclosed embodiments of the disclosure, examples of which are illustrated in the accompanying drawings. Wherever possible, the same reference numbers will be used throughout the drawings to refer to the same or like parts.

Figure 1:
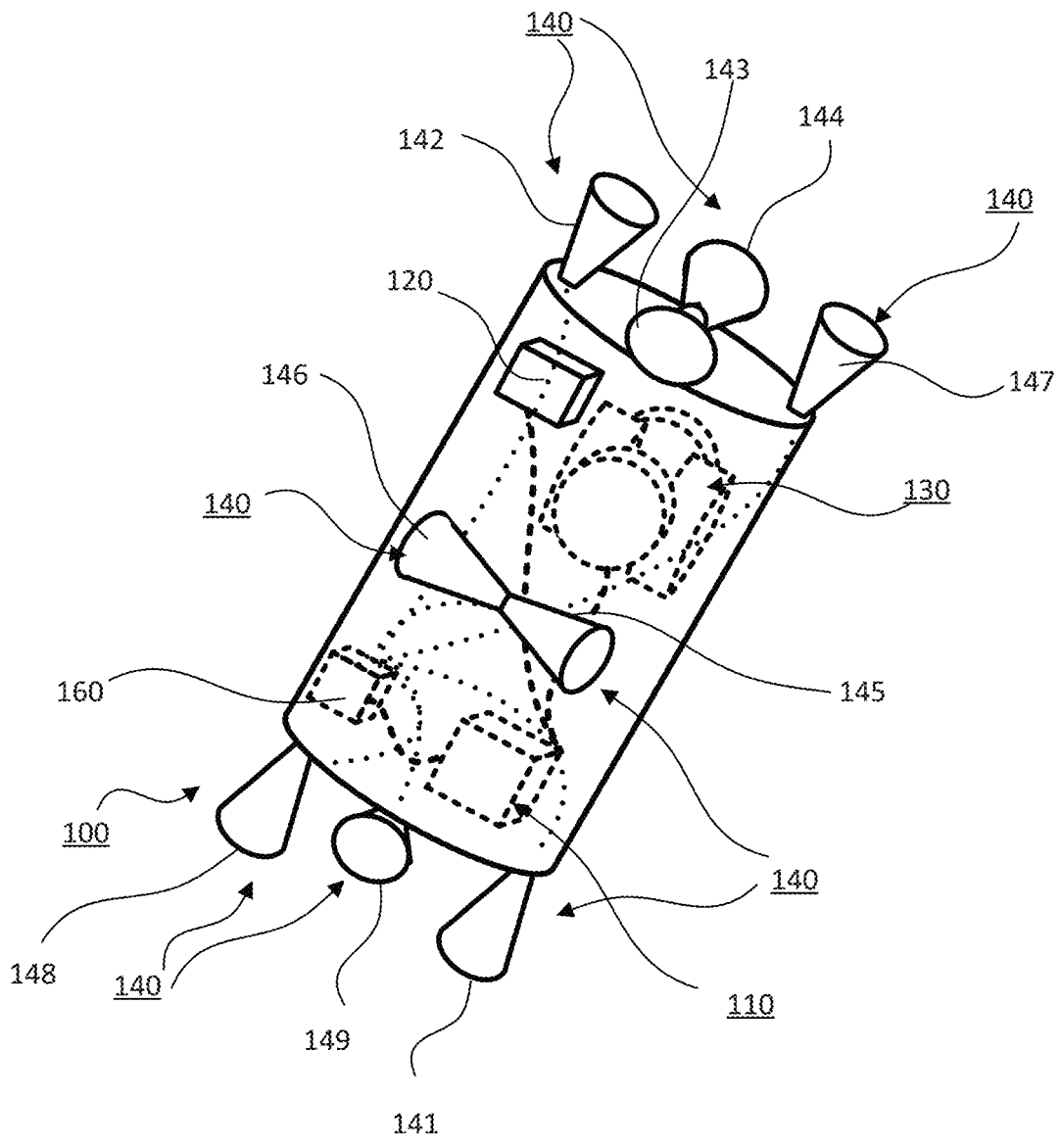
FIG. 1 is a view of a body configured for attitude control consistent with this disclosure.

FIG. 1 depicts body 100 configured for attitude control consistent with this disclosure. Body 100 can include CMG array 130 and a plurality of thrusters 140. The plurality of thrusters 140, moreover, can include thrusters 141, 142, 143, 144, 145, 146, 147, 148, and 149. One of ordinary skill in the art would appreciate that additional thrusters (such as thrusters, not shown, directed to expel propellant in the opposite direction of thrusters 145 and 146 on the opposite side of body 100, as well as a further thruster providing opposite thrust to thruster 149) can also be affixed to body 100 in order to provide complete three-dimensional momentum capability using the plurality of thrusters 140. Moreover, additional thrusters (providing, for example, a range of differing momentum transfer value capabilities, a range of differing momentum transfer rates, and/or a range of differing momentum transfer periods) can also be affixed to body 100 without a loss of generality. Furthermore, although the thrusters depicted in FIG. 1 appear configured to provide fixed torque values about axes of rotation of body 100, one of ordinary skill in the art would appreciate that the plurality of thrusters 140 can include thrusters positioned at other non-centered points on body 100 (such as at an edge-point or other "corner" of body 100), or centered about body 100 so as to efficiently generate other torque or force on body 100 by selectively generating thrust from a subset of the plurality of thrusters 140. Further still, each thruster of the plurality of thrusters 140 can be commanded individually or in concert with others to provide the commanded thrust from thruster controller 160. The complete plurality of thrusters 140 can be under control of thruster controller 160. Body 100 can also include sensor 120 (or sensors 120, without loss of generality), where sensor(s) 120 can include, among other things, star trackers, rate gyroscopes, and/or other devices capable of measuring the motion, orientation, and rate of body 100. Body 100 can also include control unit 110, which can include an interface to sensor(s) 120, CMG array 130 and thruster controller 160. Control unit 110 can also have access to information representing a desired orientation and motion (i.e., attitude and rate) of body 100 at a given time. Accordingly, consistent with this disclosure, control unit 110 can be configured to compute a difference between body 100 motion and orientation in real-time or a difference expected at some future time (absent a disturbance, or with an expected disturbance) as determined by sensor(s) 120, and a desired motion and orientation of body 100 at that time or a future time. Taking the computed difference between a measured attitude and rate of body 100 and a desired attitude and rate of body 100 as an error, control unit 110 can be configured to provide appropriate commands or instruction set to thruster controller 160 and CMG array 130 in order to apply forces and torques to body 100 in real-time to arrive at the desired attitude and rate for body 100 at that time or at a time in the future.

Details associated with CMG array 130 consistent with this disclosure are provided below in FIGS. 2-23. A CMG array, for example, can include a plurality of single gimbal control moment gyroscopes (SGCMG). Although this disclosure addresses certain mechanics associated with SGCMGs, one of ordinary skill in the art will appreciate that aspects of the disclosure and claims can be implemented with CMGs other than SGCMGs, such as, without limitation, double gimbal control moment gyroscopes (DGCMGs).

Figures 2, 3:
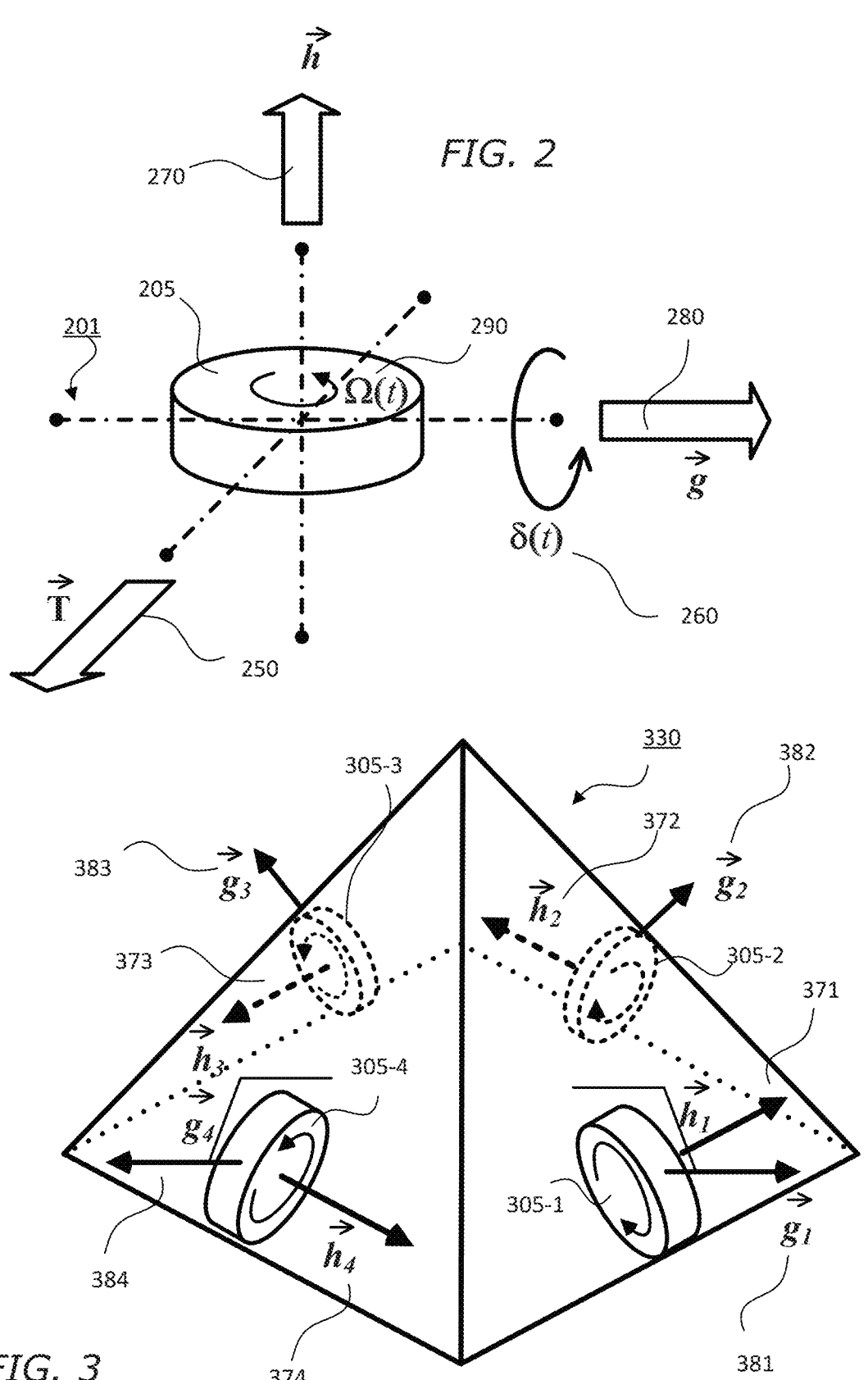
FIG. 2 depicts a single-gimballed flywheel (or rotor) and gimbal axis consistent with a component of a CMG array in this disclosure, including vector orientations of momentum and torque.
FIGS. 3 and 4 depicting aspects of a 4 CMG pyramid array consistent with this disclosure.

FIG. 2 depicts a single-gimballed flywheel 205 (a spinning rotor) and gimbal axis 280 consistent with this disclosure. Flywheel angular frequency $\Omega(t)$ 290 can be a constant rate (such as in units of radians/second). Gimbal angle $\delta(t)$

260 can be a function of time, consistent with this disclosure. Angular momentum direction 270 (where angular momentum is denoted by the variable $\vec{h}$) will be orthogonal to both the gimbal axis 280 and the torque direction 250, as depicted by three-dimensional axes 201. For single-gimballed flywheel 205 depicted in FIG. 2, rotating at a constant angular frequency $\Omega$, which generates angular momentum $\vec{h}$, a rotation rate about gimbal axis 280 by an amount $$\dot{\delta} = \frac{\partial \delta}{\partial t}$$

yields a torque: $\vec{T} = \dot{\delta}\vec{g} \times \vec{h}/|\vec{g}|$, where $\vec{g}/|\vec{g}|$ is a unit vector in the direction of the gimbal axis 280. Generally, rotation about gimbal axis 280 through gimbal angle $\delta$ 260 is accomplished using a motorized gimbal (not shown). As used herein, each SGCMG device, or equivalent, in a CMG array that generates torque through the rotation of a single-gimballed flywheel 205 about a gimbal axis 280 through gimbal angle $\delta$ 260 will be referred to as a gimballed rotor, a CMG gimbal, and/or gimballed $CMG_i$ (where "i" can take on integer values). It is understood that the term gimballed rotor, as used herein, can corresponds to a gimballed momentum wheel, gimballed reaction wheel, gimballed flywheel, or any gimballed device with rotating inertial mass capable of storing angular momentum.

FIG. 3 depicts a 4 CMG pyramid array 330 consistent with the disclosure. 4 CMG pyramid array 330 includes single-gimballed flywheel 305-1 with gimbal axis $\vec{g}_1$ 381, single-gimballed flywheel 305-2 with gimbal axis $\vec{g}_2$ 382, single-gimballed flywheel 305-3 with gimbal axis $\vec{g}_3$ 383, and single-gimballed flywheel 305-4 with gimbal axis $\vec{g}_4$ 384. Each of the flywheels that make up 4 CMG pyramid array 330 contribute an angular momentum vector. Specifically, single-gimballed flywheel 305-1 contributes angular momentum $\vec{h}_1$ 371, single-gimballed flywheel 305-2 contributes angular momentum $\vec{h}_2$ 372, single-gimballed flywheel 305-3 contributes angular momentum $\vec{h}_3$ 373, and single-gimballed flywheel 305-4 contributes angular momentum $\vec{h}_4$ 374. Because each of the respective gimbal axes associated with each gimbal for each single-gimballed flywheel is orthogonal to the respective angular momentum contributed by the single-gimballed flywheel, the resulting torque from each gimballed flywheel, due to rotation about each gimbal axis, is orthogonal to both each gimbal axis and the respective flywheel angular momentum direction. Accordingly, the combination of the direction of the torque and the angular momentum vector for each CMG gimbal defines a plane perpendicular to the gimbal axis. As depicted in FIG. 3, this plane, referred to as a "momentum plane" for each CMG gimbal, will be the four planes forming each of the four "sides" of the square pyramid solid depicted in FIG. 3.

Figure 4:
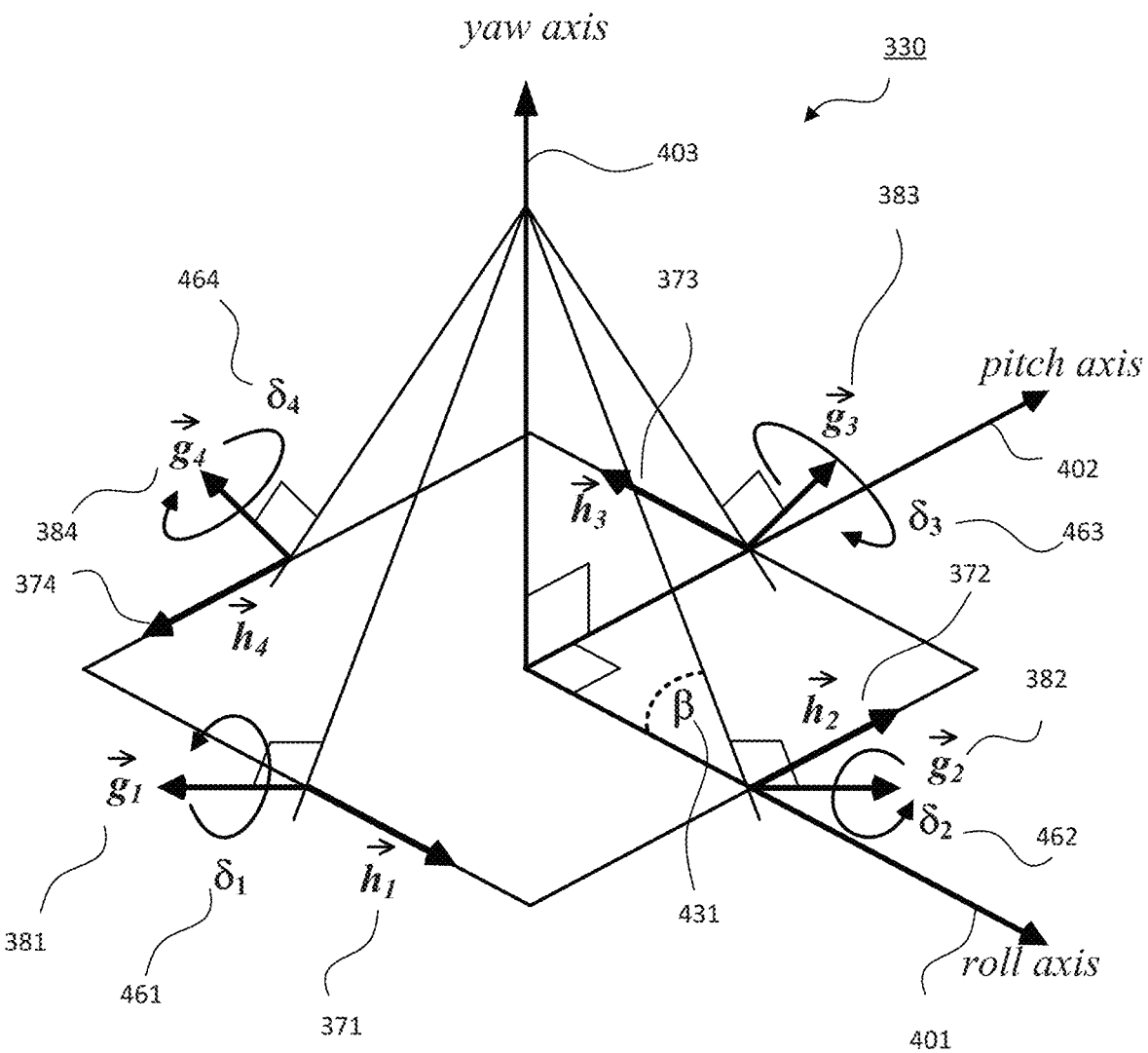

FIG. 4 depicts further aspects of the 4 CMG pyramid array of FIG. 3 consistent with this disclosure. While the flywheels are not explicitly depicted, the gimbal axes 381, 382, 383, and 384 are shown, as are the angular momentum vectors 371, 372, 373, and 374. For reference, yaw axis 403, roll axis 401, and pitch axis 402 are shown in FIG. 4. Each of the gimbal axes has an associated gimbal angle, shown in FIG. 4 as: gimbal angle $\delta_1$ 461, gimbal angle $\delta_2$ 462, gimbal angle $\delta_3$ 463, and gimbal angle $\delta_4$ 464. Where 4 CMG pyramid array 330 exhibits momentum planes that coincide with the sides of a square pyramid solid, then the momentum plane for each CMG gimbal will have the same skew angle $\beta$ 431 shown in FIG. 4 (where the depicted angle is for the momentum plane associated with angular momentum $\vec{h}_2$ 372 and is the angle the momentum plane makes with the roll/pitch plane).

Figure 5:
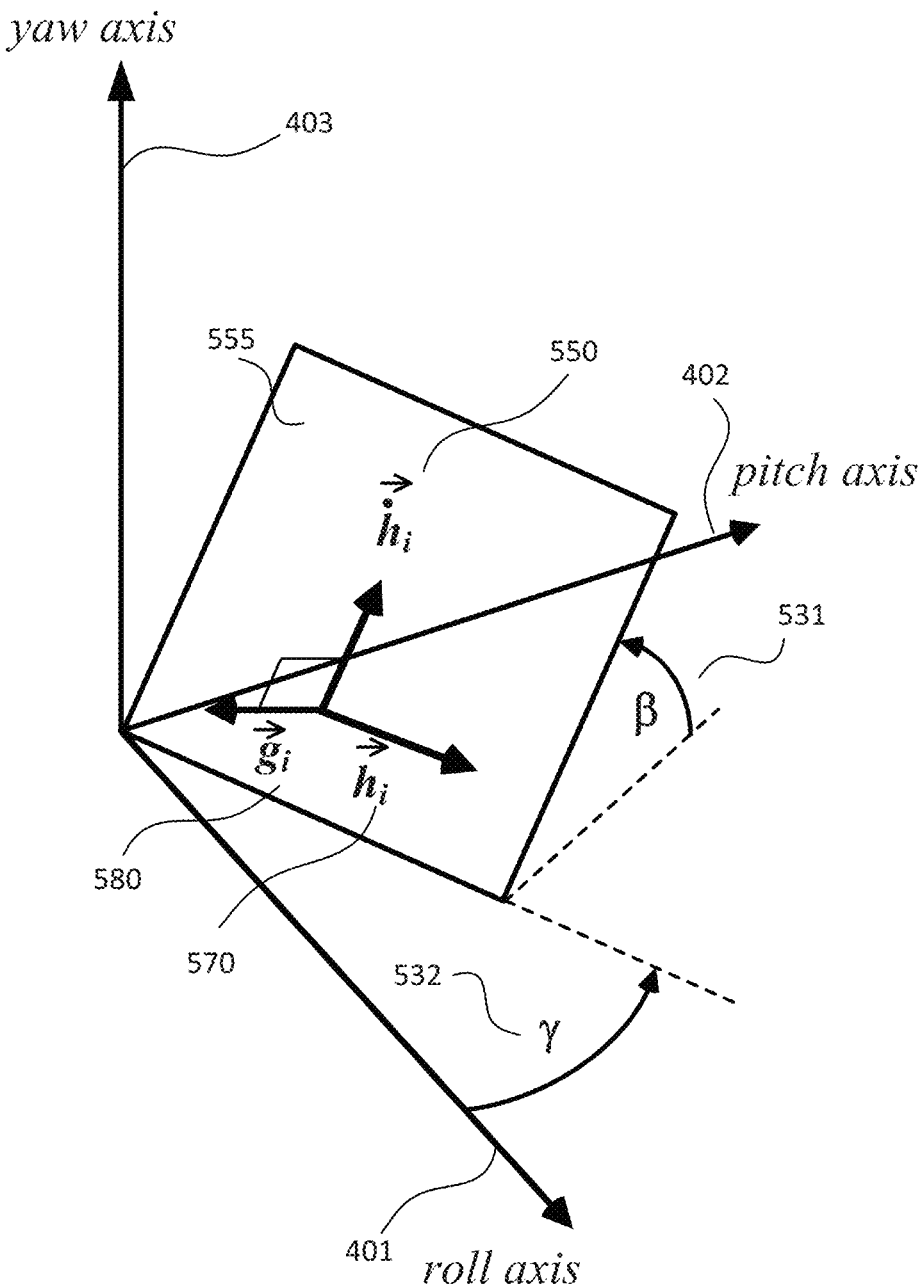
FIG. 5 illustrates a momentum plane, skew angle, and clocking angle consistent with single-gimballed CMG arrays as disclosed herein.

FIG. 5 provides further clarification to the relevant momentum plane geometry of single-gimballed CMG arrays consistent with this disclosure, relative to yaw axis 403, roll axis 401, and pitch axis 402. Specifically, momentum plane 555 is orthogonal to gimbal axis $\vec{g}_i$ 580 (representing, for example, the ith CMG gimbal in an array of 1 to N CMG gimbals). Furthermore, momentum plane 555 is defined by the ith torque 550

$$\left( \dot{\vec{h}}_i = \frac{\partial \delta_i}{\partial t} \vec{g}_i \times \vec{h}_i / |\vec{g}_i| \right)$$

and the orthogonal ith momentum vector 570 (or $\vec{h}_i$). Clocking angle $\gamma$ 532 is the angle that a line-determined by the intersection of the momentum plane 555 with the plane determined by the roll axis 401 and the pitch axis 402—makes with roll axis 401. Skew angle $\beta$ 531 is the angle that momentum plane 555 makes with the plane determined by the roll axis 401 and the pitch axis 402.

Figure 6:
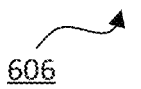
FIGS. 6-8 depict aspects of CMG arrays consistent with this disclosure.
Figure 6:
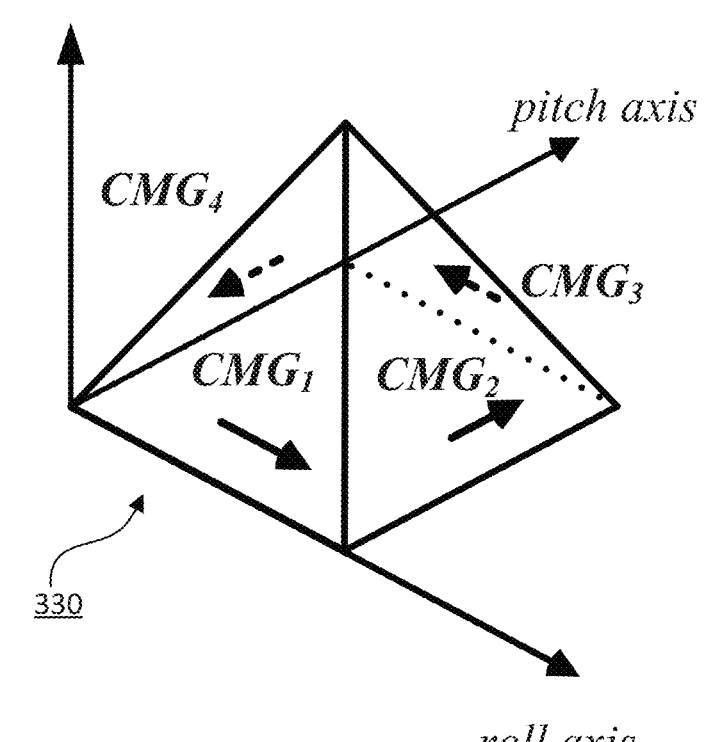

Based on the notation used in FIG. 5, FIG. 6 provides a view of 4 CMG pyramid array 330 and table 606 provides exemplary momentum plane geometry variables (i.e., skew angle $\beta$ and clocking angles $\gamma$) associated with each gimballed CMG$_i$ in the 4 CMG pyramid array 330. One of ordinary skill in the art will appreciate, for example, that skew angle $\beta$ in table 606 can take on values other than 53° in any 4 CMG pyramid array geometry consistent with this disclosure. (Although, where the momentum planes form the sides of a "regular" solid, the skew angle $\beta$ for each momentum plane will be the same.) Moreover, one of ordinary skill in the art would appreciate that the clocking angles $\gamma$ in table 606, being defined relative to roll axis 401 in the plane determined by roll axis 401 and pitch axis 402, can also take on other values consistent with this disclosure—the relevant clocking angle relationship for a 4 CMG pyramid geometry being only the 90° difference value between subsequent clocking angles $\gamma$.

Figure 7:
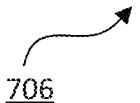
Figure 7:
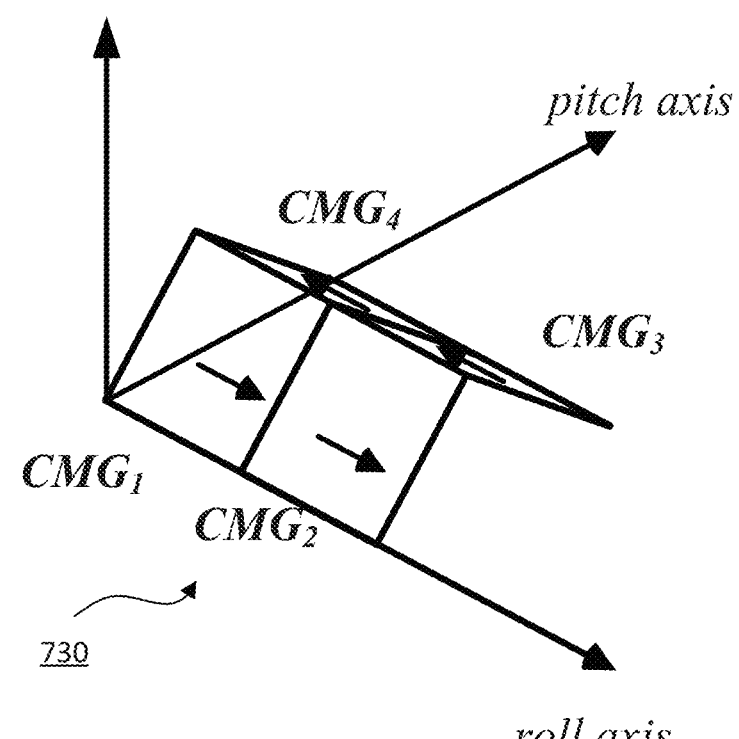

FIGS. 3, 4, and 6 depicted 4 CMG pyramid array 330, where the geometry associated the 4 CMG pyramid array is a commonly studied CMG array geometry. Generally, CMG arrays include at least 3 CMG gimballed rotors in order to access momentum vectors in all three-dimensions of momentum space. In practice, CMG arrays will include 4 or more CMG gimballed rotors in order to both (i) access momentum vectors in all three-dimensions of momentum space; and (ii) to provide for some "null" control of the CMG gimballed rotors (i.e., control of a plurality of CMG gimbals in CMG array 130 affixed to body 100 that produces no net momentum exchange with body 100). One of ordinary skill in the art would appreciate that there can be a variety of reasons for ensuring that a CMG array allows for "null" manipulation of gimballed rotors. Accordingly, the 4 CMG pyramid array geometry provides a convenient model for study. Consistent with this disclosure, however, CMG array 130 can be a CMG array with any number of CMG gimballed rotors—preferably 3 or more. FIG. 7, for example, depicts 4 CMG roof array 730 and table 706 presents an exemplary geometry for the gimballed rotor momentum planes in a 4 CMG roof array configuration. Again, one of ordinary skill in the art will appreciate that skew angle $\beta$ in table 706 can take on values other than 45° in any 4 CMG roof array geometry consistent with this disclosure. Moreover, one of ordinary skill in the art would appreciate that the clocking angles $\gamma$ in table 706 can also take on other values consistent with this disclosure—the relevant clocking angle relationship for a 4 CMG roof array geometry being the 180° difference value between the clocking angles $\gamma$ associated with the momentum planes for gimbal CMG$_2$ and gimbal CMG$_3$, and the 0° difference value between the clocking angles $\gamma$ associated with the momentum planes for gimbal CMG$_1$ and gimbal CMG$_2$, and the 0° difference value between the clocking angles $\gamma$ associated with the momentum planes for gimbal CMG$_3$ and gimbal CMG$_4$.

Figure 8:
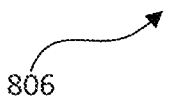
Figure 8:
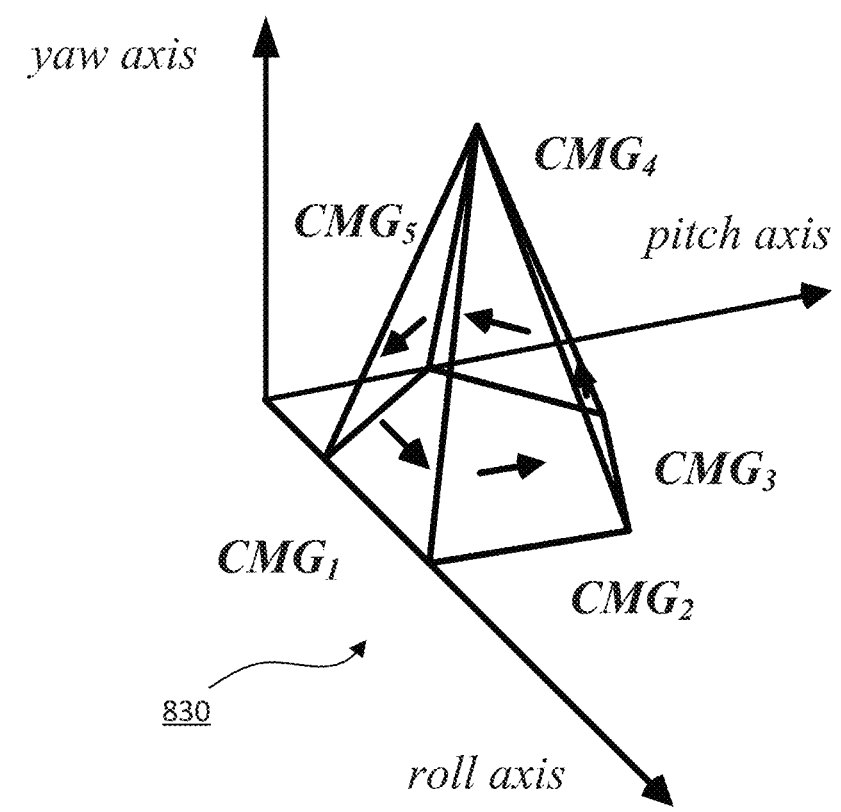

Further still, FIG. 8 depicts 5 CMG pyramid array 830 and table 806 presents an exemplary geometry for a 5 CMG pyramid array configuration. Again, one of ordinary skill in the art will appreciate that skew angle $\beta$ in able 806 can take on values other than 53° in any 5 CMG pyramid array geometry consistent with this disclosure. Moreover, one of ordinary skill in the art would appreciate that the clocking angles $\gamma$ in table 806 can also take on other values consistent with this disclosure—the relevant relationship for a 5 CMG pyramid array geometry being the 72° difference value between subsequent clocking angles $\gamma$.

Returning to the 4 CMG pyramid array 330, FIGS. 9-12 relate to the classification of singularities in three-dimensional momentum space. FIGS. 9A-E present 4-CMG configuration that is simplified in order to introduce the concept of singularities. In particular, FIG. 9A depicts the orientation of the gimbal axes $\vec{g}_1$, $\vec{g}_2$, $\vec{g}_3$, and $\vec{g}_4$ of the 4 CMG array 330 of FIG. 4 when the skew angle $\beta$ 431 is equal to 0°. Specifically, each of the gimbal axes $\vec{g}_1$, $\vec{g}_2$, $\vec{g}_3$, and $\vec{g}_4$ (i.e., reference numbers 381, 382, 383, and 384, respectively) will all be oriented in the direction of the yaw axis 403 when the skew angle $\beta$ 431 is equal to 0°. This orientation of gimballed flywheels is depicted as configuration 930 in FIG. 9A, and yaw/roll/pitch axes 901A depicts the relative orientation of yaw axis 403 with the gimbal axes. FIG. 9B depicts the orientation of the angular momentum vectors $\vec{h}_1$, $\vec{h}_2$, $\vec{h}_3$, and $\vec{h}_4$ of the 4 CMG array 330 of FIG. 4 in configuration 930 (that is, when the skew angle $\beta$ 431 is equal to 0°). Each of the angular momentum axes $\vec{h}_1$, $\vec{h}_2$, $\vec{h}_3$, and $\vec{h}_4$ (i.e., reference numbers 371, 372, 373, and 374, respectively) are depicted in FIG. 9B as having the orientation (at least initially) that these vectors have in FIG. 4. Again yaw/roll/pitch axes 901B depicts the relative orientation of the roll and pitch axes with the angular momentum vectors $\vec{h}_1$, $\vec{h}_2$, $\vec{h}_3$, and $\vec{h}_4$. Because the sum of the vectors $\vec{h}_1$, $\vec{h}_2$, $\vec{h}_3$, and $\vec{h}_4$ in FIG. 9B equal 0 (that is, $\vec{h}_1 + \vec{h}_2 + \vec{h}_3 + \vec{h}_4 = 0$), the configuration 930 depicted FIG. 9B is known as a "0 h" singularity, FIGS. 9C, 9D, and 9E depict, respectively, a "4 h" singularity (configuration 931, a "2 h" singularity (configuration 932), and another "0 h" singularity (configuration 933). The "4 h" singularity configuration 931 can be obtained from the configuration 930 of FIG. 9B by: rotating angular momentum $\vec{h}_2$ about gimbal axis $\vec{g}_2$ (from FIG. 9A)

by a gimbal angle $\delta_2$ of –90°; rotating angular momentum $\vec{h_3}$ about gimbal axis $\vec{g_3}$ (from FIG. 9A) by a gimbal angle $\delta_3$ of 180°; and rotating angular momentum $\vec{h_4}$ about gimbal axis $\vec{g_4}$ (from FIG. 9A) by a gimbal angle $\delta_4$ of 90°. The "4 h" singularity is understood to be a "saturation" singularity, as it represents the maximum amount of angular momentum that can be exhibited by the 4 CMG array 330 (with a skew angle β 431 equal to 0°) in any particular direction: it is on the saturation boundary of the available momentum values.

Figures 9A, 9B:
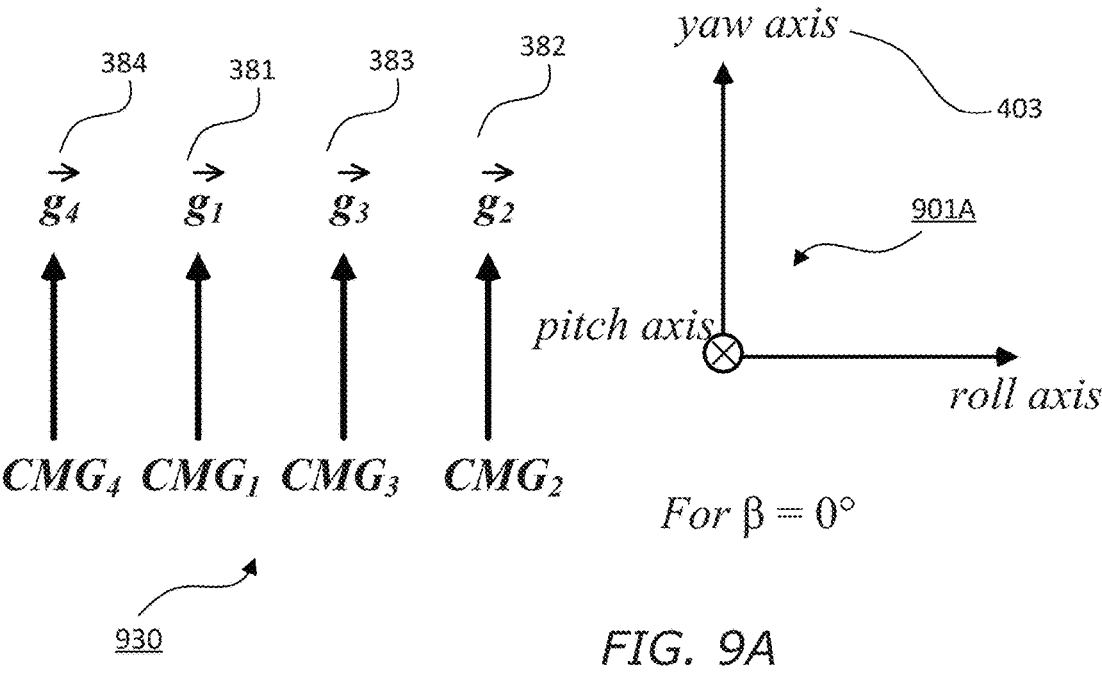
FIGS. 9A-E illustrate singularities where the angular momentum vectors all lie in a single plane.
Figures 9C, 9D, 9E:
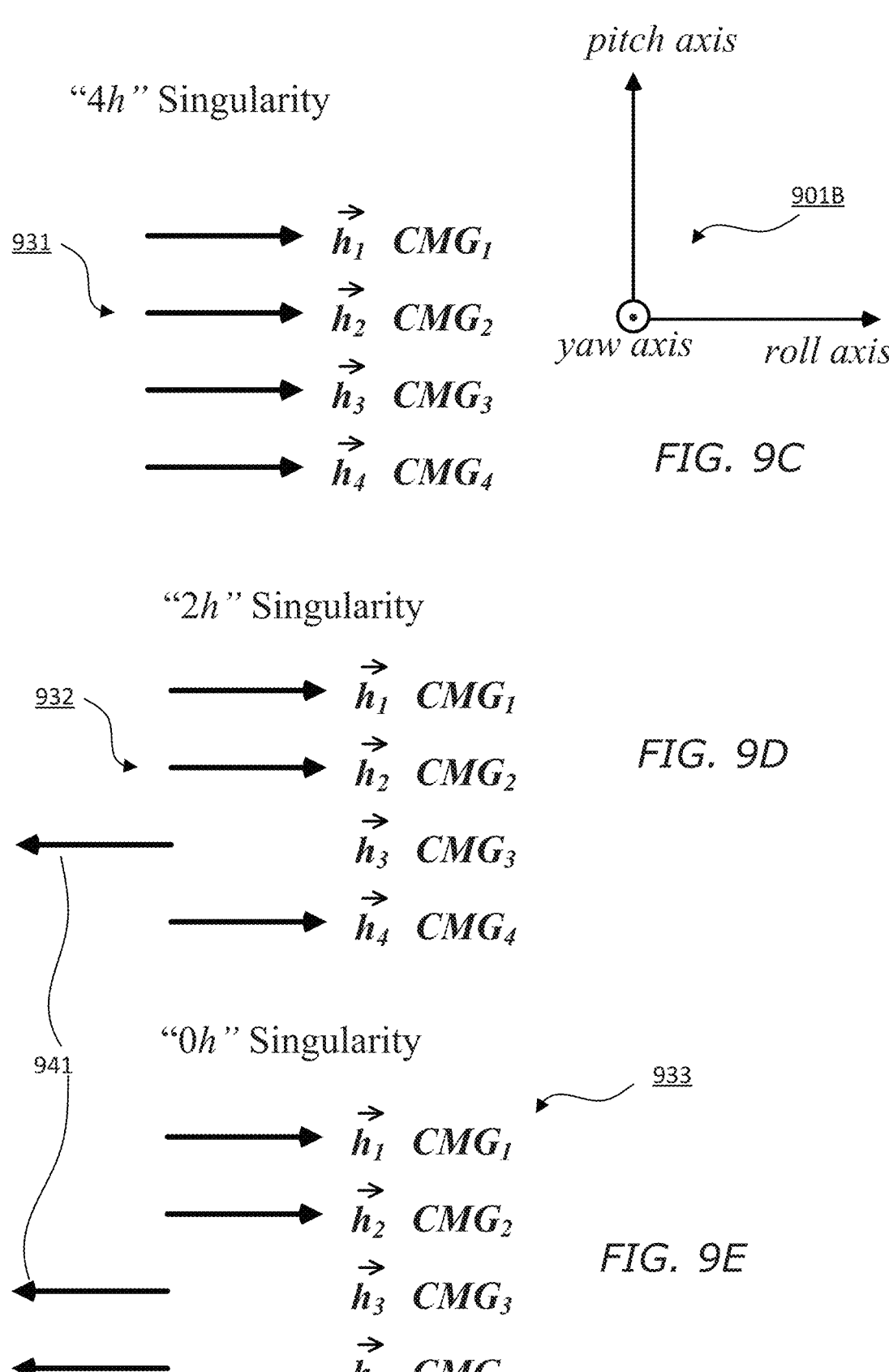

Similarly, the "2 h" singularity configuration 932 can be obtained from the configuration 930 of FIG. 9B by: rotating angular momentum $\vec{h_2}$ about gimbal axis $\vec{g_2}$ (from FIG. 9A) by a gimbal angle $\delta_2$ of –90°; and rotating angular momentum $\vec{h_4}$ about gimbal axis $\vec{g_4}$ (from FIG. 9A) by a gimbal angle $\delta_4$ of 90°. The "0 h" singularity configuration 933 can be obtained from the configuration 930 of FIG. 9B by: rotating angular momentum $\vec{h_2}$ about gimbal axis $\vec{g_2}$ (from FIG. 9A) by a gimbal angle $\delta_2$ of –90°; and also rotating angular momentum $\vec{h_4}$ about gimbal axis $\vec{g_4}$ (from FIG. 9A) by a gimbal angle $\delta_4$ of –90°. Also shown in FIGS. 9D and 9E is an example of a "hung gyro" 941: that is a gimballed flywheel whose angular momentum vector opposes one or more angular momentum vectors of the remaining array components. In the case of a 4 CMG array, a "hung gyro" condition can occur in a "0 h" state or a "2 h" state. One or ordinary skill in the art would appreciate that, for a 4 CMG array, "0 h" singularity configurations are always escapable, "2 h" singularity configurations are escapable using various techniques, and "4 h" singularity configurations are not escapable (because, for example, such a configuration corresponds to a saturation singularity).

Figure 10A:
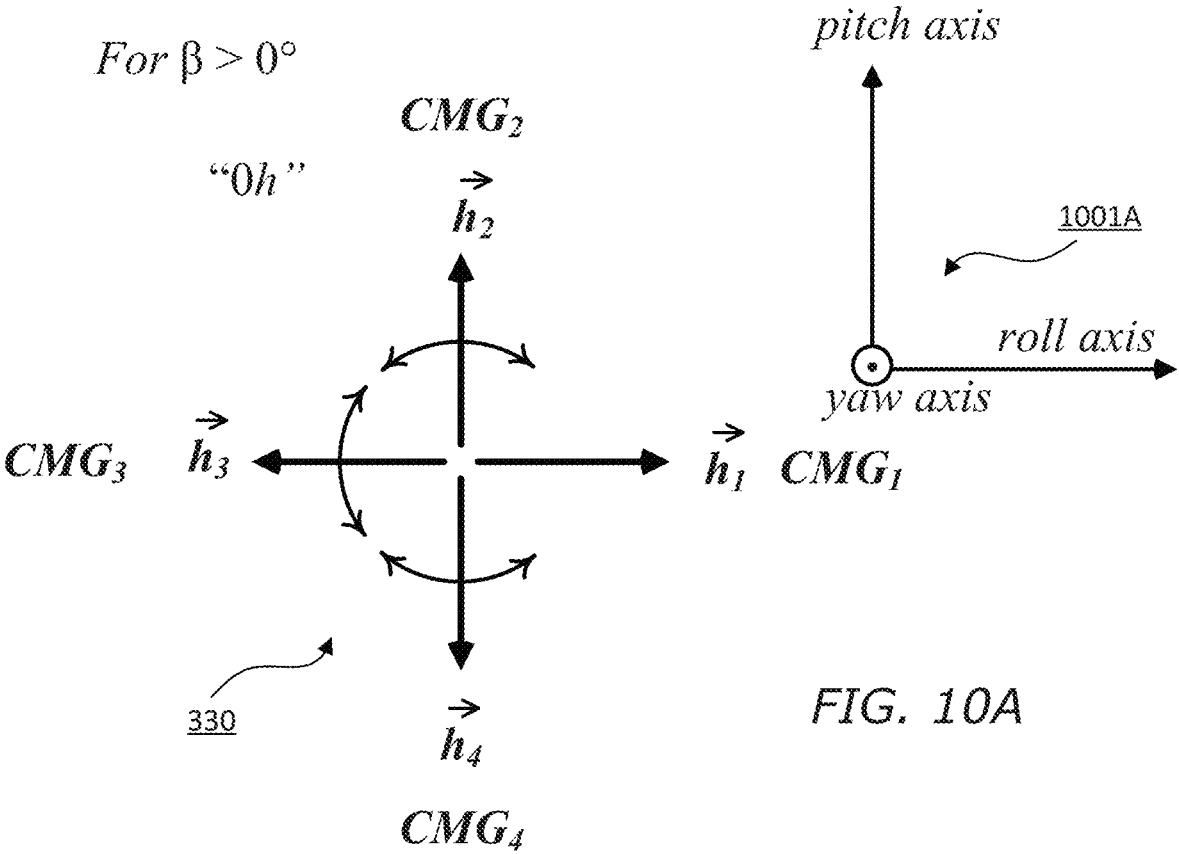
FIGS. 10A-B depicts an orientation of momentum vectors in the 4 CMG pyramid array of FIGS. 6, 9A, and 9B which results in a "4 h" singularity consistent with this disclosure.

With the above background considered in the case when the skew angle β 431 is set to 0°, we next consider the case where the skew angle β 431 is greater than 0° (but less than 90°). This is depicted in FIG. 10A, which includes an alternate view of the yaw/roll/pitch axis 1001A associated with 4 CMG pyramid array 330 of FIG. 6. For example, consistent with the 4 CMG pyramid array geometry of table 606, 4 CMG pyramid array 330 of FIG. 10A depicts angular momentum $\vec{h_1}$ parallel to the roll axis, angular momentum $\vec{h_3}$ anti-parallel to the roll axis, angular momentum $\vec{h_2}$ parallel to the pitch axis, and angular momentum $\vec{h_4}$ antiparallel to the pitch axis. As is clear from the relative orientation of the angular momentum vectors in FIG. 10A, the net angular momentum value of 4 CMG pyramid array 330 in FIG. 10A is zero: $\vec{h_1}+\vec{h_2}+\vec{h_3}+\vec{h_4}=0$. Accordingly, 4 CMG pyramid array 330 with gimbals oriented as depicted in FIG. 10A is referred to as a "0 h" state.

Suppose that one wanted to re-orient the angular momentum vectors of 4 CMG pyramid array 330 in order to access the maximum angular momentum in the positive roll-axis direction. As shown by the swivel arrows in FIG. 10A, one could re-orient angular momentum $\vec{h_3}$ by 180°, as well as re-orient angular momentum $\vec{h_2}$ by 90° in a "clockwise" direction, and re-orient angular momentum $\vec{h_4}$ by 90° in a "counter-clockwise" direction (from the perspective shown in FIG. 10A). (According to the relevant gimbal angles, i.e., gimbal angle $\delta_1$ 461, gimbal angle $\delta_2$ 462, gimbal angle $\delta_3$ 463, and gimbal angle $\delta_4$ 464 from FIG. 4, such a re-orientation corresponds to a change from $(\delta_1, \delta_2, \delta_3, \delta_4)=(0°, 0°, 0°, 0°)$ to $(\delta_1, \delta_2, \delta_3, \delta_4)=(0°, -90°, 180°, 90°)$.) One must also consider the impact of each of the four momentum planes that make up the 4 CMG pyramid array 330. For example, because of skew angle β and clocking angle γ associated with each the momentum planes for gimbal $CMG_2$ and gimbal $CMG_4$, the decision to re-orient angular momentum $\vec{h_2}$ by 90° in a "clockwise" direction will cause $\vec{h_2}$ to point away from the "apex" of the square pyramid shape in three-dimension momentum space (and therefore acquire skew angle β towards the negative yaw axis, away from the roll/pitch plane), and the decision to re-orient angular momentum $\vec{h_4}$ by 90° in a "counter-clockwise" direction will cause $\vec{h_4}$ to point towards the "apex" of the square pyramid shape in three-dimensional momentum space (and therefore acquire skew angle β towards the yaw axis, away from the roll/pitch plane). Moreover, re-orienting angular momentum $\vec{h_3}$ by 180° means that $\vec{h_3}$ does not acquire any skew angle in three-dimensional momentum space in its new orientation towards the positive roll axis.

Figure 10B:
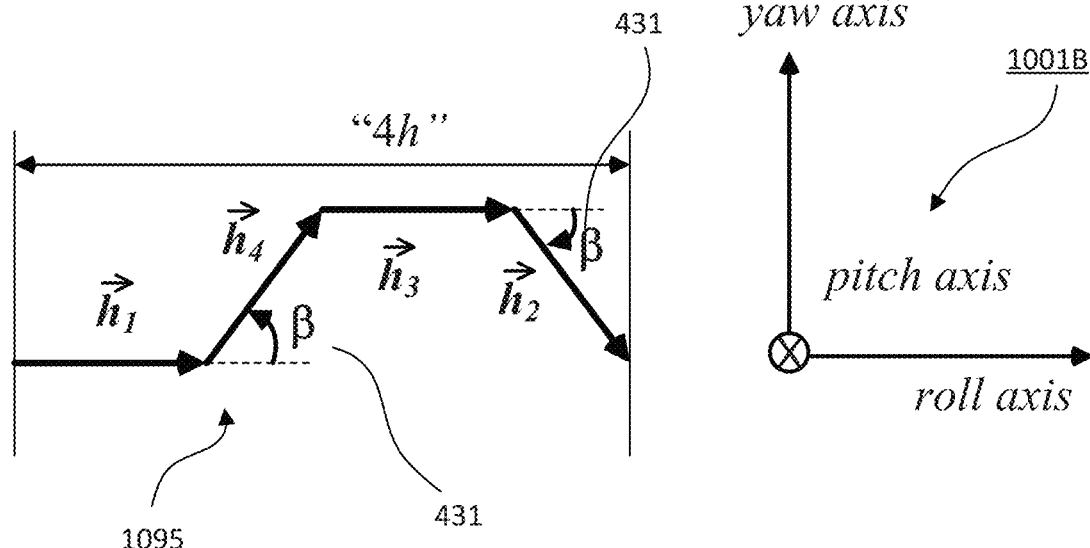

The "net" angular momentum that is available to 4 CMG pyramid array 330 with all of the angular momentum vectors oriented (as much as possible) towards the positive roll-axis is shown in FIG. 10B, along with the relevant perspective of yaw/roll/pitch axis 1001B, where the pitch axis is directed into the page and the yaw axis is directed towards the top of the page. Lining up all angular momentum vectors as much as possible, subject to the constraint that each is confined to its respective momentum plane, produces the vector sum 1095 depicted in FIG. 10B. Note that the skew angle β 431, reduces the contributions available from angular momentum $\vec{h_2}$ and angular momentum $\vec{h_4}$ in the direction of the positive roll axis. The extent of this vector sum 1095 in three-dimensional momentum space lands this sum on the surface referred to as the "4 h" saturation singularity surface. One of ordinary skill in the art will appreciate that, although it is referred to as a "4 h" singularity, the vector sum can be less than the magnitude "4 h" due to the constraints imposed by each of the momentum planes associated with gimbals $CMG_1$, $CMG_2$, $CMG_3$, and $CMG_4$. In addition, one of ordinary skill in the art would appreciate that such "saturation" singularities are classified as "external" singularities.

Figures 11, 12:
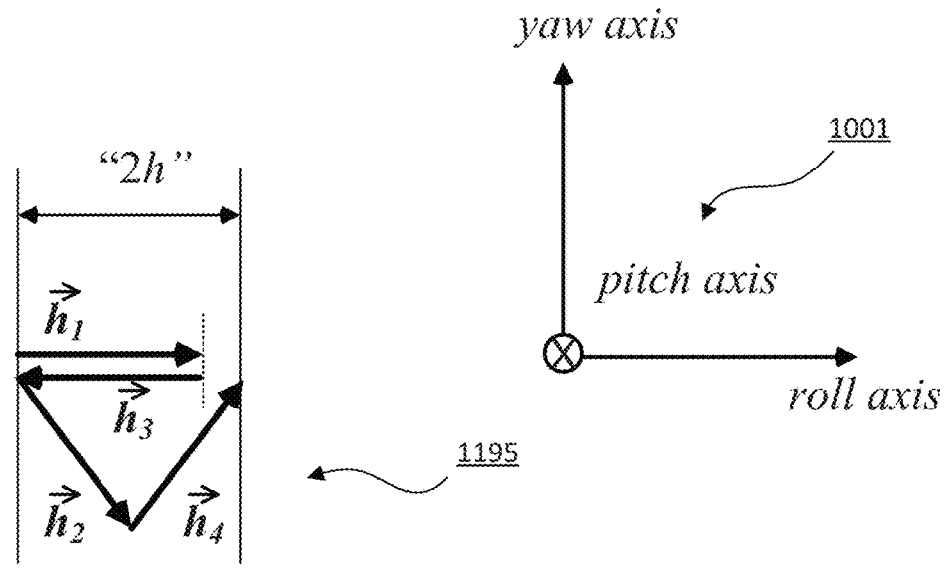
FIGS. 11 and 12 depict orientations of momentum vectors in the 4 CMG pyramid array of FIGS. 6 and 10A, both of which result in a "2 h" singularity consistent with this disclosure.

FIGS. 11 and 12 depict alternate states where at least one of the gimbal orientations, in the roll-axis direction, is counter to another of the gimbal orientations. Suppose that one wanted to re-orient the angular momentum vectors of 4 CMG pyramid array 330 shown in FIG. 10A such that angular momentum $\vec{h_1}$ and angular momentum $\vec{h_3}$ were left unchanged (and so produced no net angular momentum), but both angular momentum $\vec{h_2}$ and angular momentum $\vec{h_4}$ were re-oriented to point—as much as possible—in the direction of the positive roll-axis. The "net" angular momentum that is available to 4 CMG pyramid array 330 in such a configuration is shown in FIG. 11, along with the relevant perspective of yaw/roll/pitch axis 1001, where the pitch axis is directed into the page and the yaw axis is directed towards the top of the page. (Again, according to the relevant gimbal angles, i.e., gimbal angle $\delta_1$ 461, gimbal angle $\delta_2$ 462, gimbal angle $\delta_3$ 463, and gimbal angle $\delta_4$ 464 from FIG. 4, such a re-orientation corresponds to a change from $(\delta_1, \delta_2, \delta_3, \delta_4)=(0°, 0°, 0°, 0°)$ to $(\delta_1, \delta_2, \delta_3, \delta_4)=(0°, -90°, 0°, 90°)$.)

Accordingly, keeping angular momentum $\vec{h_1}$ and angular momentum $\vec{h_3}$ unchanged from FIG. 9 (i.e., the "0 h" state), but re-orienting angular momentum $\vec{h_2}$ and angular momentum $\vec{h_4}$ towards the positive roll-axis, subject to the constraint that each is confined to its respective momentum plane, produces the vector sum 1195 depicted in FIG. 11. Again, the effect of skew angle β reduces the contributions available from angular momentum $\vec{h_2}$ and angular momentum $\vec{h_4}$ in the direction of the positive roll axis. The extent of this vector sum 1195 in three-dimensional momentum space lands this sum on a surface referred to as a "2 h" singularity surface. Again, one of ordinary skill in the art will appreciate that, although it is referred to as a "2 h" singularity, the vector sum can be less than the magnitude "2 h" due to the constraints imposed by each of the momentum planes associated with gimbals $CMG_1$, $CMG_2$, $CMG_3$, and $CMG_4$.

Alternatively, suppose that one wanted to re-orient the angular momentum vectors of 4 CMG pyramid array 330 shown in FIG. 10 such that angular momentum $\vec{h_1}$, angular momentum $\vec{h_3}$, and angular momentum $\vec{h_4}$ are left unchanged from the "4 h" configuration depicted in FIG. 10B, but angular momentum $h_2$ is re-oriented to point—as much as possible—in the direction of the negative roll-axis. (According to the relevant gimbal angles, i.e., gimbal angle $\delta_1$ 461, gimbal angle $\delta_2$ 462, gimbal angle $\delta_3$ 463, and gimbal angle $\delta_4$ 464 from FIG. 4, such a re-orientation corresponds to a change from $(\delta_1, \delta_2, \delta_3, \delta_4)=(0°, -90°, 180°, 90°)$ to $(\delta_1, \delta_2, \delta_3, \delta_4)=(0°, 90°, 180°, 90°)$.) The "net" angular momentum that is available to 4 CMG pyramid array 330 in such a configuration is shown in FIG. 12, along with the relevant perspective of yaw/roll/pitch axis 1001, where the pitch axis is directed into the page and the yaw axis is directed towards the top of the page. Keeping angular momentum $\vec{h_1}$, angular momentum $\vec{h_3}$, and angular momentum $\vec{h_4}$ unchanged from the "4 h" configuration depicted in FIG. 10, but re-orienting angular momentum $\vec{h_2}$ to point—as much as possible—in the direction of the negative roll-axis, subject to the constraint that each is confined to its respective momentum plane, produces the vector sum 1295 depicted in FIG. 12. Again, the extent of this vector sum 1295 in three-dimensional momentum space also lands this sum on a surface referred to as a "2 h" singularity surface. One of ordinary skill in the art would appreciate that the "singularities" associated with the gimbal orientations shown in FIGS. 11 and 12 are referred to as "internal" singularities.

Figure 15:
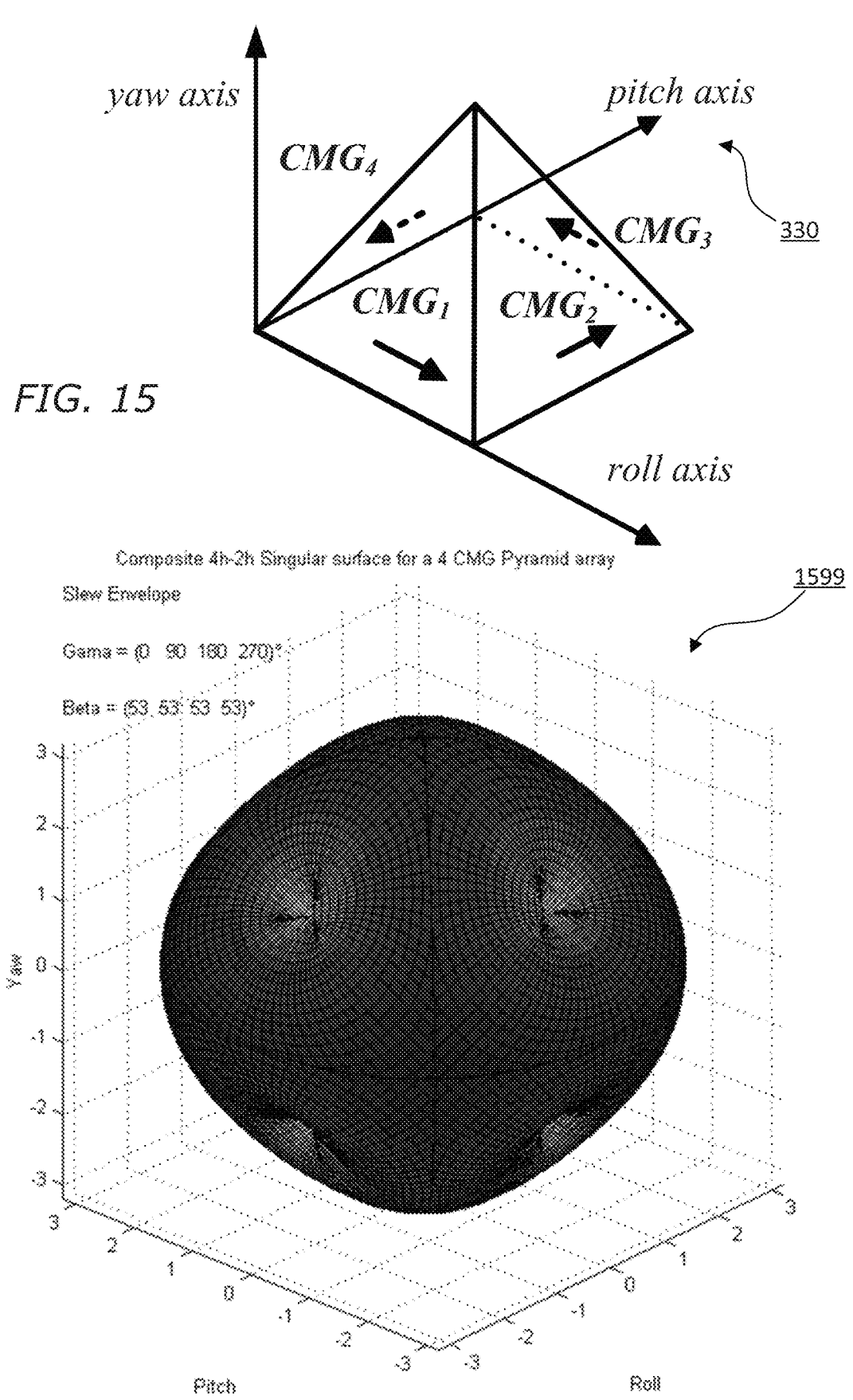
FIG. 15 depicts a composite "4 h" and "2 h" singularity surface for the 4 CMG pyramid array of FIG. 6 in three-dimensional momentum space consistent with this disclosure.

FIG. 13 depicts a complete "4 h" saturation singularity surface associated with 4 CMG pyramid array 330 with the momentum plane geometry shown in table 606. Likewise, FIG. 14 depicts a complete "2 h" singularity surface associated with 4 CMG pyramid array 330 with the momentum plane geometry shown in table 606. A composite of the "4 h" surface of FIG. 13 and the "2 h" surface of FIG. 14 is shown in FIG. 15.

According to a similar analysis, one can determine a "4 h" saturation singularity surface for the 4 CMG roof array 730 of FIG. 7. In this regard, FIG. 16 depicts a "4 h" saturation singularity surface associated with 4 CMG roof array 730 with the momentum plane geometry shown in table 706. One of ordinary skill in the art would appreciate, for example, that the three-dimensional momentum space "inside" surface 1699 of FIG. 16 is more "open" than the three-dimensional momentum space enclosed within surface 1399 of FIG. 13.

FIGS. 10-16 relate to CMG arrays with an even number of gimbals. Similarly, in the circumstance where a CMG array includes 2N gimbals (with integer N>2), then such a CMG array would have an associated "2Nh" saturation singularity surface in three-dimensional momentum space. Further still, there would also be manifolds associated internal singularities of order "(2N−2)h," and "(2N−4)h", etc.

Figure 17:
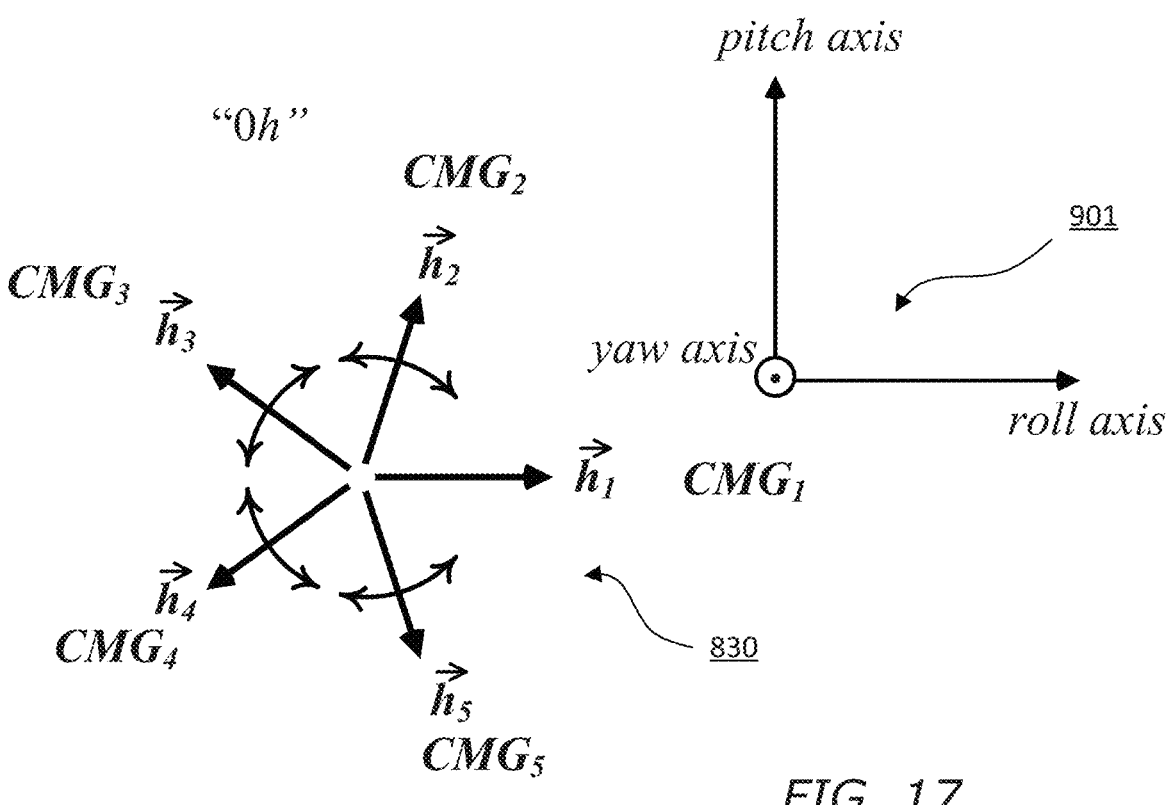
FIG. 17 depicts a further aspect of the 5 CMG pyramid array of FIG. 8 consistent with this disclosure.

The case where a CMG array includes N single-gimballed CMG flywheels and N is an odd number can be analyzed in a similar manner. FIG. 17 depicts an alternate view of the yaw/roll/pitch axis 901 associated with 5 CMG pyramid array 830 of FIG. 8. For example, consistent with the 5 CMG pyramid array geometry of table 806, 5 CMG pyramid array 830 of FIG. 17 depicts angular momentum $\vec{h_1}$ parallel to the roll axis, angular momentum $\vec{h_2}$ at an angle of 72° to the positive roll axis, angular momentum $\vec{h_3}$ at an angle of 144° to the positive roll axis, angular momentum $\vec{h_4}$ at an angle of 36° to the negative roll axis, and angular momentum $\vec{h_5}$ at an angle of −72° to the positive roll axis, Again, as is clear from the relative orientation of the angular momentum vectors in FIG. 17, the net angular momentum value of 5 CMG pyramid array 830 in FIG. 17 is zero: $\vec{h_1}+\vec{h_2}+\vec{h_3}+\vec{h_4}+\vec{h_5}=0$. Accordingly, a 5 CMG pyramid array 830 with gimbals oriented as depicted in FIG. 17 is referred to as a "0 h" state.

Suppose that one wanted to re-orient the angular momentum vectors of 5 CMG pyramid array 830 in order to access the maximum angular momentum in the positive roll-axis direction. As shown by the swivel arrows in FIG. 17, one could re-orient angular momentum $\vec{h_3}$ by 144° in a clockwise direction, re-orient angular momentum $\vec{h_4}$ by 144° in a counter-clockwise direction, as well as re-orient angular momentum $\vec{h_2}$ by 72° in a "clockwise" direction, and re-orient angular momentum $\vec{h_5}$ by 72° in a "counter-clockwise" direction (from the perspective shown in FIG. 17). Again, one must consider the impact of each of the five momentum planes that make up the 5 CMG pyramid array 830. In this case, each of the angular momentum vectors $\vec{h_2}$, $\vec{h_3}$, $\vec{h_4}$, and $\vec{h_5}$ will acquire some orientation towards or away from the yaw axis as a result of the skew angle β.

Figure 18:
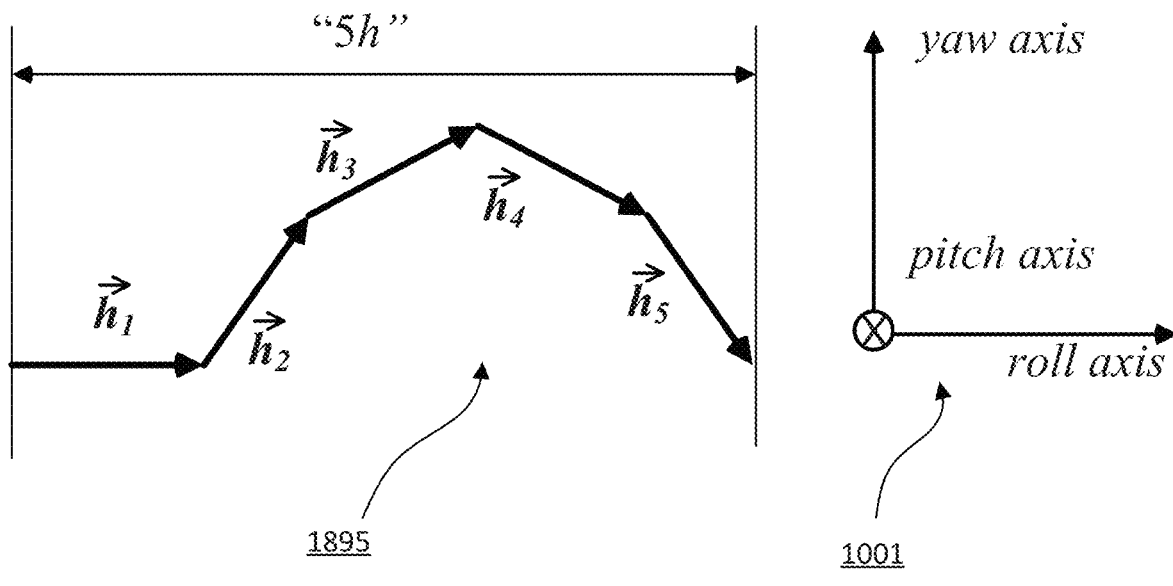
FIG. 18 depicts an orientation of momentum vectors in the 5 CMG pyramid array of FIGS. 8 and 17 which results in a "5 h" saturation singularity consistent with this disclosure.

The "net" angular momentum that is available to 5 CMG pyramid array 830 with all of the angular momentum vectors oriented (as much as possible) towards the positive roll-axis is shown in FIG. 18, along with the relevant perspective of yaw/roll/pitch axis 1001, where the pitch axis is directed into the page and the yaw axis is directed towards the top of the page. Lining up all angular momentum vectors as much as possible, subject to the constraint that each is confined to its respective momentum plane, produces the vector sum 1895 depicted in FIG. 18. Note that the skew angle β, reduces the contributions available from angular momentum $\vec{h_2}$, angular momentum $\vec{h_3}$, angular momentum $\vec{h_4}$, and angular momentum $\vec{h_5}$ in the direction of the positive roll axis. The extent of this vector sum 1895 in three-dimensional momentum space lands this sum on the surface referred to as the "5 h" saturation singularity surface. Again, one of ordinary skill in the art will appreciate that, although it is referred to as a "5 h" singularity, the vector sum can be less than the magnitude "5 h" due to the constraints imposed by each of the momentum planes associated with gimbals $CMG_1$, $CMG_2$, $CMG_3$, $CMG_4$, and $CMG_5$.

Figure 19:
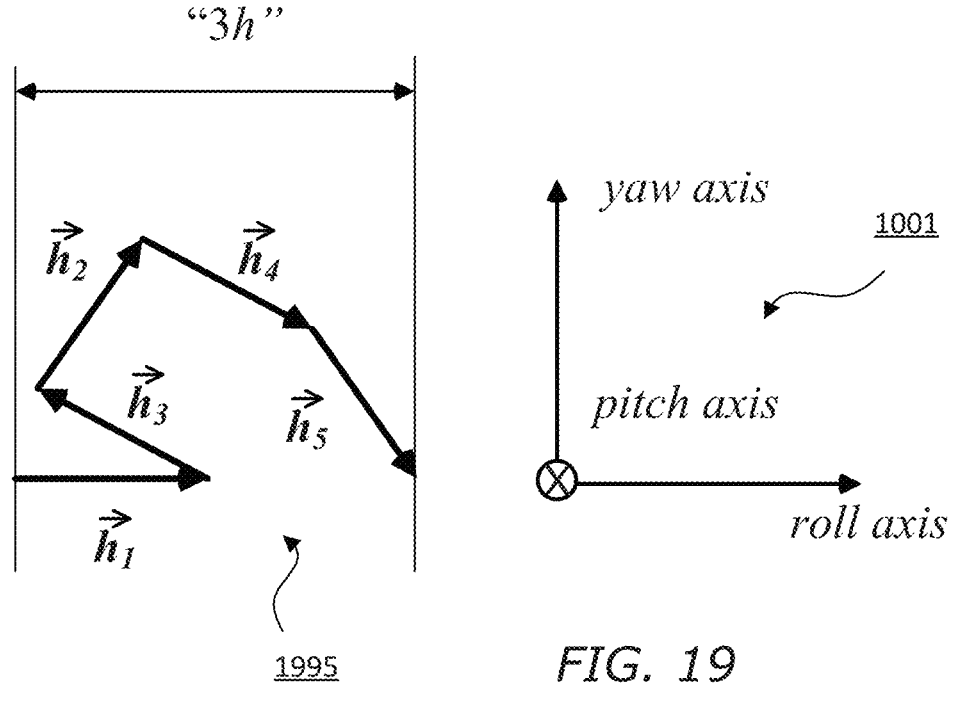
FIGS. 19 and 20 depict orientations of momentum vectors in the 5 CMG pyramid array of FIGS. 8 and 17, which result in a "3 h" and "1 h" singularity, respectively, consistent with this disclosure.
Figure 20:
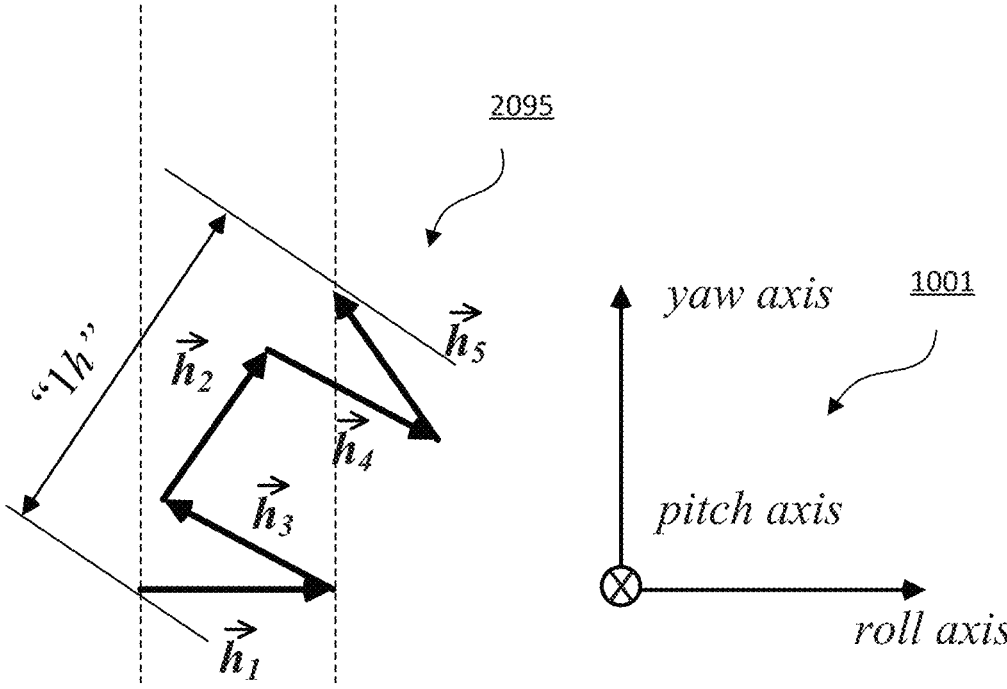

FIGS. 19 and 20 depict alternate states where at least one of the gimbal orientations, in the roll-axis direction, is counter to another of the gimbal orientations in a 5 CMG pyramid array. Specifically, suppose that one wanted to re-orient the angular momentum vectors of 5 CMG pyramid array 330 shown in FIG. 18 such that angular momentum $\vec{h_1}$, angular momentum $\vec{h_2}$, angular momentum $\vec{h_4}$, and angular momentum $\vec{h_5}$ are left unchanged, but that angular momentum $\vec{h_3}$ was re-oriented to point—as much as possible—in the direction of the negative roll-axis. The "net" angular momentum that is available to 5 CMG pyramid array 830 in such a configuration is shown in FIG. 19, along with the relevant perspective of yaw/roll/pitch axis 1001, where the pitch axis is directed into the page and the yaw axis is directed towards the top of the page. Again, the effect of skew angle β reduces the contributions available from angular momenta $\vec{h_2}$, $\vec{h_4}$, and $\vec{h_5}$ in the direction of the positive roll axis, and the angular momentum $\vec{h_3}$ in the direction of the negative roll axis. The extent of this vector sum 1995 in three-dimensional momentum space lands this sum on a surface referred to as a "3 h" singularity surface. Again, one of ordinary skill in the art will appreciate that, although it is referred to as a "3 h" singularity, the vector sum can be less than the magnitude "3 h" due to the constraints imposed by each of the momentum planes associated with gimbals $CMG_1$, $CMG_2$, $CMG_3$, $CMG_4$, and $CMG_5$.

Additionally, suppose that one wanted to further re-orient the angular momentum vectors of 5 CMG pyramid array 830 shown in FIG. 19 such that angular momenta $\vec{h_1}$, $\vec{h_2}$, $\vec{h_3}$, and $\vec{h_4}$ are left unchanged from the "3 h" configuration depicted in FIG. 19, but angular momentum $\vec{h_5}$ is re-oriented to point—as much as possible—in the direction of the negative roll-axis. The "net" angular momentum that is available to 5 CMG pyramid array 830 in such a configuration is shown in FIG. 20, along with the relevant perspective of yaw/roll/pitch axis 1001, where the pitch axis is directed into the page and the yaw axis is directed towards the top of the page. Keeping angular momenta $\vec{h_1}$, $\vec{h_2}$, $\vec{h_3}$, and $\vec{h_4}$ unchanged from the "3 h" configuration depicted in FIG. 19, but re-orienting angular momentum $\vec{h_5}$ to point—as much as possible—in the direction of the negative roll-axis, subject to the constraint that each is confined to its respective momentum plane, produces the vector sum 2095 depicted in FIG. 20. Here, the extent of this vector sum 2095 in three-dimensional momentum space lands this sum on a surface referred to as a "1 h" singularity surface. Again, one of ordinary skill in the art would appreciate that the "singularities" associated with the gimbal orientations shown in FIGS. 19 and 20 are referred to as "internal" singularities.

Figure 21:
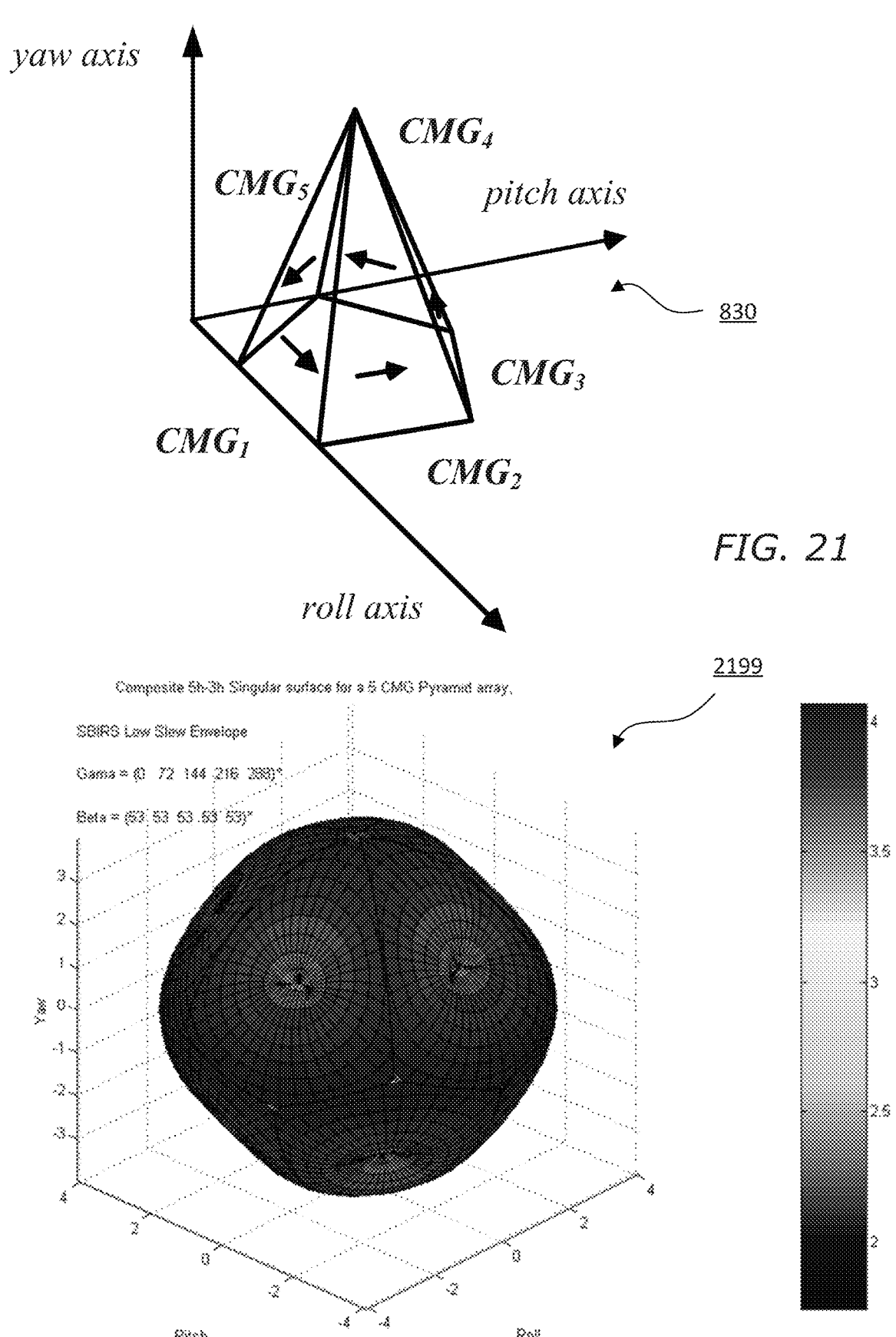
FIG. 21 depicts a composite "5 h" and "3 h" singularity surface for the 5 CMG pyramid array of FIGS. 8 and 17 in three-dimensional momentum space consistent with this disclosure.
Figure 22:
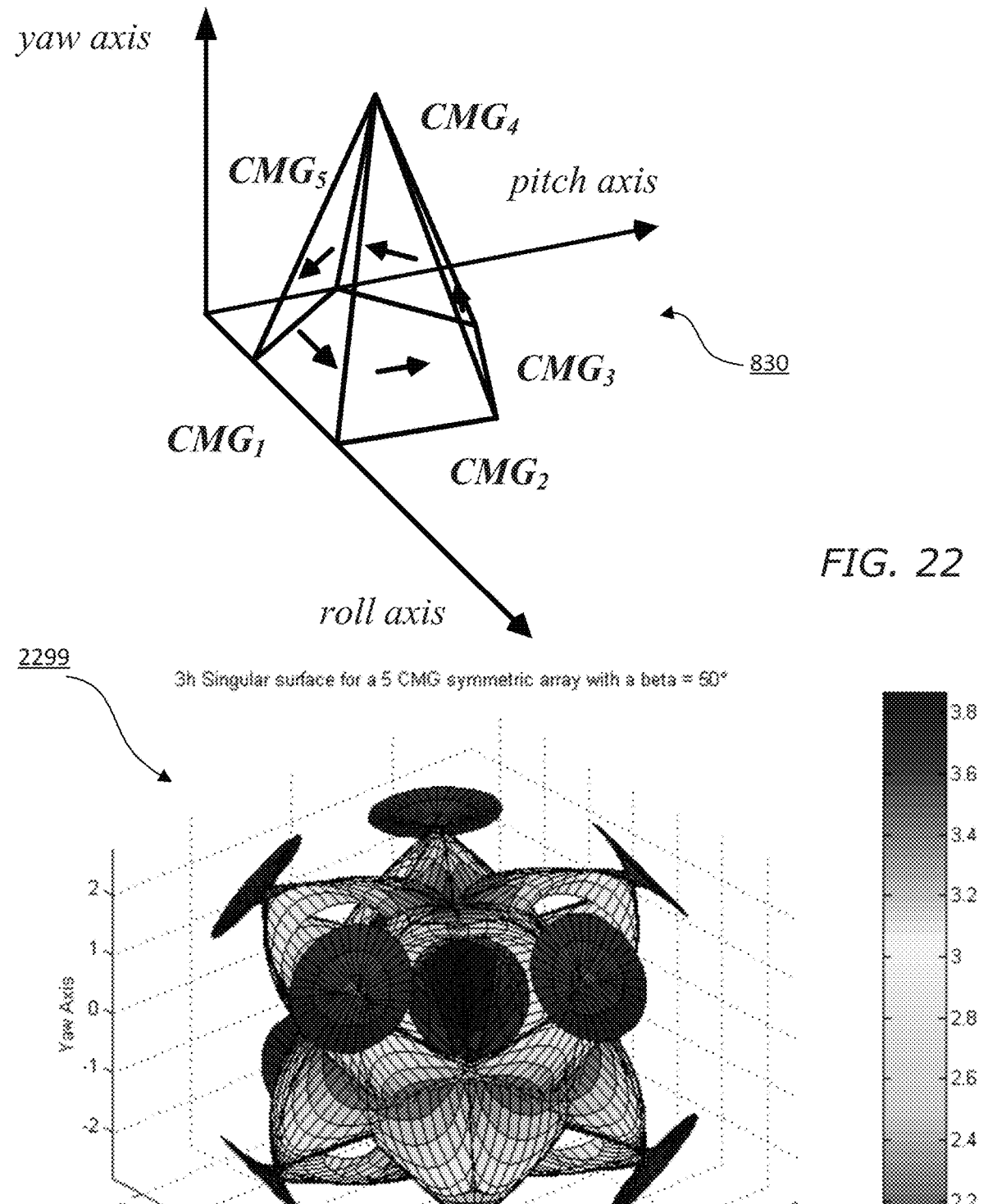
FIG. 22 depicts a "3 h" singularity surface for a 5 CMG pyramid array with a skew angle of 50° in three-dimensional momentum space consistent with this disclosure.

FIG. 21 depicts a composite "5 h" and "3 h" singularity surface associated with 5 CMG pyramid array 830 with the momentum plane geometry shown in table 806. FIG. 22 depicts a complete "3 h" singularity surface associated with 5 CMG pyramid array 830, but with a skew angle β of 50° (rather than the skew angle 53° cited in table 806).

In the circumstance where a CMG array includes 2N+1 gimbals (with integer N>2), then such a CMG array would have an associated "(2N+1)h" saturation singularity surface in three-dimensional momentum space. Further still, there would also be manifolds associated internal singularities of order "(2N−1)h," and "(2N−3)h", etc.

Figure 23:
FIG. 23 depicts a composite "6 h" and "4 h" singularity surface for the 6 CMG roof array according to the depicted table of skew angles and clocking angles in three-dimensional momentum space consistent with this disclosure.

As a further example, FIG. 23 depicts a composite "6 h" and "4 h" singularity surface associated with a 6 CMG roof array according to the momentum plane geometry shown in table 2306.

FIGS. 15, 16, 21, and 23 depict saturation surfaces in three-dimensional momentum space for, respectively, a 4 CMG pyramid array, a 4 CMG roof array, a 5 CMG pyramid array, and a 6 CMG roof array. The value of the vectors $\vec{h_i}$ for each of the gimbals $CMG_i$ determines the overall "size" of the momentum envelope that a CMG array can access. Generally, CMG array 130 for a given body 100 is desired to be configured such that the saturation surface associated with CMG array 130 extends well beyond the three-dimensional momentum space the body 100 is expected to access for attitude control. Control of CMG array 130 can also involve control laws designed to access as much of the momentum space within the momentum envelope while avoiding and/or escaping singularities that occur within the momentum envelope. In the examples provided above, for example, control laws can be developed to avoid and/or escape the manifold(s) in three-dimensional momentum space representing "2 h" singularities within the overall momentum space bounded by the "4 h" saturation surface of 4 CMG pyramid array 330. Similarly, control laws can be developed to avoid and/or escape the manifolds in three-dimensional momentum space representing "3 h" and "1 h" singularities within the overall momentum space bounded by the "5 h" saturation surface of 5 CMG pyramid array 830.

Notwithstanding the issues of singularity avoidance and escape, one would prefer that the saturation surface of CMG array 130 for body 100 extends well beyond the three-dimensional momentum space body 100 is expected to access for attitude control. However, for a massive body 100 and/or for rapid attitude control, the inertial mass required of CMG array 130 in order to "size" the momentum envelope of the CMG array so as to encompass a relatively large desired attitude control momentum space can be a limiting factor, and can make a desired momentum envelope impractical or unattainable due to practical limits on the inertial mass of CMG array 130 as part of body 100 to be controlled.

Suppose, for example, that one desired to rotate body 100 (which can be a spacecraft) at a rate of 3°/see, and that one is using 4 CMG roof array 730 with a particular mass, but the momentum envelope of 4 CMG roof array 730 at that mass is not able to exchange sufficient torque with body 100 to achieve a rate of 3°/sec. Rather, suppose that, if 4 CMG roof array 730 (at a specified mass) is operating at or near its saturation surface (such as surface 1699 in FIG. 16), the most torque that 4 CMG roof array 730 can exchange with body 100 would achieve a rotation rate of body 100 of 1°/sec.

In order to achieve a desired rotation rate for body 100 (or other operation on body 100) that exceeds the momentum envelope of CMG array 730, consistent with this disclosure, one can operate CMG array 730 and the plurality of thrusters 140 from the "0 h" state (for example) such that the momentum trajectory followed by body 100 (through momentum exchange with CMG array 730 and the plurality of thrusters 140) in three-dimensional momentum space at starts the origin point (0,0,0) of the roll/pitch/yaw coordinate system, moves to a point at or near the saturation surface of 4 CMG roof array 730 (such as saturation surface 1699 of FIG. 16), and then moves beyond the momentum envelope associated with the saturation surface in order to access a region of three-dimensional momentum space associated with the desired rotation rate (or other operation) of body 100 outside the momentum envelope.

Figure 24:
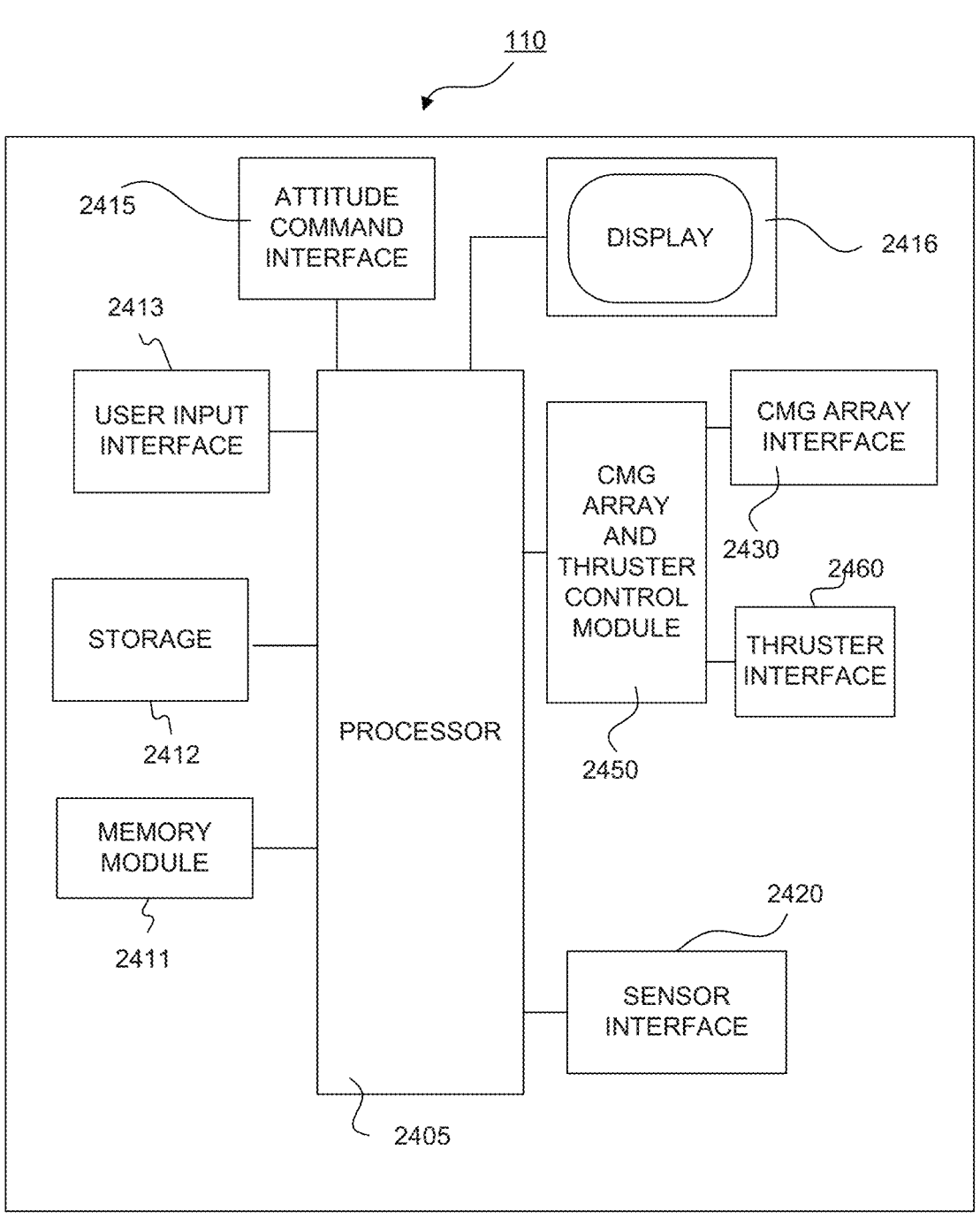
FIG. 24 depicts an exemplary control unit for attitude control of a body consistent with this disclosure.

FIG. 24 is a schematic diagram of control unit 110 consistent with this disclosure. Control unit 110 can include a processor 2405, a memory module 2411, a storage device 2412, an input interface 2413, a display device 2416, an attitude command interface 2415, a CMG array and thruster control module 2450, a CMG array interface 2430, a thruster interface 2460, and a sensor interface 2420. The control unit 110 can include additional, fewer, and/or different components than those listed above. The type and number of listed devices are exemplary only and not intended to be limiting.

The processor 2405 can be a central processing unit ("CPU") or a graphic processing unit ("GPU"). The processor 2405 can execute sequences of computer program instructions to perform various processes that will be explained in greater detail below. Although represented as a single unitary processor, one of ordinary skill in the art would appreciate that the operations and functions of processor 2405 can be implemented on any number of processors. The memory module 2411 can include, among other things, a random access memory ("RAM") and a read-only memory ("ROM"). Generally, memory module 2411 can be a non-transitory computer readable medium. The computer program instructions can be accessed and read from the ROM, or any other suitable memory location, and loaded into the RAM for execution by the processor 2405. The processor 2405 can include one or more printed circuit boards, and/or a microprocessor chip.

The storage device 2412 can include any type of mass storage suitable for storing information. For example, the storage device 2412 can include one or more hard disk devices, optical disk devices, or any other storage devices that provide data storage space. The storage device 2412 can store data related to a data processing process, such as the processing of data received from sensor(s) 120, and any intermediate data created during the data processing process. The storage device 2412 can also include analysis and organization tools for analyzing and organizing data and/or information contained therein.

In an embodiment, control unit 110 can be configured for access by a user using the input interface 2413. The input interface 2413 can be available for the user to input information into control unit 110, and can include, for example, a keyboard, a mouse, a touch screen and/or optical or wireless computer input devices. The user can input control instructions via the input interface 2413 to control the operation of, among other components, for example, sensor(s) 120, thruster controller 160, CMG array 130, processor 2405, CMG array and thruster control module 2450, as well as the operation of attitude command interface 2415.

Control unit 110 can also be configured to provide visualized information to the user via the display 2416. For example, the display 2416 can include a computer screen and make available a graphical user interface ("GUI") to the user. The display 2416 can display an image of a commanded trajectory in three-dimensional momentum space relative to momentum space associated with CMG array 130 and the plurality of thrusters 140. Consistent with another embodiment, the display 2416 can also display an abbreviated inspection report, or a simple indicator, to the user indicating certain characteristics of CMG array 130, plurality of thrusters 140, and/or body 100.

Attitude command interface 2415 can be configured to access inertial variables associated with a desired trajectory, attitude, or other operation for body 100. Attitude command interface 2415 can be configured to access stored information regarding a desired attitude and rate for body 100, or it can be configured to receive (such as through wireless signal means) a desired attitude and rate for either immediate attitude adjustment, or delayed attitude adjustment (i.e., attitude adjustment planned at some point in the future).

CMG array interface 2430 can be configured to provide a current measure of the state of CMG array interface 130 so that processor 2405 (using, for example, information from sensor interface 2420 and attitude command interface 2415 or user input interface 2413) and CMG array and thruster control module 2450 are able to determine what, if any, correction or instruction set needs to be provided to the CMG array 130 so as to re-orient body 100 to a desired attitude and/or rate. CMG array interface 2430 can also be configured to convey the appropriate commands to CMG array 130 (from processor 2405 and/or from CMG array and thruster control module 2450) to achieve a desired attitude and/or rate.

Likewise, thruster interface 2460 can be configured to provide a current measure of the state of the plurality of thrusters 140 (and/or the state of any individual thruster 141, 142, 143, 144, 145, 146, 147, 148, 149, etc.) so that processor 2405 (using, for example, information from sensor interface 2420 and attitude command interface 2415 or user input interface 2413) and CMG array and thruster control module 2450 are able to determine what, if any, correction or instruction needs to be provided to the thruster controller 160 so as to re-orient body 100 to a desired attitude and/or rate. Thruster interface 2460 can also be configured to convey the appropriate commands to thruster controller 160 (from processor 2405 and/or from CMG array and thruster control module 2450) to achieve a desired attitude and/or rate.

CMG array and thruster control module 2450, by itself, or in combination with one or more of: processor 2405, CMG array 130, and thruster controller 160 can be configured to manage the appropriate instruction set provided to and ultimately implemented by CMG array 130 and the plurality of thrusters 140 for attitude control of body 100. CMG array and thruster control module 2450 can also be configured to translate the appropriate state of, and settings associated with, CMG array 130 and the plurality of thrusters 140 to form the appropriate gimbal angle vector and thruster command vector at a given time. It will be understood that CMG array and thruster control module 2450 (when operating by itself, or in combination with one or more of: processor 2405, CMG array 130, and thruster controller 160) may be implemented in hardware, in software, or a combination of the two. When implemented in hardware, CMG array and thruster control module 2450 can be implemented as one or more hardware modules, such as one or more application specific integrated circuits. When implemented in software, CMG array and thruster control module 2450 can be implemented as one or more computer programs that are executed on one or more processors.

Figure 25:
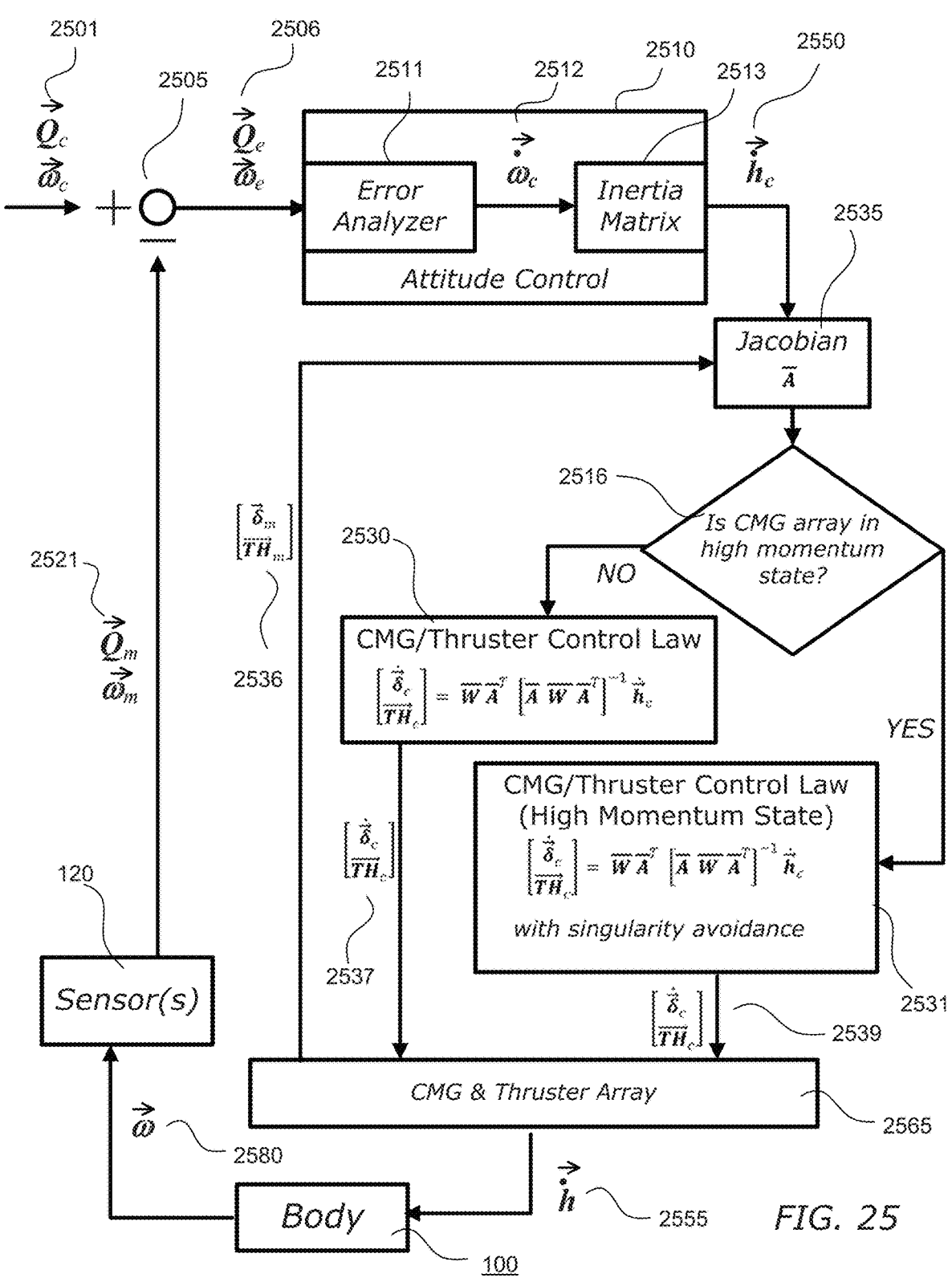
FIG. 25 depicts an exemplary control loop for attitude control consistent with this disclosure.
Figure 26:
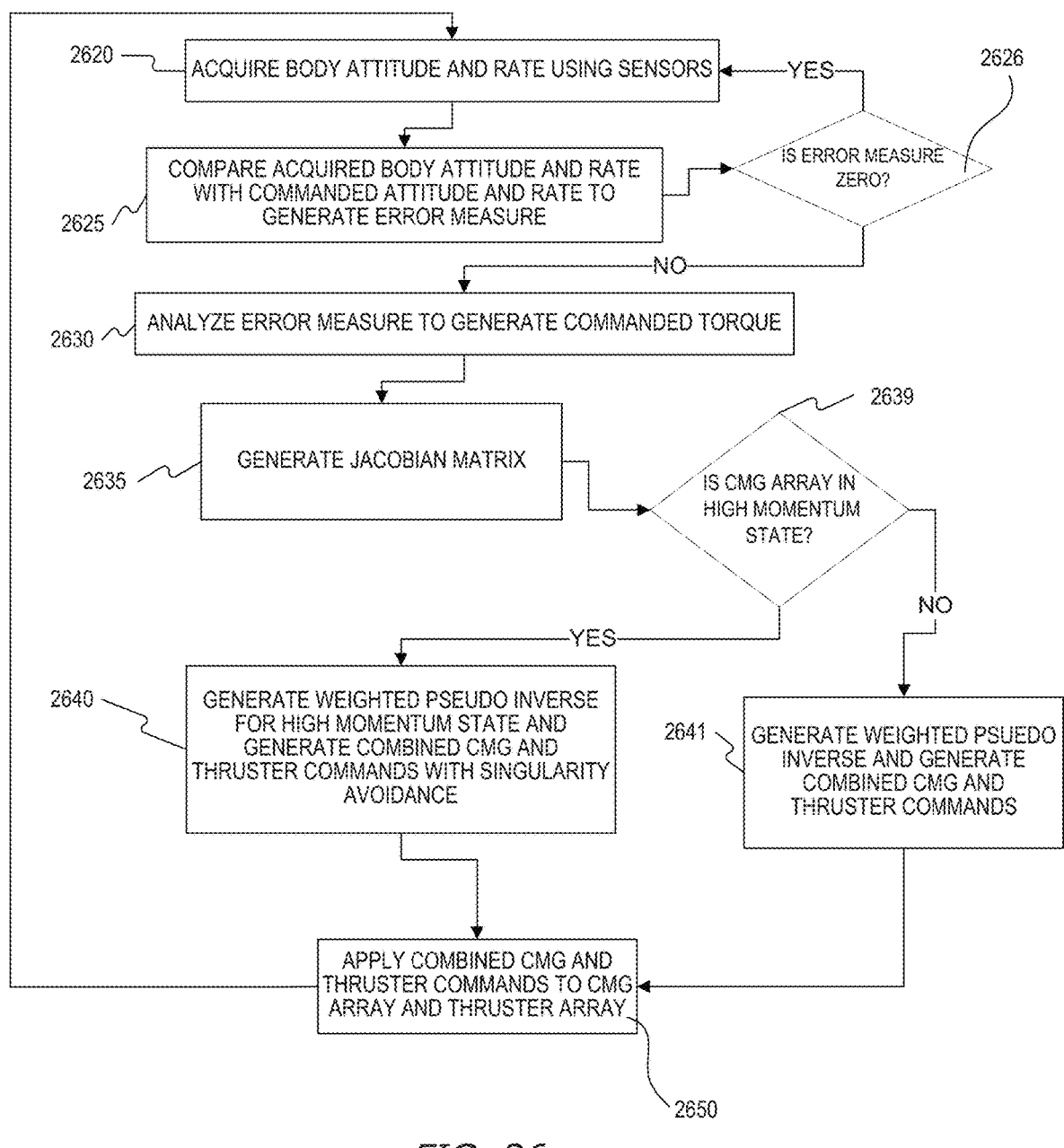
FIG. 26 depicts an exemplary flowchart for attitude control consistent with this disclosure.

FIG. 25 depicts an exemplary control loop consistent with this disclosure, and FIG. 26 depicts an exemplary flow chart of a method consistent with this disclosure. As depicted in FIG. 26, one can acquire an attitude and rate measure of body 100 using sensor(s) 120 (step 2620). A corresponding point in the control loop of FIG. 25 is the acquisition of a measured orientation and rate 2521 of body 100 (variables $\vec{Q}_m$ and $\vec{\omega}_m$) from sensor(s) 120. The orientation variable $\vec{Q}_m$ can be in the form of a quaternion, an Euler angle, or some other manner of parametrizing the attitude of body 100. The rate variable $\vec{\omega}_m$ can be an appropriate variable (which can be time dependent) associated with the body rate of body 100. Next, one can compare the acquired body 100 attitude and rate 2521 ($\vec{Q}_m$ and $\vec{\omega}_m$) with a desired or commanded attitude and rate of body 100 at that time (step 2625). In the control loop of FIG. 25, this is depicted where the measured orientation and rate 2521 ($\vec{Q}_m$ and $\vec{\omega}_m$) are input into the comparison node 2505, and the measured orientation and rate 2521 (variables $\vec{Q}_m$ and $\vec{\omega}_m$) are compared with a commanded orientation and rate 2501 (variables $\vec{Q}_c$ and $\vec{\omega}_c$). In terms of the control unit 110 depicted in FIG. 24, the command orientation and rate 2501 (variables $\vec{Q}_c$ and $\vec{\omega}_c$) may be provided (or acquired) through attitude command interface 2415. The output from comparison node 2505 is error orientation and rate values 2506 for body 100 (variables $\vec{Q}_e$ and $\vec{\omega}_e$). According to the flowchart of FIG. 26, if the error measure is zero (step 2626), then one can return to step 2620, and acquire an updated attitude and rate measure of body 100 using sensor(s) 120.

One of ordinary skill in the art would appreciate that even though the control loop of FIG. 25 and flowchart of FIG. 26 are presented in terms of a "real-time" measurements from sensor(s) 120 (variables $\vec{Q}_m$ and $\vec{\omega}_m$) that are compared with a commanded or desired orientation and rate (variables $\vec{Q}_c$ and $\vec{\omega}_c$) such that the error computation (variables $\vec{Q}_e$ and $\vec{\omega}_e$) also relates to a substantially "real-time" difference, one could use measured values of orientation and rate from sensor(s) 120 to project expected measured values of orientation and rate of body 100 at a future time, which could then be compared with commanded or desired orientation and rate (variables $\vec{Q}_c$ and $\vec{\omega}_c$) at that future time also. The resulting error computation (variables $\vec{Q}_e$ and $\vec{\omega}_e$) would also then correspond to an expected error in the orientation and rate of body 100 at that future time.

If the error measure of the orientation and rate 2506 of body 100 (variables $\vec{Q}_e$ and $\vec{\omega}_e$) is not zero (step 2626), then the error measure is analyzed to generate a command torque (step 2630). In the control loop of FIG. 25, this is depicted in attitude control block 2510. One of ordinary skill in the art would appreciate that there can be two operations that translate error measure 2506 to a command torque. First error analyzer 2511 can compute a command acceleration $\vec{\omega}_c$ 2512 (where a dot over a variable or vector denotes a time derivative). A command torque $\vec{h}_c$ 2550 can be obtained from the command acceleration $\vec{\omega}_c$ 2512 using the inertia matrix 2513 (J) of body 100: $\vec{h}_c = J\vec{\omega}_c$.

With the command torque $\vec{h}_c$ 2550 associated with body 100 determined, consistent with this disclosure, one can generate a Jacobian matrix $\overline{A}$ that, when applied to a combined gimbal rate and thrust command vector, generates said command torque vector $\vec{h}_c$ 2550 of body 100. This corresponds to block 2535 in the control loop of FIG. 25, and step 2635 in the flowchart of FIG. 26.

With the exception of the Jacobian matrix $\overline{A}$, and the just-referenced "combined gimbal rate and thrust command vector," the variables discussed above in connection with FIGS. 25 and 26 (i.e., $\vec{Q}_m$, $\vec{Q}_c$, $\vec{Q}_e$, $\vec{\omega}_m$, $\vec{\omega}_c$, $\vec{\omega}_e$, $\vec{\omega}_c$, $\vec{h}_c$) as well as the variables discussed earlier in connection with FIGS. 2-5, 9-12, and 17-20 (i.e., $\vec{h}_i$, $\vec{g}_i$, $\vec{T}$, $\vec{h}_i$) are all conventional three-dimensional vectors. Specifically, each of these vectors (indicated with boldface type and accented with a left-to-right arrow) has a magnitude and direction in three-dimensional momentum space. Indeed, three-dimensional momentum space was represented in FIGS. 4-23 through the use of the orthonormal bases: roll, pitch, and yaw. Moreover, inertia matrix 2513 (J) discussed above, would be understood by one of ordinary skill in the art to be a 3×3 matrix, as it carries the three-dimensional command acceleration $\vec{\omega}_c$ vector 2512 over to the three-dimensional command torque $\vec{h}_c$ vector 2550. (Other conventional reference frames can include a gimbal-based orthonormal reference frame which uses the labels: reference, quad, and gimbal axes).

Consistent with this disclosure, however, the "combined gimbal rate and thrust command vector," referenced above, is not a conventional vector in three-dimensional momentum space. Rather, it is a vector that operates on the space of available gimbal rates $\dot{\delta}_i$ (which is commensurate with the space of gimbal angles $\delta_i$) and effective thruster values $TH_j$ (where the effective thruster values $TH_j$ are understood to be normalized to gimbal rates, i.e., $\dot{\delta}_j$). Suppose that there are N gimballed rotors, and M effective thrusters (where each effective thruster can contribute an associated fixed torque value). Accordingly, the "space" of available gimbal rates $\dot{\delta}_j$ is an N-dimensional space described by the "vector": $\vec{\delta} = [\dot{\delta}_1, \dot{\delta}_2, \ldots, \dot{\delta}_N]^T$, and the "space" of available effective thruster values $TH_j$ is an M-dimensional space described by the "vector": $\overrightarrow{TH} = [TH_1, TH_2, \ldots, TH_M]^T$. Here, the superscript "T" is a short-hand notation for the "transpose" operation, as the vectors $\vec{\delta}$ and $\overrightarrow{TH}$ are commonly utilized as "column" vectors rather than "row" vectors. Accordingly, the "space" described by a combined gimbal rate and thrust command vector consistent with this disclosure, for a CMG array 130 with N available gimballed rotors and a plurality of thrusters 140 under control of thruster controller 160, yielding M effective thrusters is an (N+M)-dimensional space described by the vector: $[\vec{\delta}, \overrightarrow{TH}]^T = [\dot{\delta}_1, \dot{\delta}_2, \ldots, \dot{\delta}_N, TH_1, TH_2, \ldots, TH_M]_T$.

As used herein, parenthetical subscripts will be used to denote orthonormal components of three-dimensional momentum space (i.e., $[\vec{h}]^T = [\dot{h}_{(1)}, \dot{h}_{(2)}, \dot{h}_{(3)}]^T$, where the subscripts "(1)," "(2)," and "(3)" can denote the orthonormal bases associated with "roll," "pitch," and "yaw," or a conventional "x," "y," and "z" bases, or other orthonormal bases) and subscripts that are not parenthetical will be used to denote the vector space associated with independent gimbals and thrusters (i.e., $[\vec{\delta}, \overrightarrow{TH}]^T = [\dot{\delta}_1, \dot{\delta}_2, \ldots, \dot{\delta}_N, TH_1, TH_2, \ldots, TH_M]^T$ as discussed above).

Accordingly, consistent with this disclosure, a Jacobian $\overline{A}$ matrix that, when applied to a combined gimbal rate and thrust command vector $[\vec{\delta}_c, \overrightarrow{TH}_c]^T$, generates said command torque vector $\vec{h}_c$ 2550 will correspond to a 3×(N+M) matrix:

$$\overline{A} = \begin{bmatrix} \dfrac{\partial h_{(1)}}{\partial \delta_1} & \cdots & \dfrac{\partial h_{(1)}}{\partial \delta_N} & \dfrac{\partial h_{(1)}}{\partial (TH_1 \Delta t)} & \cdots & \dfrac{\partial h_{(1)}}{\partial (TH_M \Delta t)} \\ \dfrac{\partial h_{(2)}}{\partial \delta_1} & \cdots & \dfrac{\partial h_{(2)}}{\partial \delta_N} & \dfrac{\partial h_{(2)}}{\partial (TH_1 \Delta t)} & \cdots & \dfrac{\partial h_{(2)}}{\partial (TH_M \Delta t)} \\ \dfrac{\partial h_{(3)}}{\partial \delta_1} & \cdots & \dfrac{\partial h_{(3)}}{\partial \delta_N} & \dfrac{\partial h_{(3)}}{\partial (TH_1 \Delta t)} & \cdots & \dfrac{\partial h_{(3)}}{\partial (TH_M \Delta t)} \end{bmatrix}$$

Formally, the Jacobian is based on partial derivatives of the angular momentum $\vec{h}$ with respect to the gimbal angle $\vec{\delta}$ as well as an effective partial derivative with respect to a fixed torque contribution associated with the effective thruster vector—represented above as: $\overrightarrow{TH}\Delta t$ (the variable $\Delta t$ is discussed below). Because the mapping of the torque from the CMGs is dependent on their instantaneous gimbal angle, the partial derivative of the angular momentum $\vec{h}$ with respect to the gimbal angle $\vec{\delta}$ can be derived based upon the known state of CMG array 130. In addition, one of ordinary skill in the art will appreciate that one or more thrusters providing a fixed thrust force on body 100 will, necessarily, provide a fixed thrust force on CMG array 130. These fixed thrust forces from the plurality of thrusters can be configured to be on/off-style events (where the "on" portion persists for a short time $\Delta t$) that provide known fixed torque contributions to body 100 (and to CMG array 130). Accordingly, a time derivative of the fixed torque contribution associated with the effective thruster vector $\overrightarrow{TH}$ can be written as: $\delta(\overrightarrow{TH}\Delta t)/\delta t = \overrightarrow{TH}$ and, consistent with this disclosure, the command torque vector $\vec{h}_c$ satisfies:

$$\dot{\vec{h}}_c = \overline{A} \begin{bmatrix} \dot{\vec{\delta}}_c \\ \hline \overrightarrow{TH}_c \end{bmatrix} =$$

$$\begin{bmatrix} \dfrac{\partial h_{(1)}}{\partial \delta_1} & \cdots & \dfrac{\partial h_{(1)}}{\partial \delta_N} & \dfrac{\partial h_{(1)}}{\partial (TH_1 \Delta t)} & \cdots & \dfrac{\partial h_{(1)}}{\partial (TH_M \Delta t)} \\ \dfrac{\partial h_{(2)}}{\partial \delta_1} & \cdots & \dfrac{\partial h_{(2)}}{\partial \delta_N} & \dfrac{\partial h_{(2)}}{\partial (TH_1 \Delta t)} & \cdots & \dfrac{\partial h_{(2)}}{\partial (TH_M \Delta t)} \\ \dfrac{\partial h_{(3)}}{\partial \delta_1} & \cdots & \dfrac{\partial h_{(3)}}{\partial \delta_N} & \dfrac{\partial h_{(3)}}{\partial (TH_1 \Delta t)} & \cdots & \dfrac{\partial h_{(3)}}{\partial (TH_M \Delta t)} \end{bmatrix} \begin{bmatrix} \dot{\vec{\delta}}_c \\ \hline \overrightarrow{TH}_c \end{bmatrix} \text{ where } \begin{bmatrix} \dot{\vec{\delta}}_c \\ \hline \overrightarrow{TH}_c \end{bmatrix} =$$

$$\begin{bmatrix} \dfrac{d\delta_{c1}}{dt} \\ \vdots \\ \dfrac{d\delta_{cN}}{dt} \\ \dfrac{\delta(TH_{c1}\Delta t)}{dt} \\ \vdots \\ \dfrac{\delta(TH_{cM}\Delta t)}{dt} \end{bmatrix} = \begin{bmatrix} \dfrac{d\delta_{c1}}{dt} \\ \vdots \\ \dfrac{d\delta_{cN}}{dt} \\ TH_{c1} \\ \vdots \\ TH_{cM} \end{bmatrix}$$

Because the torque contributions from each of the plurality of thrusters can be configured to be fixed torque contributions, the contribution to the Jacobian from the thrusters $\partial \vec{h}/\partial(\overrightarrow{TH}\Delta t)$ will be the configured change in angular momentum to the CMG array 130 as a result of the fixed torque command/demand values from the thrusters. The torque command/demand values are the command/demand values parsed to the individual thrusters from thruster controller 160. Accordingly, the contributions to the Jacobian from the thrusters can be derived based upon the known state of CMG array 130 and upon the known fixed torque contributions from the thrusters to the CMG array 130.

The subscript "c" denotes a "command" vector (i.e., the gimbal rates and thruster commands that will generate the command torque when operated on by Jacobian matrix $\overline{A}$).

The angular momentum vector $\vec{h}$ in Jacobian matrix $\overline{A}$ represents the angular momentum of the components of the CMG array 130; the parenthetical subscripts denote an orthonormal bases in three-dimensional momentum space; the subscripts 1 to N associated with the gimbal angles $\delta_i$ denote the ith gimbal $CMG_i$ in a CMG array with N gimballed rotors; and the subscripts 1 to M associated with the command thruster values $TH_j$ denote the jth effective command thruster value in a plurality of M effective thrusters. As indicated above, the jth thruster can have an associated force per unit time value (which can be a function of the reaction mass controllably expelled from the jth effective thruster), and that force per unit time value can provide a net fixed torque per unit time value to body 100 (and CMG array 130) depending on the position of the jth effective thruster on body 100 and also depending on the inertia matrix 2513 (J) of body 100. The product of a time increment $\Delta t$ during which the jth effective thruster operates (i.e., the "on/off" time period associated with the thrusters) with the net torque per unit time value $TH_j$, or $TH_j\Delta t$, can yield a net fixed torque contribution.

Where the maximum gimbal rates $\dot{\delta}_i$ are known, the gimbal rate commands $\dot{\delta}_i$ can be normalized to a maximum to ensure rotation about the commanded axis. Furthermore, where the maximum fixed torque contributions from the thrusters are known, the thruster commands $TH_j$ can also be normalized to a maximum to ensure acceleration limits are respected. Accordingly, the gimbal rate commands $\dot{\delta}_i$ and the thruster commands $TH_j$ can be sized to maintain respect of those limits.

As discussed above, because the effects of the N gimbal angles $\delta_i$ from the CMG array 130 on the angular momentum of body 100 $\vec{h}$ is known through the internal transfer of angular momentum from the CMG array 130 to body 100, the partial derivative of the angular momentum of body 100 $\vec{h}$ with respect to the N gimbal angles $\delta_i$ can be constructed. Moreover, because the effects of the M effective thruster commands $TH_j$ on the angular momentum of body 100 $\vec{h}$ is known through the known effects of the transfer of momentum from each of the plurality of thrusters 140 (under the control of thruster controller 160) to body 100, the partial derivative of the angular momentum of body 100 $\vec{h}$ with respect to the M effective thruster commands $TH_j$ can also be constructed. Accordingly, the contents of Jacobian matrix $\overline{A}$ can be determined depending on the details of the CMG array 130, the inertia matrix 2513 (J) of body 100, and the plurality of thrusters 140. Again, this corresponds to block 2535 in the control loop of FIG. 25, and step 2635 in the flowchart of FIG. 26.

To determine the contents of the command vector $[\vec{\delta}_c, \overrightarrow{TH}_c]^T$ using the known Jacobian matrix $\overline{A}$ and the known command torque $\vec{h}_c$, where the Jacobian matrix $\overline{A}$ is not a square matrix, one can construct a pseudo inverse of Jacobian matrix $\overline{A}$ consistent with this disclosure. Prior to computing a pseudo inverse, however, one can determine whether CMG array 130 is operating at or near a saturation singularity (decision 2516 in FIG. 25, and decision 2639 in FIG. 26). To determine the answer to this question, information regarding the current state of the CMG array 130 and the plurality of thrusters 140 can be accessed. In the control loop of FIG. 25, this is depicted by the arrow leading from block 2565 ("CMG & Thruster Array") to block 2535 ("Jacobian $\overline{A}$") just prior to decision 2516, which has an associated vector of measured gimbal angle settings and effective thruster commands 2536 [$\vec{\delta}_m,\overrightarrow{TH}_m]^T$. (Note that the Jacobian matrix $\overline{A}$ is determined, in part, by the values of [$\vec{\delta}_m,\overrightarrow{TH}_m]^T$.) If the vector of measured gimbal angle settings and effective thruster commands 2536 [$\vec{\delta}_m,\overrightarrow{TH}_m]^T$ indicate that CMG array 130 is not operating near a saturation surface, then control passes to block 2530 in FIG. 25. In the flowchart of FIG. 26, control passes to step 2641. (The alternative situation, where it is determined that the CMG array is operating in a high momentum state, will be considered further below). In the context of control unit 110 of FIG. 24, CMG array interface 2430 and thruster interface 2460 can provide the information associated with [$\vec{\delta}_m$, $\overrightarrow{TH}_m]^T$ to processor 2405 and/or CMG array and thruster control module 2450.

To construct a pseudo inverse of Jacobian matrix $\overline{A}$ in order to determine the contents of the command vector [$\vec{\delta}_c$, $\overrightarrow{TH}_c]^T$, consistent with this disclosure, a weighting matrix is constructed:

$$\overline{W} = \begin{bmatrix} w(CMG_1) & \cdots & \eta_{1\,N} & \eta_{1\,N+1} & \cdots & \eta_{1\,N+M} \\ \vdots & \ddots & \vdots & \vdots & \ddots & \vdots \\ \eta_{N\,1} & \cdots & w(CMG_N) & \eta_{N\,N+1} & \cdots & \eta_{N\,N+M} \\ \eta_{N+1\,1} & \cdots & \eta_{N+1\,N} & w(TH_1) & \cdots & \eta_{N+1\,N+M} \\ \vdots & \ddots & \vdots & \vdots & \ddots & \vdots \\ \eta_{N+M\,1} & \cdots & \eta_{N+M\,N} & \eta_{N+M\,N+1} & \cdots & w(TH_M) \end{bmatrix}$$

The diagonal elements $w(CMG_1)$, . . . $w(CMG_N)$, $w(TH_1)$, . . . $w(TH_M)$ of the weighting matrix $\overline{W}$ correspond to the plurality of gimballed rotors (i.e., $CMG_i$) and the plurality of effective thrusters $TH_j$. Accordingly, the weighting matrix $\overline{W}$ is a (N+M)×(N+M) matrix.

The diagonal elements $w(CMG_1)$, . . . $w(CMG_N)$, $w(TH_1)$, . . . $w(TH_M)$ and the values $\eta_{IJ}$ with I∈{1, . . . , N+M} and J∈{1, . . . , N+M} are configured to modulate authority among the plurality of gimballed rotors in CMG array 130 and the plurality of thrusters 140. For example, if it is determined that the angular momentum of CMG array 130 is well within the saturation surface associated with CMG array 130, then weighting matrix $\overline{W}$ can be configured to allocate primary authority to the N gimbals $CMG_i$ (over authority granted to the plurality of M effective thrusters $TH_j$).

The pseudo inverse of Jacobian matrix $\overline{A}$ subject to weighting matrix $\overline{W}$ has the form: $\overline{W}\ \overline{A}^T\ [\overline{A}\ \overline{W}\ \overline{A}^T]^{-1}$. Accordingly, block 2530 in the control loop of FIG. 25 generates the command vector 2537 [$\vec{\delta}_c$, $\overrightarrow{TH}_c]^T$ according to the operation:

$$\begin{bmatrix} \dot{\vec{\delta}}_c \\ \overrightarrow{TH}_c \end{bmatrix} = \overline{W}\overline{A}^T[\overline{A}\overline{W}\overline{A}^T]^{-1}\vec{h}_c$$

In the flowchart of FIG. 26, this operation is performed at step 2641. Once the command vector 2537 [$\vec{\delta}_c,\overrightarrow{TH}_c]^T$ is obtained, control unit 110 is configured to send the appropriate instructions to CMG array interface 2430 and thruster interface 2460 so that the command gimbal rate $\vec{\delta}_c$ is applied to the N gimbals $CMG_i$ of CMG array 130, and the effective thruster commands $\overrightarrow{TH}_c$ are implemented by the plurality of thrusters 140 through thruster controller 160. In the flowchart of FIG. 26, this is depicted at step 2650, and in the control loop of FIG. 25, this is implemented at block 2565. As depicted in FIG. 25, this will generate a torque 2555 $\vec{h}$ on body 100, which will also result in a body rate 2580 $\vec{\omega}$, at which time sensor(s) 120 can provide an updated measure of orientation and rate 2521 of body 100 (variables $\vec{Q}_m$ and $\vec{\omega}_m$). Again, in the flowchart of FIG. 26, this is depicted by the flow returning to step 2620.

Returning to decision 2516 in the control loop of FIG. 25, and decision 2639 in the flowchart of FIG. 26, we now consider the case where the vector of measured gimbal angle settings and effective thruster commands 2536 [$\vec{\delta}_m$, $\overrightarrow{TH}_m]^T$ indicate that CMG array 130 is operating at or near a saturation surface. Under these conditions, control passes to block 2531 in FIG. 25, and control passes to step 2640 in the flowchart of FIG. 26. Again, in the context of control unit 110 of FIG. 24, CMG array interface 2430 and thruster interface 2460 can provide the information associated with [$\vec{\delta}_m,\overrightarrow{TH}_m]^T$ to processor 2405 and/or CMG array and thruster control module 2450 in order to make this determination.

As discussed above, to construct a pseudo inverse of Jacobian matrix $\vec{A}$ in order to determine the contents of the command vector [$\vec{\delta}_c$, $\overrightarrow{TH}_c]^T$, consistent with this disclosure, a weighting matrix is constructed:

$$\overline{W} = \begin{bmatrix} w(CMG_1) & \cdots & \eta_{1\,N} & \eta_{1\,N+1} & \cdots & \eta_{1\,N+M} \\ \vdots & \ddots & \vdots & \vdots & \ddots & \vdots \\ \eta_{N\,1} & \cdots & w(CMG_N) & \eta_{N\,N+1} & \cdots & \eta_{N\,N+M} \\ \eta_{N+1\,1} & \cdots & \eta_{N+1\,N} & w(TH_1) & \cdots & \eta_{N+1\,N+M} \\ \vdots & \ddots & \vdots & \vdots & \ddots & \vdots \\ \eta_{N+M\,1} & \cdots & \eta_{N+M\,N} & \eta_{N+M\,N+1} & \cdots & w(TH_M) \end{bmatrix}$$

Again, the diagonal elements $w(CMG_1)$, . . . $w(CMG_N)$, $w(TH_1)$, . . . $w(TH_M)$ of the weighting matrix $\overline{W}$ correspond to the plurality of gimballed rotors (i.e., $CMG_i$) and the plurality of effective thrusters $TH_j$. Accordingly, the weighting matrix $\overline{W}$ is a (N+M)×(N+M) matrix.

As before, the diagonal elements $w(CMG_1)$, . . . $w(CMG_N)$, $w(TH_1)$, . . . $w(TH_M)$ and the values $\eta_{IJ}$ with I∈{1, . . . , N+M} and J∈{1, . . . , N+M} are configured to modulate authority among the plurality of gimballed rotors in CMG array 130 and the plurality of thrusters 140. In this instance, however, where it is determined that the angular momentum stored in CMG array 130 is at or near the saturation surface associated with CMG array 130, then weighting matrix $\overline{W}$ can be configured to allocate primary authority to the M effective thrusters $TH_j$ (over authority granted the N gimbals $CMG_i$ in CMG array 130.)

Moreover, the pseudo inverse of Jacobian matrix $\overline{A}$ subject to weighting matrix $\overline{W}$ can include singularity avoidance, of the form: $\overline{W}\ \overline{A}^T\ [\overline{A}\ \overline{W}\ \overline{A}^T+\lambda\overline{\epsilon}]^{-1}$, where $\overline{\epsilon}$ is a matrix of the form:

$$\overline{\overline{\epsilon}} = \begin{bmatrix} 1 & \epsilon_{(12)}(t) & \epsilon_{(13)}(t) \\ \epsilon_{(21)}(t) & 1 & \epsilon_{(23)}(t) \\ \epsilon_{(31)}(t) & \epsilon_{(32)}(t) & 1 \end{bmatrix},$$

where each of $\epsilon_{(12)}(t)$, $\epsilon_{(13)}(t)$, $\epsilon_{(21)}(t)$, $\epsilon_{(23)}(t)$ $\epsilon_{(31)}(t)$, and $\epsilon_{(32)}(t)$ and are small compared to 1, and are time-varying, and where $\lambda$ is a constant. One of ordinary skill in the art will appreciate that while one method of avoiding singularities is to solve an equation of the form $\overline{W}\ \overline{A}^T\ [\overline{A}\ \overline{W}\ \overline{A}^T + \lambda \overline{\epsilon}]^{-1}$ as discussed above, there are many other methods known to one of ordinary skill in the art that can be used to avoid singularities when constructing a pseudo inverse of Jacobian matrix $\overline{A}$ subject to weighting matrix $\overline{W}$: (i.e., avoiding a singularity in $\overline{W}\ \overline{A}^T\ [\overline{A}\ \overline{W}\ \overline{A}^T]^{-1}$). All of the known methods of avoiding singularities can be used consistent with this disclosure in block 2531 of FIG. 25 and step 2640 of FIG. 26. (That is, all methods applicable to avoiding singularities in unweighted Jacobians are applicable to the weighted Jacobians constructed consistent with this disclosure.)

Returning to the method discussed above, block 2531 in the control loop of FIG. 25 can generate the command vector 2539 $[\overrightarrow{\delta}_c, \overrightarrow{TH}_c]^T$ according to the operation:

$$\begin{bmatrix} \dot{\overrightarrow{\delta}}_c \\ \overrightarrow{TH}_c \end{bmatrix} = \overline{W}\overline{A}^T[\overline{A}\overline{W}\overline{A}^T + \lambda\overline{\epsilon}]^{-1}\overrightarrow{h}_c$$

Again, in the flowchart of FIG. 26, this operation is performed at step 2640. Consistent with this disclosure, the values of the diagonal elements of the weighting matrix $\overline{W}$ can be selected to naturally transition from CMG-only control within the momentum envelope and thruster-only control beyond the saturation singular surface (momentum limit). The weighting matrix $\overline{W}$ can also be used to ensure that the thruster-only control is used until the system momentum is back within the CMG momentum envelope. Consistent with this disclosure, the use of the plurality of thrusters 140 is in concert with the use of CMG array 130 such that the plurality of thrusters 140 do not "fight" with the CMG array 130. For example, if one fires thrusters 140 independent of CMG array 130 control, body 100 will remain fixed in inertial space, and the CMG array 130 would rotate until it hits a saturation/singularity surface. An application of the weighting matrix $\overline{W}$ in combined control consistent with this disclosure allows the plurality of thrusters 140 and the CMG array 130 to work together instead of being equal and opposite. One of ordinary skill in the art would also appreciate consistent with this disclosure, that any of the diagonal elements of $\overline{W}$ can be set to zero, turning off that particular CMG rotor or turning off (not using) one or more thrusters. Consistent with this aspect of the disclosure, one could select, say the weighting factors for the thrusters as zero and this would perform maneuvers with only CMGs. Similarly one could set the CMG weighting factors to zero and the system would transition to thruster-only control. The initial values of the weighting matrix $\overline{W}$ can be selected such that the CMGs have full authority until the momentum is close to the singularity. Close to a singularity, where the thruster weighting factors are non-zero, CMG control will likely dominate until the momentum is being reduced. Accordingly, consistent with this disclosure, once the system is above the momentum singularity limit, the CMG values in the weighting matrix $\overline{W}$ can be set to a value near or at zero. This approach can be a preferred use to limit fuel—that is, it can be considered a "best practice," but it is not required.

For example, once the CMG are saturated, one could zero out (or substantially reduce in relation to the thruster diagonal elements) the diagonal elements of the weighting matrix corresponding to the CMGs, until the system momentum falls back below the saturation surface. This approach would produce thruster commands to increase the momentum beyond the CMG saturation singularity surface, and this approach would continue to use thrusters to remove momentum until the level returns to a value below the saturation singularity surface. (An approach consistent with this is discussed below in connection with FIGS. 27-29.) When below the saturation surface, one could restore the CMG elements of the weighting matrix and CMGs would operate normally.

In another aspect, one could zero out the thruster elements of the weighting matrix (or substantially reduce in relation to the CMG elements of the weighting matrix) when the momentum levels are below the saturation singularity and thereby limit the torque onto the platform to only what the CMGs can contribute. This can preserve fuel, but can limit platform angular acceleration. Also, because thrusters produce linear acceleration, one might want to limit thruster usage at times to preserve orbit, so setting the weighting matrix elements for thrusters to zero can accomplish that.

Once the command vector 2539 $[\overrightarrow{\delta}_c, \overrightarrow{TH}_c]^T$ is obtained, control unit 110 is configured to send the appropriate instructions to CMG array interface 2430 and thruster interface 2460 so that the command gimbal rate $\overrightarrow{\delta}_c$ is applied to the N gimbals CMG$_i$ of CMG array 130, and the effective thruster commands $\overrightarrow{TH}_c$ are implemented by the plurality of thrusters 140 through thruster controller 160. In the flowchart of FIG. 26, again, this is depicted at step 2650, and in the control loop of FIG. 25, this is implemented at block 2565. As depicted in FIG. 25, this will generate a torque 2555 $\overrightarrow{h}$ on body 100, which will also result in a body rate 2580 $\overrightarrow{\omega}$, at which time sensor(s) 120 can provide an updated measure of orientation and rate 2521 of body 100 (variables $\overrightarrow{Q}_m$ and $\overrightarrow{\omega}_m$). Again, in the flowchart of FIG. 26, this is depicted by the flow returning to step 2620.

Consistent with this disclosure, we consider an exemplary maneuver of a body 100 that is "large" compared to the momentum capacity of CMG array 130. In the exemplary maneuver described in connection with FIGS. 27-29, a combined CMG-Thruster control law, consistent with this disclosure, automatically distributes control commands between commands to the CMG array 130 only, to mixed control commands to both CMG array 130 and the plurality of thrusters 140, and then control commands to the plurality of thrusters 140 only. This distribution of control commands occurs throughout the exemplary maneuver.

For purposes of illustration only, we consider a CMG array 130 that is only capable of producing angular momentum of [357.9, 640.0, 530.6] ft-lb-s in the Roll/Pitch/Yaw directions, and a body 100 with a body inertia matrix:

$$\overline{J} = \begin{bmatrix} 20,000 & 0 & 0 \\ 0 & 178,000 & 0 \\ 0 & 0 & 188,000 \end{bmatrix} \text{ft-lb-s}^2$$

Where the exemplary maneuver is an 180° maneuver reaching a peak body rate of ~3°/s in the Yaw axis, the angular momentum of body 100 would reach approximately 9,844 ft-lb-s, far exceeding the capability of exemplary CMG array 130 as introduced above.

Figure 27:
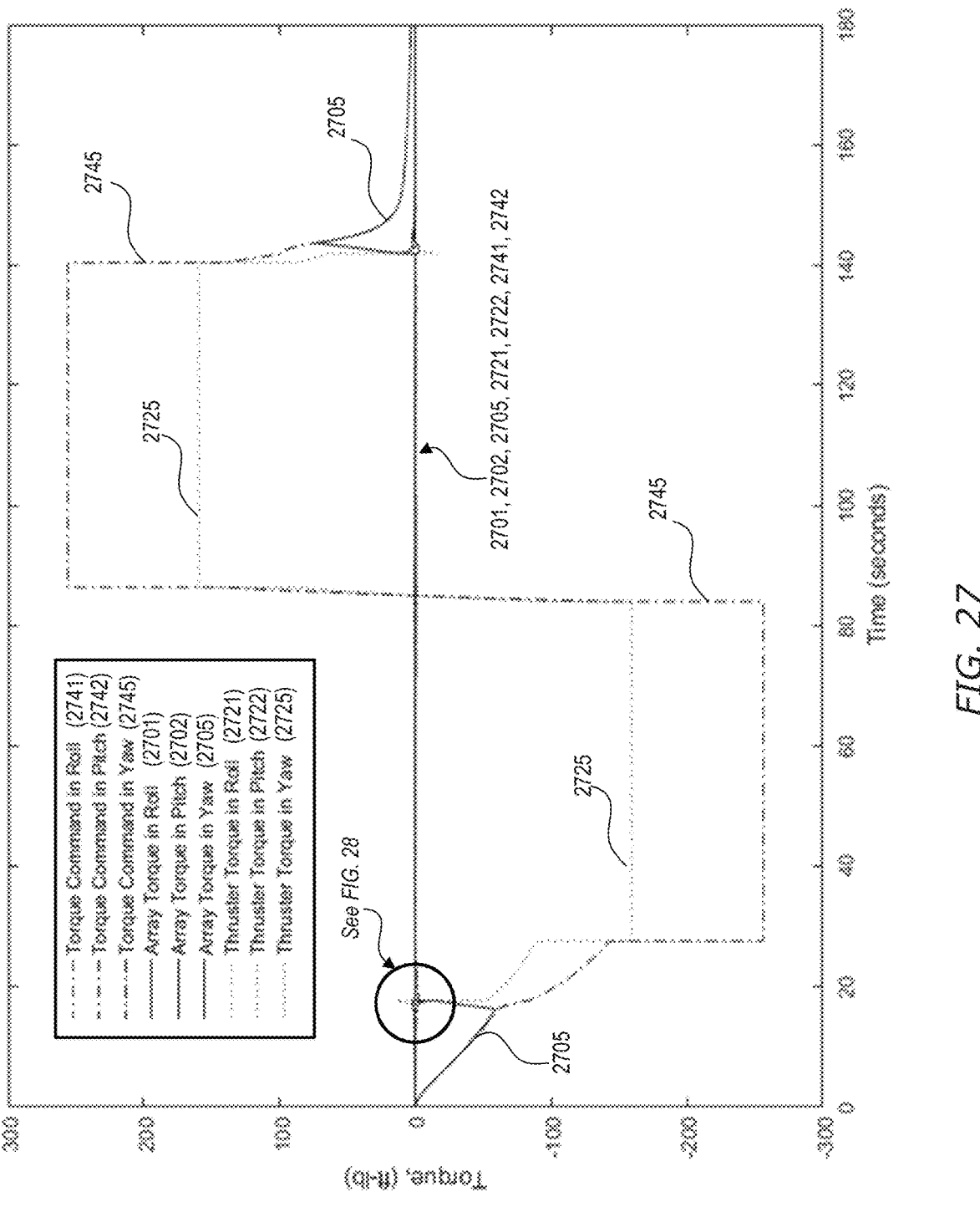
FIGS. 27-28 depicts torque applied to an exemplary system as a function of time, transitioning from CMG-only control to thruster-only control, consistent with this disclosure.
Figure 28:
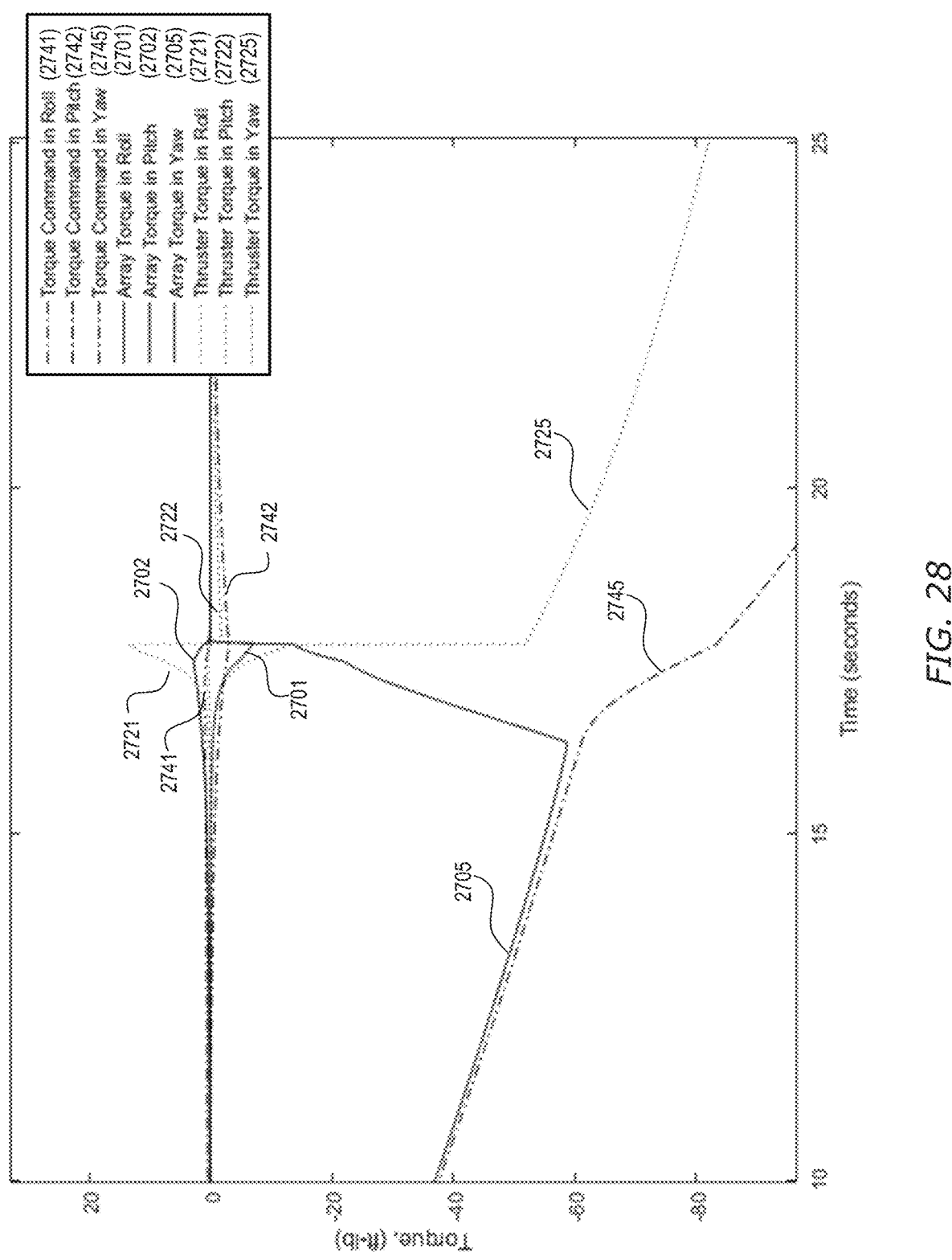

An exemplary torque from CMG array 130 and the plurality of thrusters 140 are depicted in FIGS. 27 and 28. Lines 2701, 2702 and 2705 represent torque contributions from an exemplary CMG array 130 as discussed above. Line 2705 in FIGS. 27 and 28 (representing torque in the Yaw direction associated with CMG array 130) is depicted as contributing torque for approximately the first 16 seconds, where it reaches a saturation singularity (i.e., all the gimballed rotors from CMG array 130 have contributed as much momentum in the commanded direction as they can). At that point, the plurality of thrusters 140 take over (as can be seen, for example, in Line 2725 in FIGS. 27 and 28, representing the contribution to torque in the Yaw direction from the thrusters.) In FIG. 27, it can be seen that the reverse happens close to the end of the maneuver, as the body 100 approaches 180°. That is, combined CMG-Thruster control law, consistent with this disclosure, automatically distributes control commands between commands to the plurality of thrusters 140 only, to mixed control commands to both CMG array 130 and the plurality of thrusters 140, and then control commands to CMG array 130 only in a smooth manner.

FIG. 28 provides an enlarged view of the transition from CMG-only to thruster-only control from FIG. 27. As depicted in FIG. 28, a large portion of the handoff from CMG-only to thruster-only control takes place at approximately 17.7 seconds. However, it can be seen that the hand-off starts even before 12 seconds and ramps up quickly as CMG array 130 approaches the saturation point. After that, the plurality of thrusters 140 do all the work. The difference in the torque command (Line 2745) and the thruster torque in Yaw (Line 2725) is due to the choice in proportional control here; one of ordinary skill in the art would appreciate that the difference and could be improved (i.e., the difference reduced) with more sophisticated control than that implemented in this exemplary maneuver. This is discussed further below.

Figure 29:
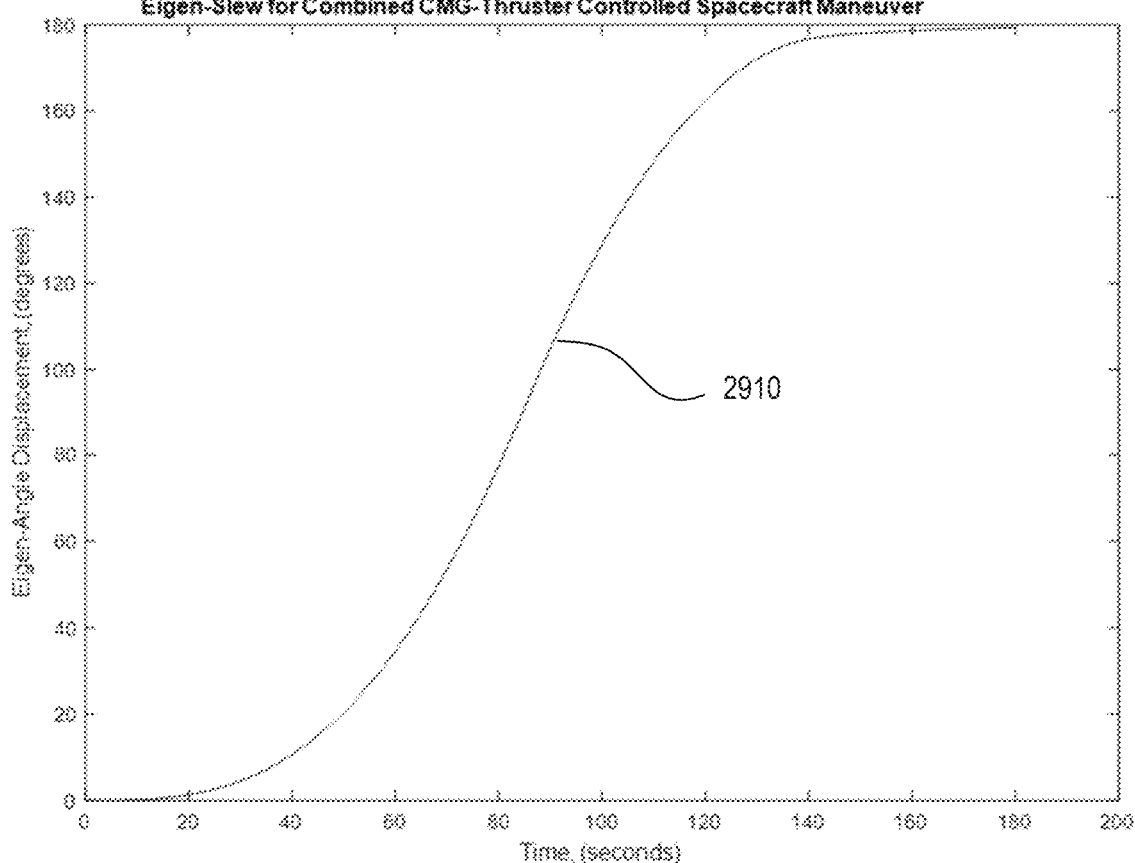
FIG. 29 depicts Eigen angle displacement as a function of time of the system depicted in FIGS. 27 and 28.

In the exemplary maneuver depicted in FIGS. 27-29, the weighting matrix $\overline{W}$ is configured to favor the CMG array 130 when the momentum is within the CMG capability. Specifically, in the exemplary maneuver depicted in FIGS. 27-29, the weighting matrix $\overline{W}$ is configured as $$\overline{W} = \begin{bmatrix} 1.0000 & 0 & 0 & 0 & 0 & 0 & 0 \\ 0 & 1.0000 & 0 & 0 & 0 & 0 & 0 \\ 0 & 0 & 1.0000 & 0 & 0 & 0 & 0 \\ 0 & 0 & 0 & 1.0000 & 0 & 0 & 0 \\ 0 & 0 & 0 & 0 & 0.1000 & 0 & 0 \\ 0 & 0 & 0 & 0 & 0 & 0.1000 & 0 \\ 0 & 0 & 0 & 0 & 0 & 0 & 0.1000 \end{bmatrix}$$

when the body momentum is less than [357.9, 640.0, 530.6] ft-lb-s in the Roll/Pitch/Yaw directions.

In this example, CMG array 130 corresponds to the first four columns of the Jacobian $\overline{A}$, so the matrix multiplication with the weighting matrix $\overline{W}$ utilizes the first four elements of the diagonal to "weight" the commanding to CMG array 130. Similarly, the last three elements of the weighting matrix $\overline{W}$ control the utilization of the plurality of thrusters 140.

When the momentum gets close to the maximum levels, the weighting matrix $\overline{W}$ can zero out the diagonal elements corresponding to CMG array 130, effectively turning them off:

$$\overline{W} = \begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 1.0 & 0 & 0 \\ 0 & 0 & 0 & 0 & 0 & 1.0 & 0 \\ 0 & 0 & 0 & 0 & 0 & 0 & 1.0 \end{bmatrix}$$

Alternatively, the weighting matrix in this same situation could allow some contribution from CMG array 130 until the least-squares solution completes the "zeroing-out" of the CMG commands, or:

$$\overline{W} = \begin{bmatrix} 0.0010 & 0 & 0 & 0 & 0 & 0 & 0 \\ 0 & 0.0010 & 0 & 0 & 0 & 0 & 0 \\ 0 & 0 & 0.0010 & 0 & 0 & 0 & 0 \\ 0 & 0 & 0 & 0.00100 & 0 & 0 & 0 \\ 0 & 0 & 0 & 0 & 10.0000 & 0 & 0 \\ 0 & 0 & 0 & 0 & 0 & 10.0000 & 0 \\ 0 & 0 & 0 & 0 & 0 & 0 & 10.0000 \end{bmatrix}$$

The weighting matrix $\overline{W}$ can also utilize characteristics of the Jacobian $\overline{A}$ itself where the weighting factors are a function of the singular values or determinant of the matrix for example, for a pre-determined value of k, as CMG array 130 approaches saturation, the value of the determinant of the Jacobian $\overline{A}$ becomes small and the weighting factor for the thrusters can be scaled by a function, for example: $k/(\det \overline{A})$.

FIG. 29 depicts the smooth rotation of body 100 through a 180° maneuver under the influence of the combined CMG-thruster torque. Specifically, FIG. 29 depicts a plot of the Yaw axis rotating from a 0° orientation to 180° (Line 2910).

As discussed above, the choice of control depicted here is a proportional control only, so the rates slow as the error approaches zero. A more sophisticated control would include integral control and feed-forward such that the end of the maneuver would be more of a mirror of the start and the CMG gimbal angles would return almost completely to their original set. In FIG. 29, one can see that, in the exemplary maneuver depicted, the CMG gimbal angles are approaching that state:

One of ordinary skill in the art would appreciate that, consistent with this disclosure, the plurality of thrusters 140 will look like additional CMG gimbals to the control law as disclosed herein. Moreover, singularities are avoided using the weighted Jacobian disclosed herein. For example, the null space is maintained throughout maneuvers due to the presence of thrusters—they look like "ghost" (or virtual) CMG gimbals. Further still, the CMG gimbal capability can be utilized up to the CMG gimbal capacity, and the pseudo inverse procedure (which can be interpreted as the minimum error solution to a least-squares estimate) can provide for continuous control through the CMG array saturation singularity surface.

As disclosed herein, the weighting matrix assures that the plurality of thrusters are not utilized until they are needed, and that is after the CMG array authority is exhausted. In addition, utilizing the weighting matrix disclosed herein ensures that the CMG authority dominates until it reaches saturation, so thruster propellant is only consumed when the CMG array can no longer contribute If a momentum bias were present when the saturation singularity is encountered, it can managed/maintained via the single control law throughout maneuver. Furthermore, combining CMG array and thruster control in a single, continuous, deterministic control law eliminates non-linearity of individual CMG array/thruster control. For example, destabilizing momentum states that can be created by thrusters when a CMG array is operating on a saturation singularity surface can be avoided due to continuous control in the single Jacobian.

Other embodiments of the invention will be apparent to those skilled in the art from consideration of the specification and practice of the embodiment disclosed herein. It is intended that the specification and examples be considered as exemplary only, with a true scope and spirit of the invention being indicated by the following claims.

What is claimed is:

1. A system for attitude control of a body, the system comprising:

a module for controlling at least one control moment gyroscope array and a plurality of thrusters, wherein the at least one control moment gyroscope array comprises a plurality of gimballed rotors, and wherein the at least one control moment gyroscope array and the plurality of thrusters are configured to provide said attitude control to the body, the module being responsive to a gimbal rate command and a thruster command;

a processor; and a non-transitory computer storage medium storing instructions that when executed by the processor cause the processor to perform operations comprising:

receiving a command vector representing a desired torque vector on said body associated with said attitude control;

generating a Jacobian matrix $\overline{A}$ that, when applied to a combined gimbal rate and thrust command vector, generates said command vector;

generating components of a weighted pseudo inverse of said Jacobian matrix $\overline{A}$ and using said components with said command vector in order to generate said combined gimbal rate and thrust command vector;

providing said gimbal rate command to said module based on said generated combined gimbal rate and thrust command vector; and providing said thrust command to said module based on said generated combined gimbal rate and thrust command vector;

wherein said generating components of said weighted pseudo inverse of said Jacobian matrix $\overline{A}$ comprises generating a weighting matrix $\overline{W}$ comprising a plurality of diagonal elements, said plurality of diagonal elements representing at least said plurality of gimballed rotors and said plurality of thrusters.

2. The system of claim 1, wherein said plurality of gimballed rotors includes N gimballed rotors ($CMG_1, \ldots$ $CMG_N$), said plurality of thrusters includes M thrusters ($TH_1, \ldots TH_M$), said Jacobian matrix $\overline{A}$ is a 3×(M+N) matrix, and said weighting matrix $\overline{W}$ is an (M+N)×(M+N) matrix characterized by a matrix form:

$$\overline{W} = \begin{bmatrix} w(CMG_1) & \cdots & \eta_{1\ N} & \eta_{1\ N+1} & \cdots & \eta_{1\ N+M} \\ \vdots & \ddots & \vdots & \vdots & \ddots & \vdots \\ \eta_{N\ 1} & \cdots & w(CMG_N) & \eta_{N\ N+1} & \cdots & \eta_{N\ N+M} \\ \eta_{N+1\ 1} & \cdots & \eta_{N+1\ N} & w(TH_1) & \cdots & \eta_{N+1\ N+M} \\ \vdots & \ddots & \vdots & \vdots & \ddots & \vdots \\ \eta_{N+M\ 1} & \cdots & \eta_{N+M\ N} & \eta_{N+M\ N+1} & \cdots & w(TH_M) \end{bmatrix};$$

wherein said diagonal elements $w(CMG_1), \ldots w(CMG_N)$, $w(TH_1), \ldots w(TH_M)$ and the values $\eta_{IJ}$ with $I \in \{1, \ldots, N+M\}$ and $J \in \{1, \ldots, N+M\}$ are configured to modulate authority among the plurality of gimballed rotors and the plurality of thrusters.

3. The system of claim 2, wherein the values $\eta_{IJ}$ are selected from a set of: $\eta_{IJ}=0$ and $\eta_{IJ} \sim 0$ in comparison to said diagonal elements $w(CMG_1), \ldots w(CMG_N), w(TH_1), \ldots w(TH_M)$.

4. The system of claim 3, wherein said diagonal elements $w(CMG_1), \ldots w(CMG_N), w(TH_1), \ldots w(TH_M)$ are non-zero.

5. The system of claim 2, wherein said generating components of said weighted pseudo inverse of said Jacobian matrix $\overline{A}$ comprises:

transposing said Jacobian matrix $\overline{A}$ to obtain an (M+N)×3 matrix $\overline{A}^T$;

inverting a first matrix product $\overline{A}\ \overline{W}\ \overline{A}^T$ to obtain a 3×3 matrix $[\overline{A}\ \overline{W}\ \overline{A}^T]^{-1}$; and generating a second matrix product: $\overline{W}\ \overline{A}^T\ [\overline{A}\ \overline{W}\ \overline{A}^T]^{-1}$.

6. The system of claim 5, wherein said command vector is characterized by a vector form:

$$\begin{bmatrix} \dot{h}_{(1)} \\ \dot{h}_{(2)} \\ \dot{h}_{(3)} \end{bmatrix};$$

and
wherein $$\begin{bmatrix} \dot{h}_{(1)} \\ \dot{h}_{(2)} \\ \dot{h}_{(3)} \end{bmatrix}$$

denotes a desired torque associated with the body, the parenthetical subscripts (1), (2), and (3) denoting orthonormal components in three-dimensional momentum space; and wherein said generating components of said weighted pseudo inverse of said Jacobian matrix $\overline{A}$ and using said components with said command vector in order to generate said combined gimbal rate and thrust command vector comprises determining a product: $\overline{W}\ \overline{A}^T\ [\overline{A}\ \overline{W}\ \overline{A}^T]^{-1}$ $$\overline{W}\ \overline{A}^T\ [\overline{A}\ \overline{W}\ \overline{A}^T]^{-1} \begin{bmatrix} \dot{h}_{(1)} \\ \dot{h}_{(2)} \\ \dot{h}_{(3)} \end{bmatrix}.$$

7. The system of claim 2, wherein said at least one control moment gyroscope array has an associated momentum envelope representing a bound on momentum values that can be accessed by said at least one control moment gyroscope array; wherein an inverse of a first matrix product, $[\overline{A} \ \overline{W} \ \overline{A}^T]^{-1}$ exhibits a singularity at and/or near a portion of said associated momentum envelope; and wherein said generating components of said weighted pseudo inverse of said Jacobian matrix $\overline{A}$ comprises:

transposing said Jacobian matrix $\overline{A}$ to obtain an (M+N)×3 matrix $\overline{A}^T$; and applying a singularity avoidance technique to provide a second matrix product corresponding to $\overline{W} \ \overline{A}^T \ [\overline{A} \ \overline{W} \ \overline{A}^T]^{-1}$.

8. The system of claim 7, wherein said singularity avoidance technique comprises:

inverting a sum of the first matrix product $\overline{A} \ \overline{W} \ \overline{A}^T$ and $\lambda$ $\overline{\epsilon}$ to obtain a 3×3 matrix $[\overline{A} \ \overline{W} \ \overline{A}^T + \lambda \overline{\epsilon}]^{-1}$; and generating the second matrix product: $\overline{W} \ \overline{A}^T \ [\overline{A} \ \overline{W} \ \overline{A}^T + \lambda \overline{\epsilon} \ ]^{-1}$;

wherein $\overline{\epsilon}$ is characterized by a second matrix form:

$$\begin{bmatrix} 1 & \epsilon_{(12)}(t) & \epsilon_{(13)}(t) \\ \epsilon_{(21)}(t) & 1 & \epsilon_{(23)}(t) \\ \epsilon_{(31)}(t) & \epsilon_{(32)}(t) & 1 \end{bmatrix}$$

wherein each of $\epsilon_{(12)}(t)$, $\epsilon_{(13)}(t)$, $\epsilon_{(21)}(t)$, $\epsilon_{(23)}(t)$ $\epsilon_{(31)}(t)$, and $\epsilon_{(32)}(t)$ are small compared to 1, and are time-varying; and wherein $\lambda$ is a constant.

9. The system of claim 8, wherein said at least one control moment gyroscope array is operating at or substantially near said portion of said associated momentum envelope;

wherein said portion of said associated momentum envelope is associated with a saturation singularity; and wherein the constant $\lambda$ is scaled to singular values associated with said saturation singularity.

10. A method for attitude control of a body using at least one control moment gyroscope array and a plurality of thrusters, wherein the at least one control moment gyroscope array comprises a plurality of gimballed rotors, and wherein the at least one control moment gyroscope array and the plurality of thrusters provide said attitude control of said body in response to an attitude control instruction set, the method comprising:

acquiring a command vector representing a desired torque vector on said body associated with said attitude control;

generating a Jacobian matrix $\overline{A}$ that, when applied to a combined gimbal rate and thrust command vector, generates said command vector;

generating components of a weighted pseudo inverse of said Jacobian matrix $\overline{A}$ and using said components with said command vector in order to generate said combined gimbal rate and thrust command vector;

determining said attitude control instruction set based on said generated combined gimbal rate and thrust command vector; and providing said attitude control instruction set to said at least one control moment gyroscope array and said plurality of thrusters;

wherein said generating components of said weighted pseudo inverse of said Jacobian matrix $\overline{A}$ comprises generating a weighting matrix $\overline{W}$ comprising a plurality of diagonal elements, said plurality of diagonal elements representing at least said plurality of gimballed rotors and said plurality of thrusters.

11. The method of claim 10, wherein said plurality of gimballed rotors includes N gimballed rotors ($CMG_1, \ldots$ $CMG_N$), said plurality of thrusters includes M thrusters ($TH_1, \ldots TH_M$), said Jacobian matrix $\overline{A}$ is a 3×(M+N) matrix, and said weighting matrix $\overline{W}$ is an (M+N)×(M+N) matrix characterized by a matrix form:

$$\overline{W} = \begin{bmatrix} w(CMG_1) & \cdots & \eta_{1\,N} & \eta_{1\,N+1} & \cdots & \eta_{1\,N+M} \\ \vdots & \ddots & \vdots & \vdots & \ddots & \vdots \\ \eta_{N\,1} & \cdots & w(CMG_N) & \eta_{N\,N+1} & \cdots & \eta_{N\,N+M} \\ \eta_{N+1\,1} & \cdots & \eta_{N+1\,N} & w(TH_1) & \cdots & \eta_{N+1\,N+M} \\ \vdots & \ddots & \vdots & \vdots & \ddots & \vdots \\ \eta_{N+M\,1} & \cdots & \eta_{N+M\,N} & \eta_{N+M\,N+1} & \cdots & w(TH_M) \end{bmatrix};$$

wherein said diagonal elements $w(CMG_1), \ldots w(CMG_N)$, $w(TH_1), \ldots w(TH_M)$ and the values $\eta_{IJ}$ with $I \in \{1, \ldots, N+M\}$ and $J \in \{1, \ldots, N+M\}$ are configured to modulate authority among the plurality of gimballed rotors and the plurality of thrusters.

12. The method of claim 11, wherein the values $\eta_{IJ}$ are selected from a set of: $\eta_{IJ}=0$ and $\eta_{IJ} \sim 0$ in comparison to said diagonal elements $w(CMG_1), \ldots w(CMG_N)$, $w(TH_1), \ldots w(TH_M)$.

13. The method of claim 12, wherein said diagonal elements $w(CMG_1), \ldots w(CMG_N)$, $w(TH_1), \ldots w(TH_M)$ are non-zero.

14. The method of claim 11, wherein said generating components of said weighted pseudo inverse of said Jacobian matrix $\overline{A}$ comprises:

transposing said Jacobian matrix $\overline{A}$ to obtain an (M+N)×3 matrix $\overline{A}^T$;

inverting a first matrix product $\overline{A} \ \overline{W} \ \overline{A}^T$ to obtain a 3×3 matrix $[\overline{A} \ \overline{W} \ \overline{A}^T]^{-1}$; and generating a second matrix product: $\overline{W} \ \overline{A}^T \ [\overline{A} \ \overline{W} \ \overline{A}^T]^{-1}$.

15. The method of claim 14, wherein said command vector is characterized by a vector form:

$$\begin{bmatrix} \dot{h}_{(1)} \\ \dot{h}_{(2)} \\ \dot{h}_{(3)} \end{bmatrix};$$

and wherein $$\begin{bmatrix} \dot{h}_{(1)} \\ \dot{h}_{(2)} \\ \dot{h}_{(3)} \end{bmatrix}$$

denotes a desired torque associated with the body, the parenthetical subscripts (1), (2), and (3) denoting orthonormal components in three-dimensional momentum space; and wherein said generating components of said weighted pseudo inverse of said Jacobian matrix $\overline{A}$ and using said components with said command vector in order to generate said combined gimbal rate and thrust command vector comprises determining a product: $\overline{W} \ \overline{A}^T \ [\overline{A} \ \overline{W} \ \overline{A}^T]^{-1}$ $$\overline{W}\ \overline{A}^T\ [\overline{A}\ \overline{W}\ \overline{A}^T]^{-1}\begin{bmatrix} \dot{h}_{(1)} \\ \dot{h}_{(2)} \\ \dot{h}_{(3)} \end{bmatrix}.$$

16. The method of claim 11, wherein said at least one control moment gyroscope array has an associated momentum envelope representing a bound on momentum values that can be accessed by said at least one control moment gyroscope array; wherein an inverse of a first matrix product $[\overline{A}\ \overline{W}\ \overline{A}^T]^{-1}$ exhibits a singularity at and/or near a portion of said associated momentum envelope; and wherein said generating components of said weighted pseudo inverse of said Jacobian matrix $\tilde{A}$ comprises:

transposing said Jacobian matrix $\overline{A}$ to obtain an (M+N)×3 matrix $\overline{A}^T$; and applying a singularity avoidance technique to provide a second matrix product corresponding to $\overline{W}\ \overline{A}^T\ [\overline{A}\ \overline{W}\ \overline{A}^T]^{-1}$.

17. The method of claim 16, wherein said singularity avoidance technique comprises:

inverting a sum of the first matrix product $\overline{A}\ \overline{W}\ \overline{A}^T$ and $\lambda$ $\overline{\in}$ to obtain a 3×3 matrix $[\overline{A}\ \overline{W}\ \overline{A}^T + \lambda\overline{\in}]^{-1}$; and generating the second matrix product: $\overline{W}\ \overline{A}^T\ [\overline{A}\ \overline{W}\ \overline{A}^T + \lambda \overline{\in}\ ]^{-1}$;

wherein $\overline{\in}$ is characterized by a second matrix form:

$$\begin{bmatrix} 1 & \epsilon_{(12)}(t) & \epsilon_{(13)}(t) \\ \epsilon_{(21)}(t) & 1 & \epsilon_{(23)}(t) \\ \epsilon_{(31)}(t) & \epsilon_{(32)}(t) & 1 \end{bmatrix}$$

wherein each of $\epsilon_{(12)}(t)$, $\epsilon_{(13)}(t)$, $\epsilon_{(21)}(t)$, $\epsilon_{(23)}(t)$ $\epsilon_{(31)}(t)$, and $\epsilon_{(32)}(t)$ are small compared to 1, and are time-varying; and wherein $\lambda$ is a constant.

18. The method of claim 17, wherein said at least one control moment gyroscope array is operating at or substantially near said portion of said associated momentum envelope;

wherein said portion of said associated momentum envelope is associated with a saturation singularity; and wherein the constant $\lambda$ is scaled to singular values associated with said saturation singularity.

19. A non-transitory computer-readable medium storing instructions that when executed by a system for attitude control of a body cause the system to perform a method for attitude control using at least one control moment gyroscope array and a plurality of thrusters, wherein the at least one control moment gyroscope array comprises a plurality of gimballed rotors, the method comprising:

acquiring a command vector representing a desired torque vector on said body associated with said attitude control;

generating a Jacobian matrix $\overline{A}$ that, when applied to a combined gimbal rate and thrust command vector, generates said command vector;

generating components of a weighted pseudo inverse of said Jacobian matrix $\overline{A}$ and using said components with said command vector in order to generate said combined gimbal rate and thrust command vector;

determining an attitude control instruction set based on said generated combined gimbal rate and thrust command vector; and providing said attitude control instruction set to said at least one control moment gyroscope array and said plurality of thrusters;

wherein said generating components of said weighted pseudo inverse of said Jacobian matrix $\overline{A}$ comprises generating a weighting matrix $\overline{W}$ comprising a plurality of diagonal elements, said plurality of diagonal elements representing at least said plurality of gimballed rotors and said plurality of thrusters.

20. The non-transitory computer-readable medium of claim 19, wherein said plurality of gimballed rotors includes N gimbals ($CMG_1$, . . . . $CMG_N$), said plurality of thrusters includes M thrusters ($TH_1$, . . . . $TH_M$), said Jacobian matrix $\overline{A}$ is a 3×(M+N) matrix, and said weighting matrix $\overline{W}$ is an (M+N)×(M+N) matrix characterized by a matrix form:

$$\overline{W} = \begin{bmatrix} w(CMG_1) & \cdots & \eta_{1\ N} & \eta_{1\ N+1} & \cdots & \eta_{1\ N+M} \\ \vdots & \ddots & \vdots & \vdots & \ddots & \vdots \\ \eta_{N\ 1} & \cdots & w(CMG_N) & \eta_{N\ N+1} & \cdots & \eta_{N\ N+M} \\ \eta_{N+1\ 1} & \cdots & \eta_{N+1\ N} & w(TH_1) & \cdots & \eta_{N+1\ N+M} \\ \vdots & \ddots & \vdots & \vdots & \ddots & \vdots \\ \eta_{N+M\ 1} & \cdots & \eta_{N+M\ N} & \eta_{N+M\ N+1} & \cdots & w(TH_M) \end{bmatrix};$$

wherein said diagonal elements $w(CMG_1)$, . . . $w(CMG_N)$, $w(TH_1)$, . . . $w(TH_M)$ and the values $\eta_{IJ}$ with $I \in \{1, . . . , N+M\}$ and $J \in \{1, . . . , N+M\}$ are configured to modulate authority among the plurality of gimballed rotors and the plurality of thrusters.

21. The non-transitory computer-readable medium of claim 20, wherein the values $\eta_{IJ}$ are selected from a set of: $\eta_{IJ} = 0$ and $\eta_{IJ} \sim 0$ in comparison to said diagonal elements $w(CMG_1)$, . . . $w(CMG_N)$, $w(TH_1)$, . . . $w(TH_M)$.

22. The non-transitory computer-readable medium of claim 21, wherein said diagonal elements $w(CMG_1)$, . . . $w(CMG_N)$, $w(TH_1)$, . . . $w(TH_M)$ are non-zero.

23. The non-transitory computer-readable medium of claim 20, wherein said generating components of said weighted pseudo inverse of said Jacobian matrix $\vec{A}$ comprises:

transposing said Jacobian matrix $\overline{A}$ to obtain an (M+N)×3 matrix $\overline{A}^T$;

inverting a first matrix product $\overline{A}\ \overline{W}\ \vec{\overline{A}}^T$ to obtain a 3×3 matrix $[\overline{A}\ \overline{W}\ \overline{A}^T]^{-1}$; and generating a second matrix product: $\overline{W}\ \overline{A}^T\ [\overline{A}\ \overline{W}\ \overline{A}^T]^{-1}$.

24. The non-transitory computer-readable medium of claim 23, wherein said command vector is characterized by a vector form:

$$\begin{bmatrix} \dot{h}_{(1)} \\ \dot{h}_{(2)} \\ \dot{h}_{(3)} \end{bmatrix};$$

and wherein $$\begin{bmatrix} \dot{h}_{(1)} \\ \dot{h}_{(2)} \\ \dot{h}_{(3)} \end{bmatrix}$$

denotes a desired torque associated with the body, the parenthetical subscripts (1), (2), and (3) denoting orthonormal components in three-dimensional momentum space; and wherein said generating components of said weighted pseudo inverse of said Jacobian matrix $\overleftrightarrow{A}$ and using said components with said command vector in order to generate said combined gimbal rate and thrust command vector comprises determining a product: $\overline{W}\,\overline{A}^T\,[\,\overline{A}\,\overline{W}\,\overline{A}^T\,]^{-1}$ $$\overline{W}\,\overline{A}^T\,[\,\overline{A}\,\overline{W}\,\overline{A}^T\,]^{-1}\begin{bmatrix} \dot{h}_{(1)} \\ \dot{h}_{(2)} \\ \dot{h}_{(3)} \end{bmatrix}.$$

25. The non-transitory computer-readable medium of claim 20, wherein said at least one control moment gyroscope array has an associated momentum envelope representing a bound on momentum values that can be accessed by said at least one control moment gyroscope array; wherein an inverse of a first matrix product $[\overline{A}\,\overline{W}\,\overline{A}^T]^{-1}$ exhibits a singularity at and/or near a portion of said associated momentum envelope; and wherein said generating components of said weighted pseudo inverse of said Jacobian matrix $\overline{A}$ comprises:

transposing said Jacobian matrix $\overline{A}$ to obtain an (M+N)×3 matrix $\overline{A}^T$; and applying a singularity avoidance technique to provide a second matrix product corresponding to $\overline{W}\,\overline{A}^T\,[\overline{A}\,\overline{W}\,\overline{A}^T]^{-1}$.

26. The non-transitory computer-readable medium of claim 25, wherein said singularity avoidance technique comprises:

inverting a sum of the first matrix product $\overline{A}\,\overline{W}\,\overline{A}^T$ and $\lambda\,\overline{\in}$ to obtain a 3×3 matrix $[\overline{A}\,\overline{W}\,\overline{A}^T+\lambda\overline{\in}\,]^{-1}$; and generating the second matrix product: $\overline{W}\,\overline{A}^T\,[\overline{A}\,\overline{W}\,\overline{A}^T+\lambda\,\overline{\in}\,]^{-1}$;

wherein $\overline{\in}$ is characterized by a second matrix form:

$$\begin{bmatrix} 1 & \in_{(12)}(t) & \in_{(13)}(t) \\ \in_{(21)}(t) & 1 & \in_{(23)}(t) \\ \in_{(31)}(t) & \in_{(32)}(t) & 1 \end{bmatrix}$$

wherein each of $\in_{(12)}(t)$, $\in_{(13)}(t)$, $\in_{(21)}(t)$, $\in_{(23)}(t)$ $\in_{(31)}(t)$, and $\in_{(32)}(t)$ are small compared to 1, and are time-varying; and wherein $\lambda$ is a constant.

27. The non-transitory computer readable medium of claim 26, wherein said at least one control moment gyroscope array is operating at or substantially near said portion of said associated momentum envelope;

wherein said portion of said associated momentum envelope is associated with a saturation singularity; and wherein the constant $\lambda$ is scaled to singular values associated with said saturation singularity.

\* \* \* \* \*